US012488776B2

(12) United States Patent
Zhang et al.

(10) Patent No.: US 12,488,776 B2
(45) Date of Patent: Dec. 2, 2025

(54) ACTIVE NOISE CANCELLATION METHOD, DEVICE, AND SYSTEM

(71) Applicant: HUAWEI TECHNOLOGIES CO., LTD., Guangdong (CN)

(72) Inventors: Libin Zhang, Beijing (CN); Tingqiu Yuan, Shenzhen (CN); Huimin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 18/338,851

(22) Filed: Jun. 21, 2023

(65) Prior Publication Data

US 2023/0335101 A1 Oct. 19, 2023

Related U.S. Application Data

(63) Continuation of application No. PCT/CN2021/139667, filed on Dec. 20, 2021.

(30) Foreign Application Priority Data

Dec. 22, 2020 (CN) ........................ 202011535004.1

(51) Int. Cl.
*G10K 11/178* (2006.01)

(52) U.S. Cl.
CPC .. *G10K 11/17827* (2018.01); *G10K 11/17823* (2018.01); *G10K 11/17881* (2018.01)

(58) Field of Classification Search
CPC ..... G10K 11/17827; G10K 2210/1081; H04R 1/1083; H04R 2460/01
See application file for complete search history.

(56) References Cited

U.S. PATENT DOCUMENTS

| | | | |
|---|---|---|---|
| 7,092,529 | B2 | 8/2006 | Yu et al. |
| 9,129,586 | B2 | 9/2015 | Bajic et al. |
| 9,515,629 | B2 | 12/2016 | Goldstein et al. |

(Continued)

FOREIGN PATENT DOCUMENTS

| | | | |
|---|---|---|---|
| AU | 2020203567 | A1 | 12/2020 |
| CN | 104616662 | A | 5/2015 |

(Continued)

OTHER PUBLICATIONS

[No Author Listed] [online], "Intelligent Noise Detection and Control—Active Noise Control (ANC) technology," Oct. 18, 2011, retrieved from URL<https://wenku.baidu.com/view/4cf5af553c1ec5da51e27006.html,> 32 pages (with machine English translation).

(Continued)

*Primary Examiner* — Ping Lee
(74) *Attorney, Agent, or Firm* — Fish & Richardson P.C.

(57) ABSTRACT

The present discloser relates to a method for active noise cancellation. An example method includes: capturing an ambient sound to determine an ambient audio signal; and determining a working status, determining at least one corresponding wanted signal based on the working status, and then removing the at least one wanted signal from the ambient audio signal, to obtain a reference signal, where the wanted signal includes content of interest. The example method further includes determining a to-be-played signal based on the reference signal.

20 Claims, 24 Drawing Sheets

(56) References Cited

U.S. PATENT DOCUMENTS

| | | | | |
|---|---|---|---|---|
| 10,665,220 | B1 | 5/2020 | Nielsen | |
| 2003/0035551 | A1 | 2/2003 | Light et al. | |
| 2009/0323976 | A1* | 12/2009 | Asada .............. | G10K 11/17853 381/71.1 |
| 2010/0131269 | A1* | 5/2010 | Park ................. | G10K 11/17857 381/71.1 |
| 2014/0044275 | A1 | 2/2014 | Goldstein et al. | |
| 2018/0322861 | A1* | 11/2018 | Ibrahim ............... | H04R 29/008 |

FOREIGN PATENT DOCUMENTS

| | | | |
|---|---|---|---|
| CN | 108601519 | A | 9/2018 |
| CN | 109686367 | A | 4/2019 |
| CN | 111886878 | A | 11/2020 |
| JP | 6389232 | B2 | 9/2018 |
| KR | 20150008471 | A | 1/2015 |

OTHER PUBLICATIONS

[No Author Listed] [online], "Active Noise Control (ANC) Theory and Matlab Code Implementation," Oct. 18, 2019, retrieved from URL <https://www.cnblogs.com/LXP-Never/archive/2019/10/18/11693567.html>, 39 pages (with English translation).

Wang, "Research and application of key-word spotting technology," Thesis for the degree of Master, Beijing University of Posts and Telecommunications, Mar. 11, 2017, (with English abstract), 54 pages.

Yang, "Research and implementation of speaker recognition algorithm based on text independent," Thesis for the degree of Master, University of Electronic Science and Technology of China, Mar. 28, 2017, (with English abstract), 53 pages.

Wang, "Study on Methods for Speech Enhancement based on Microphone Array," Doctoral Dissertation, Dalian University of Technology, Apr. 2007, (with English abstract), 67 pages.

Wang, "Research on Key Technologies in Multichannel Speech Signal Processing-Sound Field Reconstruction and Speech Separation," Doctoral Dissertation, Dalian University of Technology, Dec. 2009, (with English abstract), 58 pages.

Extended European Search Report in European AppIn No. 21909336.6, dated Apr. 10, 2024, 9 pages.

International Search Report and Written Opinion in International Appln. No. PCT/CN2021/139667, mailed on Mar. 1, 2022, 18 pages (with English translation).

Extended European Search Report in European Appln. No. 21909336.6, mailed on Apr. 10, 2024, 9 pages.

[No Author Listed] [online], "Analysis and Application Fields of Active Noise Reduction Technology," Apr. 4, 2016, retrieved from URL<https://wenku.baidu.com/view/651e78d6376baf1ffd4fadc4.html>, 30 pages (with machine English translation).

[No Author Listed] [online], "ANC noise reduction learning," Jun. 7, 2018, retrieved from URL<https://blog.csdn.net/weixin_42183571/article/details/80615660>, 8 pages (with English translation).

* cited by examiner

ACTIVE NOISE CANCELLATION METHOD, DEVICE, AND SYSTEM

CROSS-REFERENCE TO RELATED APPLICATIONS

This application is a continuation of International Application No. PCT/CN2021/139667, filed on Dec. 20, 2021, which claims priority to Chinese Patent Application No. 202011535004.1, filed on Dec. 22, 2020, the disclosures of the aforementioned applications are hereby incorporated by reference in their entireties.

TECHNICAL FIELD

This application relates to the audio field, and in particular, to an active noise cancellation method, device, and system.

BACKGROUND

At present, a headset has become an indispensable product in people's life. When a user uses a headset to listen to music or answer a call, a surrounding environment may have great noise. Therefore, usually the volume of the headset may be increased to cover the noise. But increasing the volume greatly affects hearing, and hearing fatigue is caused after a long time. Therefore, to reduce noise heard by the user, some headsets use active noise cancellation to reduce noise in a surrounding environment. Active noise cancellation is based on a sound wave superposition principle, that is, noise removal is implemented through mutual cancellation of sound waves. For example, as shown in FIG. 1, by finding a sound with exactly the same spectrum as the noise to be removed but only in opposite phase, the noise is canceled through superposition.

However, in a general case, to implement comprehensive noise cancellation, that is, any external sound signal is suppressed to the greatest extent, after active noise cancellation, all external sounds are suppressed to the maximum extent. If the user still wants to hear some wanted information, an existing solution cannot be used.

SUMMARY

Embodiments of this application provide an active noise cancellation method. A wanted signal of interest is determined, and then the wanted signal is removed from a reference signal. Then, the headset processes, by using an adaptive filter, the reference signal from which the wanted signal is removed, to obtain a phase-inverted signal of an ambient audio signal. In this way, after the headset plays the phase-inverted signal, noise in an environment can be canceled, to implement active noise cancellation and retain a sound of interest.

According to a first aspect, an active noise cancellation method is provided, where the method is applied to a collaboration device or a headset, and the method includes: capturing an ambient sound around the collaboration device or the headset to determine an ambient audio signal; determining a working status of the collaboration device or the headset; determining, based on a preset correspondence between a working status and a wanted signal, at least one wanted signal related to the working status, where the wanted signal includes target content; and removing the at least one wanted signal from the ambient audio signal, to obtain a reference signal; determining, based on the reference signal, a to-be-played signal required for active noise cancellation, so that after the headset plays the to-be-played signal, ambient noise is canceled and target content in an environment is retained. In this application, the working status is determined, and the wanted signal of interest and that corresponds to the working status is determined based on the working status, and then the wanted signal is removed from the ambient signal. In this way, when active noise cancellation is performed, noise can be canceled and the wanted signal of interest in the corresponding working status can be retained.

In a possible implementation, the determining a working status of the collaboration device or the headset includes: determining a working scenario of the collaboration device or the headset, and/or determining a working mode of the collaboration device or the headset. In this application, content of interest in different cases may be determined from two aspects: a working scenario and a working mode.

In a possible implementation, the determining a working scenario of the collaboration device or the headset includes: obtaining environment information of the collaboration device or the headset; and determining, based on a preset correspondence between environment information and a working scenario, the working scenario of the collaboration device or the headset that is corresponding to the environment information of the collaboration device or the headset. In this application, a possible working scenario of the user may be determined based on current environment information, so that the device may determine corresponding content of interest based on the working scenario.

In a possible implementation, the environment information includes at least one of the following: geographical location information, an ambient audio signal, or an ambient video signal.

In a possible implementation, the determining a working scenario of the collaboration device or the headset further includes: determining one or more of a historical habit preference of the user, a current trip, current time information, or a device status of the collaboration device and/or a device status of the headset. The determining, based on a preset correspondence between environment information and a working scenario, a working scenario of the collaboration device or the headset corresponding to the environment information of the collaboration device or the headset includes: determining, based on the environment information and with reference to one or more of the historical habit preference of the user, the current trip, the current time information, or the device status of the collaboration device or the headset, the working scenario of the collaboration device or the headset corresponding to the environment information of the collaboration device or the headset. In this application, content that may be currently of interest may be determined based on an environment and with reference to other information of the user.

In a possible implementation, the determining a working mode of the collaboration device or the headset includes: The collaboration device or the headset receives a first input instruction, where the first input instruction indicates a selected working mode from a plurality of working modes prestored in the collaboration device or the headset; and determines the working mode of the collaboration device or the headset based on the first input instruction, where the working mode is a working mode in an active noise cancellation mode.

In a possible implementation, if the method is applied to the collaboration device, the method further includes: receiving a working mode of the headset sent by the headset;

and using the working mode of the headset as the working mode of the collaboration device; or determining the working mode of the collaboration device based on the first input instruction and the working mode of the headset.

In a possible implementation, if the method is applied to the headset, the method further includes: receiving the working mode of the collaboration device sent by the collaboration device; using the working mode of the collaboration device as the working mode of the headset; or determining the working mode of the headset based on the first input instruction and the working mode of the collaboration device.

In a possible implementation, the determining at least one wanted signal related to the working status includes: determining the at least one wanted signal that is related to the working status and that is prestored in the collaboration device or the headset.

In a possible implementation, the determining at least one wanted signal related to the working status further includes: if the method is applied to the headset, receiving at least one wanted signal sent by the collaboration device, and determining, from the at least one wanted signal based on the working status, the at least one wanted signal related to the working status, where the at least one wanted signal is prestored in the collaboration device; or if the method is applied to the collaboration device, receiving at least one wanted signal sent by the headset, and determining, from the at least one wanted signal based on the working status, the at least one wanted signal related to the working status, where the at least one wanted signal is prestored in the headset.

In a possible implementation, the determining at least one wanted signal related to the working status includes: performing signal separation on the ambient audio signal to obtain at least one sound source signal; and identifying the at least one sound source signal, and determining the at least one wanted signal related to the working status. In this application, the wanted signal may be determined from the ambient audio signal in real time, to ensure that when the user performs active noise cancellation, content of interest can be dynamically retained.

In a possible implementation, the performing signal separation on the ambient audio signal to obtain at least one sound source signal includes: performing short-time Fourier transform on the ambient audio signal to obtain an ambient audio frequency domain signal; obtaining a sound source frequency domain signal through a separation network based on the ambient audio frequency domain signal, where the separation network is formed by an impulse response of a separation filter; and performing inverse short-time Fourier transform on the sound source frequency domain signal to obtain at least one sound source signal in time domain.

In a possible implementation, the identifying at least one sound source signal and determining the at least one wanted signal related to the working status includes: identifying a keyword of the at least one sound source signal, and determining, from the at least one sound source signal, at least one wanted signal including a preset keyword related to the working status; or performing voiceprint matching on the at least one sound source signal, and determining, from the at least one sound source signal, at least one wanted signal that matches a preset voiceprint related to the working status.

In a possible implementation, the identifying a keyword of the at least one sound source signal, and determining, from the at least one sound source signal, at least one wanted signal including a preset keyword includes: performing pre-emphasis and frame division and windowing on each sound source signal of the at least one sound source signal by using a high-pass filter, to obtain a plurality of frame signals corresponding to each sound source signal; performing fast Fourier transform on the plurality of frame signals to obtain a spectral characteristic corresponding to each sound source signal; obtaining a logarithm after the spectral characteristic is filtered by a Mel filter, to obtain a Mel frequency logarithmic energy spectrum corresponding to each sound source signal; performing discrete cosine transform on the Mel frequency logarithmic energy spectrum to obtain a Mel coefficient corresponding to each sound source signal; calculating a cosine distance between the Mel coefficient corresponding to each sound source signal and a Mel coefficient of the preset keyword; and when the cosine distance is greater than or equal to a cosine distance threshold, using the sound source signal as a wanted signal. In this application, a keyword is identified, to ensure that an audio signal including the keyword is retained while active noise cancellation is performed.

In a possible implementation, the performing voiceprint matching on at least one sound source signal, and determining, from the at least one sound source signal, at least one wanted signal that matches a preset voiceprint includes: preprocessing each sound source signal in the at least one sound source signal to obtain a plurality of frame signals corresponding to each sound source signal; performing fast Fourier transform on the plurality of frame signals to obtain a spectral characteristic corresponding to each sound source signal; obtaining a logarithm after the spectral characteristic is filtered by a Mel filter, to obtain a Mel frequency logarithmic energy spectrum corresponding to each sound source signal; performing discrete cosine transform on the Mel frequency logarithmic energy spectrum to obtain a Mel coefficient corresponding to each sound source signal; calculating a similarity between the Mel coefficient corresponding to each sound source signal and a preset voiceprint feature Mel coefficient; and when the similarity is greater than or equal to a similarity threshold, using the sound source signal as a wanted signal. In this application, a voiceprint is identified, to ensure that a specific human voice or a specific melody of interest is retained while active noise cancellation is performed.

In a possible implementation, the determining at least one wanted signal related to the working status includes: determining, based on a preset correspondence between a working status and a frequency and/or a frequency band, at least one preset frequency and/or frequency band related to the working status; and the removing the at least one wanted signal from the ambient audio signal, to obtain a reference signal includes: processing the ambient audio signal, and removing the at least one preset frequency and/or frequency band to obtain the reference signal. In this application, filtering of a specific frequency may be further performed on the captured ambient signal, to ensure that after active noise cancellation, the user can still perceive an audio signal of a specific frequency.

In a possible implementation, the processing the ambient audio signal to remove the at least one preset frequency and/or frequency band to obtain the reference signal includes: removing, by using a band-pass filter, a sound of the at least one preset frequency and/or frequency band from each sound source signal of the ambient audio signal or the at least one sound source signal, to obtain the ambient audio signal or the reference signal corresponding to each sound source signal. In this application, filtering is performed on a specific frequency-domain frequency, to ensure that an audio signal of a specific frequency is retained while active noise cancellation is performed.

In a possible implementation, the removing the at least one wanted signal from the ambient audio signal, to obtain a reference signal includes: removing the at least one wanted signal from the ambient audio signal through adaptive filtering, to obtain the reference signal; or removing the at least one wanted signal from the ambient audio signal through spectral subtraction, to obtain the reference signal. In this application, the wanted signal is removed from the ambient audio signal, to ensure that the reference signal does not include the wanted signal of interest, so that during active noise cancellation, noise can be canceled and content of interest can be retained.

In a possible implementation, before the removing the at least one wanted signal from the ambient audio signal, the method further includes: performing band-pass filtering on the at least one wanted signal to obtain at least one filtered wanted signal. In this application, the wanted signal may be further filtered out, to filter out a high-frequency wanted signal, thereby reducing power consumption of a device and reducing noise cancellation on a high frequency.

In a possible implementation, before the performing band-pass filtering on the at least one wanted signal, the method further includes: obtaining a preset band-pass filtering range; or determining a band-pass filtering range in a working status based on the working status; or determining power level information of the collaboration device or the headset, and determining the band-pass filtering range based on the power level information of the collaboration device or the headset.

In a possible implementation, the capturing an ambient sound includes: omnidirectional capturing; or capturing in a specific direction by controlling a microphone array. In this application, directional capturing may be further performed on the audio signal, so that the reference signal that does not include the wanted signal can be obtained more quickly.

In a possible implementation, the method further includes: if the microphone array is controlled to perform capturing in a specific direction, determining at least one wanted signal based on a captured audio signal in at least one direction, where a direction of a reference signal obtained based on the wanted signal is inconsistent with a direction of the wanted signal; or if the microphone array is controlled to perform capturing in a specific direction, determining a reference signal based on a captured audio signal in at least one direction.

In a possible implementation, if the method is applied to the collaboration device, the capturing an ambient sound around the collaboration device or the headset, and determining an ambient audio signal includes: The collaboration device captures the ambient sound around the collaboration device or the headset, and uses the captured sound as the ambient audio signal; or the collaboration device receives an ambient audio signal sent by the headset, where the ambient audio signal is an ambient sound around the headset that is captured by the headset.

In a possible implementation, if the method is applied to the headset, the capturing an ambient sound around the collaboration device or the headset, and determining an ambient audio signal includes: The headset captures an ambient sound around the collaboration device, and uses the captured sound as the ambient audio signal; or the headset receives an ambient audio signal sent by the collaboration device, where the ambient audio signal is an ambient sound around the collaboration device that is captured by the collaboration device.

In a possible implementation, the determining a to-be-played signal includes: determining a phase-inverted signal of the ambient audio signal based on the reference signal and an active noise cancellation architecture, and using the phase-inverted signal as the to-be-played signal.

In a possible implementation, the determining a phase-inverted signal of the ambient audio signal based on the reference signal and the active noise cancellation architecture includes: determining the phase-inverted signal of the ambient audio signal based on the reference signal and a weight coefficient of the adaptive filter.

In a possible implementation, the method further includes: capturing a sound field feature of a quiet zone of the headset; and determining an updated weight coefficient based on the sound field feature, the weight coefficient of the adaptive filter, and the reference signal, to determine a phase-inverted signal of the ambient audio signal next time.

In a possible implementation, the method further includes: if the method is applied to the collaboration device, sending the to-be-played signal to the headset.

According to a second aspect, an active noise cancellation method is provided, where the method is applied to a collaboration device or a headset, and the method includes: capturing an ambient sound around the collaboration device or the headset to determine an ambient audio signal; determining at least one wanted signal, where the wanted signal includes target content; performing band-pass filtering on the at least one wanted signal to obtain at least one filtered wanted signal; and removing the at least one filtered wanted signal from the ambient audio signal, to obtain a reference signal; determining, based on the reference signal, a to-be-played signal required for active noise cancellation, so that after the headset plays the to-be-played signal, ambient noise is canceled and the target content in an environment is retained. In this application, the wanted signal of interest is determined, and then band-pass filtering is performed on the wanted signal, to remove a high-frequency part whose noise cancellation effect is not ideal, and remove the filtered wanted signal from the ambient signal. In this way, when active noise cancellation is performed, noise can be canceled and the wanted signal of interest in the corresponding working status can be retained.

In a possible implementation, the determining at least one wanted signal includes: determining a working status of the collaboration device or the headset; and determining, based on a preset correspondence between a working status and a wanted signal, at least one wanted signal related to the working status. In this application, the working status may be further determined, and the wanted signal that is corresponding to the working status and of interest may be determined based on the working status.

In a possible implementation, the determining a working status of the collaboration device or the headset includes: determining a working scenario of the collaboration device or the headset, and/or determining a working mode of the collaboration device or the headset. In this application, content of interest in different cases may be determined from two aspects: a working scenario and a working mode.

In a possible implementation, the determining a working scenario of the collaboration device or the headset includes: obtaining environment information of the collaboration device or the headset; and determining, based on a preset correspondence between environment information and a working scenario, the working scenario of the collaboration device or the headset that is corresponding to the environment information of the collaboration device or the headset. In this application, a possible working scenario of the user may be determined based on current environment information, so that the device may determine corresponding content of interest based on the working scenario.

In a possible implementation, the environment information includes at least one of the following: geographical location information, an ambient audio signal, or an ambient video signal.

In a possible implementation, the determining a working scenario of the collaboration device or the headset further includes: determining one or more of a historical habit preference of a user, a current trip, current time information, or a device status of the collaboration device and/or a device status of the headset. The determining, based on a preset correspondence between environment information and a working scenario, a working scenario of the collaboration device or the headset corresponding to environment information of the collaboration device or the headset includes: determining, based on the environment information and with reference to one or more of the historical habit preference of the user, the current trip, the current time information, or the device status of the collaboration device or the headset, the working scenario of the collaboration device or the headset corresponding to the environment information of the collaboration device or the headset. In this application, content that the user may be currently interested in may be determined based on an environment and with reference to other information of the user.

In a possible implementation, the determining a working mode of the collaboration device or the headset includes: The collaboration device or the headset receives a first input instruction, where the first input instruction indicates a selected working mode from a plurality of working modes prestored in the collaboration device or the headset; and determines the working mode of the collaboration device or the headset based on the first input instruction, where the working mode is a working mode in an active noise cancellation mode.

In a possible implementation, if the method is applied to the collaboration device, the method further includes: receiving a working mode of the headset sent by the headset; and using the working mode of the headset as the working mode of the collaboration device; or determining the working mode of the collaboration device based on the first input instruction and the working mode of the headset.

In a possible implementation, if the method is applied to the headset, the method further includes: receiving the working mode of the collaboration device sent by the collaboration device; using the working mode of the collaboration device as the working mode of the headset; or determining the working mode of the headset based on the first input instruction and the working mode of the collaboration device.

In a possible implementation, before the performing band-pass filtering on the at least one wanted signal, the method further includes: obtaining a preset band-pass filtering range; or determining a band-pass filtering range in a working status based on a working status; or determining power level information of the collaboration device or the headset, and determining the band-pass filtering range based on the power level information of the collaboration device or the headset.

In a possible implementation, the determining at least one wanted signal includes: determining at least one wanted signal prestored in the collaboration device or the headset.

In a possible implementation, the determining at least one wanted signal includes: performing signal separation on the ambient audio signal to obtain at least one sound source signal; and identifying the at least one sound source signal and determining the at least one wanted signal. In this application, a wanted signal may be determined from an ambient audio signal in real time, to ensure that when the user performs active noise cancellation, content of interest can be dynamically retained.

In a possible implementation, the performing signal separation on the ambient audio signal to obtain at least one sound source signal includes: performing short-time Fourier transform on the ambient audio signal to obtain an ambient audio frequency domain signal; obtaining a sound source frequency domain signal through a separation network based on the ambient audio frequency domain signal, where the separation network is formed by an impulse response of a separation filter; and performing inverse short-time Fourier transform on the sound source frequency domain signal to obtain at least one sound source signal in time domain.

In a possible implementation, the identifying the at least one sound source signal and determining the at least one wanted signal includes: identifying a keyword of the at least one sound source signal, and determining, from the at least one sound source signal, the at least one wanted signal that includes a preset keyword; or performing voiceprint matching on the at least one sound source signal, and determining, from the at least one sound source signal, the at least one wanted signal that matches a preset voiceprint.

In a possible implementation, the identifying a keyword of the at least one sound source signal, and determining, from the at least one sound source signal, at least one wanted signal including a preset keyword includes: performing pre-emphasis and frame division and windowing on each sound source signal of the at least one sound source signal by using a high-pass filter, to obtain a plurality of frame signals corresponding to each sound source signal; performing fast Fourier transform on the plurality of frame signals to obtain a spectral characteristic corresponding to each sound source signal; obtaining a logarithm after the spectral characteristic is filtered by a Mel filter, to obtain a Mel frequency logarithmic energy spectrum corresponding to each sound source signal; performing discrete cosine transform on the Mel frequency logarithmic energy spectrum to obtain a Mel coefficient corresponding to each sound source signal; calculating a cosine distance between the Mel coefficient corresponding to each sound source signal and a Mel coefficient of the preset keyword; and when the cosine distance is greater than or equal to a cosine distance threshold, using the sound source signal as a wanted signal. In this application, a keyword is identified, to ensure that an audio signal including the keyword is retained while active noise cancellation is performed.

In a possible implementation, the performing voiceprint matching on at least one sound source signal, and determining, from the at least one sound source signal, at least one wanted signal that matches a preset voiceprint includes: preprocessing each sound source signal in the at least one sound source signal to obtain a plurality of frame signals corresponding to each sound source signal; performing fast Fourier transform on the plurality of frame signals to obtain a spectral characteristic corresponding to each sound source signal; obtaining a logarithm after the spectral characteristic is filtered by a Mel filter, to obtain a Mel frequency logarithmic energy spectrum corresponding to each sound source signal; performing discrete cosine transform on the Mel frequency logarithmic energy spectrum to obtain a Mel coefficient corresponding to each sound source signal; calculating a similarity between the Mel coefficient corresponding to each sound source signal and a preset voiceprint feature Mel coefficient; and when the similarity is greater than or equal to a similarity threshold, using the sound source signal as a wanted signal. In this application, a voiceprint is identified, to ensure that a specific human voice or a specific melody of interest is retained while active noise cancellation is performed.

In a possible implementation, the determining at least one wanted signal includes: determining at least one preset frequency and/or frequency band; and removing the at least one filtered wanted signal from the ambient audio signal, to obtain a reference signal includes: performing band-pass filtering on the at least one preset frequency and/or frequency band to obtain at least one filtered frequency and/or frequency band; processing the ambient audio signal, and removing at least one filtered frequency and/or frequency band to obtain a reference signal. In this application, filtering of a specific frequency may be further performed on the captured ambient signal, to ensure that after active noise cancellation, a user can still perceive an audio signal of a specific frequency.

In a possible implementation, the processing the ambient audio signal to remove the at least one filtered frequency and/or frequency band, to obtain the reference signal includes: removing, by using a band-pass filter, a sound of the at least one filtered frequency and/or frequency band from each sound source signal of the ambient audio signal or the at least one sound source signal, to obtain the ambient audio signal or the reference signal corresponding to each sound source signal. In this application, filtering is performed on a specific frequency-domain frequency, to ensure that an audio signal of a specific frequency is retained while active noise cancellation is performed.

In a possible implementation, the removing the at least one filtered wanted signal from the ambient audio signal, to obtain the reference signal includes: removing the at least one filtered wanted signal from the ambient audio signal by using adaptive filtering, to obtain the reference signal; or removing the at least one filtered wanted signal from the ambient audio signal by using a spectral subtraction method, to obtain the reference signal. In this application, the wanted signal is removed from the ambient audio signal, to ensure that the reference signal does not include the wanted signal of interest, so that during active noise cancellation, noise can be canceled and content of interest can be retained.

In a possible implementation, the capturing an ambient sound includes: omnidirectional capturing; or capturing in a specific direction by controlling a microphone array. In this application, directional capturing may be further performed on the audio signal, so that the reference signal that does not include the wanted signal can be obtained more quickly.

In a possible implementation, the method further includes: if the microphone array is controlled to perform capturing in a specific direction, determining at least one wanted signal based on a captured audio signal in at least one direction, where a direction of a reference signal obtained based on the wanted signal is inconsistent with a direction of the wanted signal; or if the microphone array is controlled to perform capturing in a specific direction, determining a reference signal based on a captured audio signal in at least one direction.

In a possible implementation, if the method is applied to the collaboration device, the capturing an ambient sound around the collaboration device or the headset, and determining an ambient audio signal includes: The collaboration device captures an ambient sound around the collaboration device or the headset, and uses the captured sound as the ambient audio signal; or the collaboration device receives an ambient audio signal sent by the headset, where the ambient audio signal is an ambient sound around the headset that is captured by the headset.

In a possible implementation, if the method is applied to the headset, the capturing an ambient sound around the collaboration device or the headset, and determining an ambient audio signal includes: The headset captures an ambient sound around the collaboration device, and uses the captured sound as the ambient audio signal; or the headset receives an ambient audio signal sent by the collaboration device, where the ambient audio signal is an ambient sound around the collaboration device that is captured by the collaboration device.

In a possible implementation, the determining a to-be-played signal includes: determining a phase-inverted signal of the ambient audio signal based on the reference signal and the active noise cancellation architecture, and using the phase-inverted signal of the ambient audio signal as the to-be-played signal.

In a possible implementation, the determining a phase-inverted signal of the ambient audio signal based on the reference signal and the active noise cancellation architecture includes: determining the phase-inverted signal of the ambient audio signal based on the reference signal and a weight coefficient of the adaptive filter.

In a possible implementation, the method further includes: capturing a sound field feature of a quiet zone of the headset; and determining an updated weight coefficient based on the sound field feature, the weight coefficient of the adaptive filter, and the reference signal, to determine a phase-inverted signal of the ambient audio signal next time.

In a possible implementation, the method further includes: if the method is applied to the collaboration device, sending the to-be-played signal to the headset.

According to a third aspect, an active noise cancellation method is provided. The method is applied to a collaboration device or a headset, and the method includes: capturing an ambient sound around the collaboration device or the headset, and determining an ambient audio signal; and determining at least one wanted signal, and removing the at least one wanted signal from the ambient audio signal, to obtain a reference signal, where the wanted signal includes target content; determining a to-be-played signal based on the reference signal and an active noise cancellation architecture, so that after the headset plays the to-be-played signal, ambient noise is canceled and the target content in an environment is retained. If the method is applied to the collaboration device, the method further includes: sending the to-be-played signal to the headset. In this application, the wanted signal of interest is determined, and the wanted signal is removed from the reference signal. In this way, when active noise cancellation is performed, noise can be canceled and the wanted signal of interest can be retained.

In a possible implementation, the determining at least one wanted signal includes: determining at least one wanted signal prestored in the collaboration device or the headset.

In a possible implementation, the determining at least one wanted signal further includes: if the method is applied to the headset, receiving at least one wanted signal sent by a collaboration device, where the at least one wanted signal is prestored in the collaboration device; or if the method is applied to a collaboration device, receiving at least one wanted signal sent by the headset, where the at least one wanted signal is prestored in the headset.

In a possible implementation, the determining at least one wanted signal includes: performing signal separation on the ambient audio signal to obtain at least one sound source signal; and identifying the at least one sound source signal and determining the at least one wanted signal. In this application, a wanted signal may be determined from an ambient audio signal in real time, to ensure that when the user performs active noise cancellation, content of interest can be dynamically retained.

In a possible implementation, the performing signal separation on the ambient audio signal to obtain at least one sound source signal includes: performing short-time Fourier transform on the ambient audio signal to obtain an ambient audio frequency domain signal; obtaining a sound source frequency domain signal through a separation network based on the ambient audio frequency domain signal, where the separation network is formed by an impulse response of a separation filter; and performing inverse short-time Fourier transform on the sound source frequency domain signal to obtain at least one sound source signal in time domain.

In a possible implementation, the identifying the at least one sound source signal to determine the at least one wanted signal includes: identifying a keyword of the at least one sound source signal, and determining, from the at least one sound source signal, the at least one wanted signal that includes a preset keyword; or performing voiceprint matching on the at least one sound source signal, and determining, from the at least one sound source signal, the at least one wanted signal that matches a preset voiceprint.

In a possible implementation, the identifying a keyword of the at least one sound source signal, and determining, from the at least one sound source signal, at least one wanted signal including a preset keyword includes: performing pre-emphasis and frame division and windowing on each sound source signal of the at least one sound source signal by using a high-pass filter, to obtain a plurality of frame signals corresponding to each sound source signal; performing fast Fourier transform on the plurality of frame signals to obtain a spectral characteristic corresponding to each sound source signal; obtaining a logarithm after the spectral characteristic is filtered by a Mel filter, to obtain a Mel frequency logarithmic energy spectrum corresponding to each sound source signal; performing discrete cosine transform on the Mel frequency logarithmic energy spectrum to obtain a Mel coefficient corresponding to each sound source signal; calculating a cosine distance between the Mel coefficient corresponding to each sound source signal and a Mel coefficient of the preset keyword; and when the cosine distance is greater than or equal to a cosine distance threshold, using the sound source signal as a wanted signal. In this application, a keyword is identified, to ensure that an audio signal including the keyword is retained while active noise cancellation is performed.

In a possible implementation, the performing voiceprint matching on at least one sound source signal, and determining, from the at least one sound source signal, at least one wanted signal that matches a preset voiceprint includes: preprocessing each sound source signal in the at least one sound source signal to obtain a plurality of frame signals corresponding to each sound source signal; performing fast Fourier transform on the plurality of frame signals to obtain a spectral characteristic corresponding to each sound source signal; obtaining a logarithm after the spectral characteristic is filtered by a Mel filter, to obtain a Mel frequency logarithmic energy spectrum corresponding to each sound source signal; performing discrete cosine transform on the Mel frequency logarithmic energy spectrum to obtain a Mel coefficient corresponding to each sound source signal; calculating a similarity between the Mel coefficient corresponding to each sound source signal and a preset voiceprint feature Mel coefficient; and when the similarity is greater than or equal to a similarity threshold, using the sound source signal as a wanted signal. In this application, a voiceprint is identified, to ensure that a specific human voice or a specific melody of interest is retained while active noise cancellation is performed.

In a possible implementation, the determining at least one wanted signal includes: determining at least one preset frequency and/or frequency band; and removing the at least one wanted signal from the ambient audio signal, to obtain a reference signal includes: processing the ambient audio signal, and removing the at least one preset frequency and/or frequency band to obtain the reference signal. In this application, filtering of a specific frequency may be further performed on the captured ambient signal, to ensure that after active noise cancellation, a user can still perceive an audio signal of a specific frequency.

In a possible implementation, the processing the ambient audio signal to remove the at least one preset frequency and/or frequency band to obtain the reference signal includes: removing, by using a band-pass filter, a sound of the at least one preset frequency and/or frequency band from each sound source signal of the ambient audio signal or the at least one sound source signal, to obtain the ambient audio signal or the reference signal corresponding to each sound source signal. In this application, filtering is performed on a specific frequency-domain frequency, to ensure that an audio signal of a specific frequency is retained while active noise cancellation is performed.

In a possible implementation, the determining at least one wanted signal includes: determining a working status of the collaboration device or the headset; and determining, based on a preset correspondence between a working status and a wanted signal, at least one wanted signal related to the working status. In this application, a working status may be further determined, and a wanted signal that is corresponding to the working status and of interest may be determined based on the working status.

In a possible implementation, the determining a working status of the collaboration device or the headset includes: determining a working scenario of the collaboration device or the headset, and/or determining a working mode of the collaboration device or the headset. In this application, content of interest in different cases may be determined from two aspects: a working scenario and a working mode.

In a possible implementation, the determining a working scenario of the collaboration device or the headset includes: obtaining environment information of the collaboration device or the headset; and determining, based on a preset correspondence between environment information and a working scenario, the working scenario of the collaboration device or the headset that is corresponding to the environment information of the collaboration device or the headset. In this application, a possible working scenario of the user may be determined based on current environment information, so that the device may determine corresponding content of interest based on the working scenario.

In a possible implementation, the environment information includes at least one of the following: geographical location information, an ambient audio signal, or an ambient video signal.

In a possible implementation, the determining a working scenario of the collaboration device or the headset further includes: determining one or more of a historical habit preference of a user, a current trip, current time information, or a device status of the collaboration device and/or a device status of the headset. The determining, based on a preset correspondence between environment information and a working scenario, a working scenario of the collaboration device or the headset corresponding to environment information of the collaboration device or the headset includes: determining, based on the environment information and with reference to one or more of the historical habit preference of the user, the current trip, the current time information, or the device status of the collaboration device or the headset, the working scenario of the collaboration device or the headset corresponding to the environment information of the collaboration device or the headset. In this application, content that the user may be currently interested in may be determined based on an environment and with reference to other information of the user.

In a possible implementation, the determining a working mode of the collaboration device or the headset includes: The collaboration device or the headset receives a first input instruction, where the first input instruction indicates a selected working mode from a plurality of working modes prestored in the collaboration device or the headset; and determines the working mode of the collaboration device or the headset based on the first input instruction, where the working mode is a working mode in an active noise cancellation mode.

In a possible implementation, if the method is applied to the collaboration device, the method further includes: receiving a working mode of the headset sent by the headset; and using the working mode of the headset as the working mode of the collaboration device; or determining the working mode of the collaboration device based on the first input instruction and the working mode of the headset.

In a possible implementation, if the method is applied to the headset, the method further includes: receiving the working mode of the collaboration device sent by the collaboration device; using the working mode of the collaboration device as the working mode of the headset; or determining the working mode of the headset based on the first input instruction and the working mode of the collaboration device.

In a possible implementation, the removing the at least one wanted signal from the ambient audio signal, to obtain the reference signal includes: removing the at least one wanted signal from the ambient audio signal through adaptive filtering, to obtain the reference signal; or removing the at least one wanted signal from the ambient audio signal through spectral subtraction, to obtain the reference signal. In this application, the wanted signal is removed from the ambient audio signal, to ensure that the reference signal does not include the wanted signal of interest, so that during active noise cancellation, noise can be canceled and content of interest can be retained.

In a possible implementation, before the removing the at least one wanted signal from the ambient audio signal, the method further includes: performing band-pass filtering on the at least one wanted signal to obtain at least one filtered wanted signal. In this application, the wanted signal may be further filtered out, to filter out a high-frequency wanted signal, thereby reducing power consumption of a device and reducing noise cancellation on a high frequency.

In a possible implementation, before the performing band-pass filtering on the at least one wanted signal, the method further includes: obtaining a preset band-pass filtering range; or determining a band-pass filtering range in a working status based on a working status; or determining power level information of the collaboration device or the headset, and determining the band-pass filtering range based on the power level information of the collaboration device or the headset.

In a possible implementation, the capturing an ambient sound includes: omnidirectional capturing; or capturing in a specific direction by controlling a microphone array. In this application, directional capturing may be further performed on the audio signal, so that the reference signal that does not include the wanted signal can be obtained more quickly.

In a possible implementation, the method further includes: if the microphone array is controlled to perform capturing in a specific direction, determining a wanted signal based on a captured audio signal in at least one direction, where a direction of a reference signal obtained based on the wanted signal is inconsistent with a direction of the wanted signal; or if the microphone array is controlled to perform capturing in a specific direction, determining a reference signal based on a captured audio signal in at least one direction.

In a possible implementation, if the method is applied to the collaboration device, the capturing an ambient sound around the collaboration device or the headset, and determining an ambient audio signal includes: The collaboration device captures an ambient sound around the collaboration device or the headset, and uses the captured sound as the ambient audio signal; or the collaboration device receives an ambient audio signal sent by the headset, where the ambient audio signal is an ambient sound around the headset that is captured by the headset.

In a possible implementation, if the method is applied to the headset, the capturing an ambient sound around the collaboration device or the headset, and determining an ambient audio signal includes: The headset captures an ambient sound around the collaboration device, and uses the captured sound as the ambient audio signal; or the headset receives an ambient audio signal sent by the collaboration device, where the ambient audio signal is an ambient sound around the collaboration device that is captured by the collaboration device.

In a possible implementation, the determining a to-be-played signal includes: determining a phase-inverted signal of the ambient audio signal based on the reference signal and the active noise cancellation architecture, and using the phase-inverted signal of the ambient audio signal as the to-be-played signal.

In a possible implementation, the determining a phase-inverted signal of the ambient audio signal based on the reference signal and an active noise cancellation architecture includes: determining the phase-inverted signal of the ambient audio signal based on the reference signal and a weight coefficient of the adaptive filter.

In a possible implementation, the method further includes: capturing a sound field feature of a quiet zone of the headset; and determining an updated weight coefficient based on the sound field feature, the weight coefficient of the adaptive filter, and the reference signal, to determine a phase-inverted signal of the ambient audio signal next time.

In a possible implementation, the method further includes: if the method is applied to the collaboration device, sending the to-be-played signal to the headset.

According to a fourth aspect, an active noise cancellation system is provided, where the system includes a collaboration device and a headset. The collaboration device is configured to determine a working status of the collaboration device or the headset; the collaboration device is further configured to determine, based on a preset correspondence between a working status and a wanted signal, at least one wanted signal related to the working status, where the wanted signal includes target content; and the collaboration device is further configured to send the at least one wanted signal to the headset. The headset is configured to receive the at least one wanted signal; and the headset is further configured to capture an ambient sound around the headset, and determine an ambient audio signal of the headset. The headset is further configured to remove the at least one received wanted signal from the ambient audio signal of the headset, to obtain a reference signal. The headset is further configured to determine a to-be-played signal based on the reference signal and an active noise cancellation architecture. The headset is further configured to play the to-be-played signal, so that the to-be-played signal is superimposed with the ambient sound around the headset, to cancel ambient noise, and retain target content. In this application, the collaboration device determines the working status, and determines, based on the working status, the wanted signal of interest and that corresponds to the working status, and then the collaboration device sends the wanted signal to the headset, so that the headset removes the wanted signal from an ambient signal of the headset. In this way, when the headset performs active noise cancellation, noise can be canceled and the wanted signal of interest in the corresponding working status can be retained.

In a possible implementation, the collaboration device is further configured to: determine a working scenario of the collaboration device or the headset, and/or determine a working mode of the collaboration device or the headset. In this application, the collaboration device may determine, from two aspects: a working scenario and a working mode, content of interest in different cases.

In a possible implementation, the collaboration device is further configured to obtain first environment information of the collaboration device; and/or the headset is further configured to obtain second environment information, and send the second environment information to the collaboration device; the collaboration device is further configured to receive the second environment information sent by the headset; and the collaboration device is further configured to determine a corresponding working scenario of the collaboration device or the headset based on a correspondence between a working scenario and one or more of the preset first environment information and the preset second environment information. In this application, the collaboration device may determine a possible working scenario of the user with reference to current environment information, to determine corresponding content of interest based on the working scenario.

In a possible implementation, the collaboration device is further configured to: obtain first environment information of the collaboration device, and send the first environment information to the headset; the headset is further configured to receive the first environment information sent by the collaboration device; and/or the headset is further configured to obtain second environment information; the headset is further configured to determine a corresponding working scenario of the collaboration device or the headset based on a correspondence between the working scenario and one or more of the preset first environment information and the preset second environment information, and send the working scenario of the collaboration device or the headset to the collaboration device. In this application, the headset may determine a possible working scenario of a user with reference to current environment information, and send the possible working scenario to the collaboration device, so that the collaboration device determines corresponding content of interest based on the working scenario.

In a possible implementation, the first environment information includes at least one of the following: geographical location information of the collaboration device, an ambient audio signal of the collaboration device, or an ambient video signal of the collaboration device; and the second environment information includes at least one of the following: geographical location information of the headset, an ambient audio signal of the headset, or an ambient video signal of the headset.

In a possible implementation, the headset is further configured to: determine a device status of the headset, and send the device status of the headset to the collaboration device; the collaboration device is further configured to receive the device status of the headset sent by the headset; and/or the collaboration device is further configured to determine one or more of a historical habit preference of the user, a current trip, current time information, or a device status of the collaboration device; the collaboration device is further configured to determine the working scenario of the collaboration device or the headset based on the first environment information and/or the second environment information and with reference to one or more of the historical habit preference of the user, the current trip, the current time information, the device status of the collaboration device, and the device status of the headset. In this application, the collaboration device may further determine, based on an environment and with reference to other information of the user, content that the user may be currently interested in.

In a possible implementation, the collaboration device is further configured to: determine a device status of the collaboration device, and send the device status of the collaboration device to the headset; the headset is further configured to receive the device status of the collaboration device sent by the collaboration device; and/or the headset is further configured to determine one or more of a historical habit preference of the user, a current trip, current time information, or a device status of the headset. The headset is further configured to: determine a working scenario of the collaboration device or the headset based on the first environment information and/or the second environment information and with reference to one or more of the historical habit preference of the user, the current trip, the current time information, the device status of the collaboration device, and the device status of the headset, and send the working scenario of the collaboration device or the headset to the collaboration device. In this application, the headset may further determine, based on an environment and with reference to other information of the user, content that the user may be currently interested in.

In a possible implementation, the collaboration device is further configured to: receive a first input instruction, where the first input instruction indicates a selected working mode from a plurality of working modes prestored in the collaboration device; and determine the working mode of the collaboration device based on the first input instruction, where the working mode is the working mode in an active noise cancellation mode.

In a possible implementation, the collaboration device is further configured to: receive the working mode of the headset sent by the headset; and use the working mode of the headset as the working mode of the collaboration device; or determine the working mode of the collaboration device based on the first input instruction and the working mode of the headset.

In a possible implementation, the headset is further configured to: receive a first input instruction, where the first input instruction indicates a selected working mode from a plurality of working modes prestored in the headset; determine the working mode of the headset based on the first input instruction, where the working mode is a working mode in an active noise cancellation mode; and send the working mode of the headset to the collaboration device.

In a possible implementation, the headset is further configured to: receive the working mode of the collaboration device sent by the collaboration device; use the working mode of the collaboration device as the working mode of the headset; or determine the working mode of the headset based on the first input instruction and the working mode of the collaboration device.

In a possible implementation, the collaboration device is further configured to determine at least one prestored wanted signal related to the working status.

In a possible implementation, the collaboration device is further configured to: capture an ambient sound of an environment around the collaboration device, and determine an ambient audio signal of the collaboration device; and determine, based on the ambient audio signal of the collaboration device, at least one wanted signal related to the working status.

In a possible implementation, the collaboration device is further configured to: perform signal separation on the ambient audio signal of the collaboration device to obtain at least one sound source signal; and identify the at least one sound source signal, and determine the at least one wanted signal related to the working status. In this application, a wanted signal may be determined from an ambient audio signal in real time, to ensure that when the user performs active noise cancellation, content of interest can be dynamically retained.

In a possible implementation, the collaboration device is further configured to: perform short-time Fourier transform on the ambient audio signal to obtain an ambient audio frequency domain signal; obtain a sound source frequency domain signal by using a separation network based on the ambient audio frequency domain signal, where the separation network is formed by an impulse response of a separation filter; and perform inverse short-time Fourier transform on the sound source frequency domain signal to obtain at least one sound source signal in time domain.

In a possible implementation, the collaboration device is further configured to: identify a keyword of the at least one sound source signal, and determine, from the at least one sound source signal, at least one wanted signal that includes a preset keyword related to the working status; or perform voiceprint matching on the at least one sound source signal, and determine, from the at least one sound source signal, at least one wanted signal that matches a preset voiceprint related to the working status.

In a possible implementation, the collaboration device is further configured to: perform pre-emphasis and frame-based windowing on each sound source signal of the at least one sound source signal by using a high-pass filter, to obtain a plurality of frame signals corresponding to each sound source signal; perform fast Fourier transform on the plurality of frame signals, to obtain a spectral characteristic corresponding to each sound source signal; obtain a logarithmic energy spectrum of a Mel frequency corresponding to each sound source signal after filtering by a Mel filter; perform discrete cosine transform on the Mel frequency logarithmic energy spectrum to obtain a Mel coefficient corresponding to each sound source signal; calculate a cosine distance between the Mel coefficient corresponding to each sound source signal and a Mel coefficient of the preset keyword; and when the cosine distance is greater than or equal to a cosine distance threshold, use the sound source signal as a wanted signal. In this application, a keyword is identified, to ensure that an audio signal including the keyword is retained while active noise cancellation is performed.

In a possible implementation, the collaboration device is further configured to: preprocess each sound source signal of the at least one sound source signal to obtain a plurality of frame signals corresponding to each sound source signal; perform fast Fourier transform on the plurality of frame signals to obtain a spectral characteristic corresponding to each sound source signal; obtain a logarithmic energy spectrum of a Mel frequency corresponding to each sound source signal after filtering the spectral characteristic by a Mel filter; perform discrete cosine transform on the Mel frequency logarithmic energy spectrum to obtain a Mel coefficient corresponding to each sound source signal; calculate a similarity between the Mel coefficient corresponding to each sound source signal and a preset voiceprint feature Mel coefficient; and when the similarity is greater than or equal to a similarity threshold, use the sound source signal as a wanted signal. In this application, a voiceprint is identified, to ensure that a specific human voice or a specific melody of interest is retained while active noise cancellation is performed.

In a possible implementation, the collaboration device is further configured to: determine, based on a preset correspondence between a working status and a frequency and/or a frequency band, at least one preset frequency and/or frequency band related to the working status; and process the ambient audio signal, and remove the at least one preset frequency and/or frequency band to obtain the reference signal. In this application, filtering of a specific frequency may be further performed on the captured ambient signal, to ensure that after active noise cancellation, the user can still perceive an audio signal of a specific frequency.

In a possible implementation, the headset is further configured to: remove a sound of at least one preset frequency and/or frequency band from the ambient audio signal of the headset by using a band-pass filter, to obtain a reference signal corresponding to the ambient audio signal of the headset. In this application, filtering is performed on a specific frequency-domain frequency, to ensure that an audio signal of a specific frequency is retained while active noise cancellation is performed.

In a possible implementation, the headset is further configured to: remove the at least one wanted signal from the ambient audio signal of the headset by using adaptive filtering, to obtain the reference signal; or remove the at least one wanted signal from the ambient audio signal of the headset by using a spectral subtraction method, to obtain the reference signal. In this application, the wanted signal is removed from the ambient audio signal, to ensure that the reference signal does not include the wanted signal of interest, so that during active noise cancellation, noise can be canceled and content of interest can be retained.

In a possible implementation, the headset is further configured to perform band-pass filtering on the at least one wanted signal to obtain at least one filtered wanted signal; or the collaboration device is further configured to perform band-pass filtering on the at least one wanted signal to obtain at least one filtered wanted signal; and the collaboration device is further configured to send the at least one filtered wanted signal to the headset; the headset is further configured to receive the at least one filtered wanted signal, so that the headset determines the reference signal based on the at least one filtered wanted signal.

In a possible implementation, the headset is further configured to: obtain a preset band-pass filtering range; or determine a band-pass filtering range in a working status based on a working status; or determine power level information of the headset, and determine a band-pass filtering range based on the power level information of the headset; or the collaboration device is further configured to obtain a preset band-pass filtering range; or determine a band-pass filtering range in a working status based on the working status; or determine power level information of the collaboration device, and determine a band-pass filtering range based on the power level information of the collaboration device.

In a possible implementation, the collaboration device is further configured to: omnidirectionally capture an ambient sound of the environment around the collaboration device; or control a microphone array to perform capturing in a specific direction. In this application, directional capturing may be further performed on the audio signal, so that the reference signal that does not include the wanted signal can be obtained more quickly.

In a possible implementation, the collaboration device is further configured to: if the microphone array is controlled to perform capturing in a specific direction, determine at least one wanted signal based on a captured audio signal in at least one direction, where a direction of a reference signal obtained based on the wanted signal is inconsistent with a direction of the wanted signal; or if the microphone array is controlled to perform capturing in a specific direction, determine the reference signal based on a captured audio signal in at least one direction, and send the reference signal to the headset, so that the headset determines the to-be-played signal based on the received reference signal.

In a possible implementation, the headset is further configured to: determine, based on the reference signal and the active noise cancellation architecture, a phase-inverted signal of the ambient audio signal of the headset, and use the phase-inverted signal as the to-be-played signal.

In a possible implementation, the headset is further configured to determine a phase-inverted signal of the ambient audio signal of the headset based on the reference signal and the weight coefficient of the adaptive filter.

In a possible implementation, the headset is further configured to: capture a sound field feature of a quiet zone of the headset; and determine an updated weight coefficient based on the sound field feature, the weight coefficient of the adaptive filter, and the reference signal, to determine a phase-inverted signal of the ambient audio signal of the headset next time.

According to a fifth aspect, an active noise cancellation system is provided, where the system includes a collaboration device and a headset. The collaboration device is configured to determine at least one wanted signal, where the wanted signal includes target content; and the collaboration device is further configured to send the at least one wanted signal to the headset; or the collaboration device is further configured to perform band-pass filtering on the at least one wanted signal to obtain at least one filtered wanted signal, and send the at least one filtered wanted signal to the headset. The headset is configured to receive the at least one wanted signal, or receive the at least one filtered wanted signal; and if the headset receives the at least one wanted signal, perform band-pass filtering on the received at least one wanted signal to obtain at least one filtered wanted signal. The headset is further configured to capture an ambient sound around the headset, and determine an ambient audio signal of the headset; and the headset is further configured to remove the at least one filtered wanted signal from the ambient audio signal of the headset to obtain a reference signal; and the headset is further configured to determine a to-be-played signal based on the reference signal and an active noise cancellation architecture. The headset is further configured to play the to-be-played signal, so that the to-be-played signal is superimposed with an ambient sound around the headset, to cancel ambient noise and retain the target content. In this application, the collaboration device determines the wanted signal of interest, and then performs band-pass filtering on the wanted signal, to remove a high-frequency part with an undesirable noise cancellation effect. The filtered wanted signal is sent to the headset, so that the headset may remove the filtered wanted signal from the ambient signal. Therefore, when active noise cancellation is performed, the headset can cancel noise and retain the wanted signal of interest in the corresponding working status.

In a possible implementation, the collaboration device is further configured to: determine a working status of the collaboration device or the headset; and determine, based on a preset correspondence between a working status and a wanted signal, at least one wanted signal related to the working status. The collaboration device in this application may further determine a working status, and determine, based on the working status, a wanted signal that is corresponding to the working status and of interest.

In a possible implementation, the collaboration device is further configured to: determine a working scenario of the collaboration device or the headset, and/or determine a working mode of the collaboration device or the headset. In this application, the collaboration device may determine, from two aspects: a working scenario and a working mode, content of interest in different cases.

In a possible implementation, the collaboration device is further configured to obtain first environment information of the collaboration device; and/or the headset is further configured to obtain second environment information, and send the second environment information to the collaboration device; the collaboration device is further configured to receive the second environment information sent by the headset; and the collaboration device is further configured to determine a corresponding working scenario of the collaboration device or the headset based on a correspondence between a working scenario and one or more of the preset first environment information and the preset second environment information. In this application, the collaboration device may determine a possible working scenario of the user with reference to current environment information, to determine corresponding content of interest based on the working scenario.

In a possible implementation, the collaboration device is further configured to: obtain first environment information of the collaboration device, and send the first environment information to the headset; the headset is further configured to receive the first environment information sent by the collaboration device; and/or the headset is further configured to obtain second environment information; the headset is further configured to determine a corresponding working scenario of the collaboration device or the headset based on a correspondence between the working scenario and one or more of the preset first environment information and the preset second environment information, and send the working scenario of the collaboration device or the headset to the collaboration device. In this application, the headset may determine a possible working scenario of a user with reference to current environment information, and send the possible working scenario to the collaboration device, so that the collaboration device determines corresponding content of interest based on the working scenario.

In a possible implementation, the first environment information includes at least one of the following: geographical location information of the collaboration device, an ambient audio signal of the collaboration device, or an ambient video signal of the collaboration device; and the second environment information includes at least one of the following: geographical location information of the headset, an ambient audio signal of the headset, or an ambient video signal of the headset.

In a possible implementation, the headset is further configured to: determine a device status of the headset, and send the device status of the headset to the collaboration device; the collaboration device is further configured to receive the device status of the headset sent by the headset; and/or the collaboration device is further configured to determine one or more of a historical habit preference of the user, a current trip, current time information, or a device status of the collaboration device; the collaboration device is further configured to determine the working scenario of the collaboration device or the headset based on the first environment information and/or the second environment information and with reference to one or more of the historical habit preference of the user, the current trip, the current time information, the device status of the collaboration device, and the device status of the headset. In this application, the collaboration device may further determine, based on an environment and with reference to other information of the user, content that the user may be currently interested in.

In a possible implementation, the collaboration device is further configured to: determine a device status of the collaboration device, and send the device status of the collaboration device to the headset; the headset is further configured to receive the device status of the collaboration device sent by the collaboration device; and/or the headset is further configured to determine one or more of a historical habit preference of the user, a current trip, current time information, or a device status of the headset. The headset is further configured to: determine a working scenario of the collaboration device or the headset based on the first environment information and/or the second environment information and with reference to one or more of the historical habit preference of the user, the current trip, the current time information, the device status of the collaboration device, and the device status of the headset, and send the working scenario of the collaboration device or the headset to the collaboration device. In this application, the headset may further determine, based on an environment and with reference to other information of the user, content that the user may be currently interested in.

In a possible implementation, the collaboration device is further configured to: receive a first input instruction, where the first input instruction indicates a selected working mode from a plurality of working modes prestored in the collaboration device; and determine the working mode of the collaboration device based on the first input instruction, where the working mode is the working mode in an active noise cancellation mode.

In a possible implementation, the collaboration device is further configured to: receive the working mode of the headset sent by the headset; and use the working mode of the headset as the working mode of the collaboration device; or determine the working mode of the collaboration device based on the first input instruction and the working mode of the headset.

In a possible implementation, the headset is further configured to: receive a first input instruction, where the first input instruction indicates a selected working mode from a plurality of working modes prestored in the headset; determine the working mode of the headset based on the first input instruction, where the working mode is a working mode in an active noise cancellation mode; and send the working mode of the headset to the collaboration device.

In a possible implementation, the headset is further configured to: receive the working mode of the collaboration device sent by the collaboration device; use the working mode of the collaboration device as the working mode of the headset; or determine the working mode of the headset based on the first input instruction and the working mode of the collaboration device.

In a possible implementation, if the headset receives at least one wanted signal, the headset is further configured to: obtain a preset band-pass filtering range; or determine a band-pass filtering range in a working status based on the working status; or determine power level information of the headset, and determine a band-pass filtering range based on the power level information of the headset. Alternatively, if the headset receives the at least one filtered wanted signal, the collaboration device is further configured to obtain a preset band-pass filtering range; or determine a band-pass filtering range in the working status based on the working status; or determine power level information of the collaboration device, and determine a band-pass filtering range based on the power level information of the collaboration device.

In a possible implementation, the collaboration device is further configured to determine at least one prestored wanted signal.

In a possible implementation, the collaboration device is further configured to: capture an ambient sound of an environment around the collaboration device, and determine an ambient audio signal of the collaboration device; and determine the at least one wanted signal based on the ambient audio signal of the collaboration device.

In a possible implementation, the collaboration device is further configured to: perform signal separation on the ambient audio signal of the collaboration device to obtain at least one sound source signal; and identify the at least one sound source signal and determine the at least one wanted signal. In this application, a wanted signal may be determined from an ambient audio signal in real time, to ensure that when the user performs active noise cancellation, content of interest can be dynamically retained.

In a possible implementation, the collaboration device is further configured to: perform short-time Fourier transform on the ambient audio signal to obtain an ambient audio frequency domain signal; obtain a sound source frequency domain signal by using a separation network based on the ambient audio frequency domain signal, where the separation network is formed by an impulse response of a separation filter; and perform inverse short-time Fourier transform on the sound source frequency domain signal to obtain at least one sound source signal in time domain.

In a possible implementation, the collaboration device is further configured to: identify a keyword of the at least one sound source signal, and determine, from the at least one sound source signal, at least one wanted signal that includes a preset keyword; or perform voiceprint matching on the at least one sound source signal, and determine, from the at least one sound source signal, at least one wanted signal that matches a preset voiceprint.

In a possible implementation, the collaboration device is further configured to: perform pre-emphasis and frame-based windowing on each sound source signal of the at least one sound source signal by using a high-pass filter, to obtain a plurality of frame signals corresponding to each sound source signal; perform fast Fourier transform on the plurality of frame signals, to obtain a spectral characteristic corresponding to each sound source signal; obtain a logarithmic energy spectrum of a Mel frequency corresponding to each sound source signal after filtering by a Mel filter; perform discrete cosine transform on the Mel frequency logarithmic energy spectrum to obtain a Mel coefficient corresponding to each sound source signal; calculate a cosine distance between the Mel coefficient corresponding to each sound source signal and the Mel coefficient of the preset keyword; and when the cosine distance is greater than or equal to a cosine distance threshold, use the sound source signal as a wanted signal. In this application, a keyword is identified, to ensure that an audio signal including the keyword is retained while active noise cancellation is performed.

In a possible implementation, the collaboration device is further configured to: preprocess each sound source signal of the at least one sound source signal to obtain a plurality of frame signals corresponding to each sound source signal; perform fast Fourier transform on the plurality of frame signals to obtain a spectral characteristic corresponding to each sound source signal; obtain a logarithmic energy spectrum of a Mel frequency corresponding to each sound source signal after filtering the spectral characteristic by a Mel filter; perform discrete cosine transform on the Mel frequency logarithmic energy spectrum to obtain a Mel coefficient corresponding to each sound source signal; calculate a similarity between the Mel coefficient corresponding to each sound source signal and a preset voiceprint feature Mel coefficient; and when the similarity is greater than or equal to a similarity threshold, use the sound source signal as a wanted signal. In this application, a voiceprint is identified, to ensure that a specific human voice or a specific melody of interest is retained while active noise cancellation is performed.

In a possible implementation, the collaboration device is further configured to: determine at least one preset frequency and/or frequency band related to the working status; and process the ambient audio signal of the collaboration device, and remove the at least one preset frequency and/or frequency band, to obtain the reference signal. In this application, filtering of a specific frequency may be further performed on the captured ambient signal, to ensure that after active noise cancellation, the user can still perceive an audio signal of a specific frequency.

In a possible implementation, the headset is further configured to: remove, by using a band-pass filter, a sound of at least one preset frequency and/or frequency band from the ambient audio signal of the headset, to obtain a reference signal corresponding to the ambient audio signal of the headset. In this application, filtering is performed on a specific frequency-domain frequency, to ensure that an audio signal of a specific frequency is retained while active noise cancellation is performed.

In a possible implementation, the headset is further configured to: remove the at least one wanted signal from the ambient audio signal of the headset by using adaptive filtering, to obtain the reference signal; or remove the at least one wanted signal from the ambient audio signal of the headset by using a spectral subtraction method, to obtain the reference signal. In this application, the wanted signal is removed from the ambient audio signal, to ensure that the reference signal does not include the wanted signal of interest, so that during active noise cancellation, noise can be canceled and content of interest can be retained.

In a possible implementation, the collaboration device is further configured to: omnidirectionally capture an ambient sound of the environment around the collaboration device; or control a microphone array to perform capturing in a specific direction. In this application, directional capturing may be further performed on the audio signal, so that the reference signal that does not include the wanted signal can be obtained more quickly.

In a possible implementation, the collaboration device is further configured to: if the microphone array is controlled to perform capturing in a specific direction, determine at least one wanted signal based on a captured audio signal in at least one direction, where a direction of a reference signal obtained based on the wanted signal is inconsistent with a direction of the wanted signal; or if the microphone array is controlled to perform capturing in a specific direction, determine the reference signal based on a captured audio signal in at least one direction, and send the reference signal to the headset, so that the headset determines the to-be-played signal based on the received reference signal.

In a possible implementation, the headset is further configured to: determine, based on the reference signal and the active noise cancellation architecture, a phase-inverted signal of the ambient audio signal of the headset, and use the phase-inverted signal as the to-be-played signal.

In a possible implementation, the headset is further configured to determine a phase-inverted signal of the ambient audio signal of the headset based on the reference signal and the weight coefficient of the adaptive filter.

In a possible implementation, the headset is further configured to: capture a sound field feature of a quiet zone of the headset; and determine an updated weight coefficient based on the sound field feature, the weight coefficient of the adaptive filter, and the reference signal, to determine a phase-inverted signal of the ambient audio signal of the headset next time.

According to a sixth aspect, an active noise cancellation system is provided, where the system includes a collaboration device and a headset. The collaboration device is configured to send at least one wanted signal to the headset, where the wanted signal includes target content. The headset is configured to receive the at least one wanted signal; the headset is further configured to capture an ambient sound of an environment around the headset, and determine a second ambient audio signal; and the headset is further configured to remove the received at least one wanted signal from the second ambient audio signal to obtain a reference signal; the headset is further configured to determine a to-be-played signal based on the reference signal and an active noise cancellation architecture; and the headset is further configured to play the to-be-played signal, so that the to-be-played signal is superimposed with the ambient sound, to cancel the ambient noise and retain the target content. In this application, a wanted signal in which a user is interested is determined, and the wanted signal is removed from the reference signal. In this way, when active noise cancellation is performed, noise can be canceled and the wanted signal of interest can be retained.

In a possible implementation, the collaboration device is further configured to determine at least one prestored wanted signal.

In a possible implementation, the collaboration device is further configured to: capture an ambient sound of an environment around the collaboration device, and determine a first ambient audio signal; and determine at least one wanted signal based on the first ambient audio signal.

In a possible implementation, the collaboration device is further configured to: perform signal separation on the first ambient audio signal to obtain at least one sound source signal; and identify the at least one sound source signal and determine the at least one wanted signal. In this application, a wanted signal may be determined from an ambient audio signal in real time, to ensure that when the user performs active noise cancellation, content of interest can be dynamically retained.

In a possible implementation, the collaboration device is further configured to: perform short-time Fourier transform on the first ambient audio signal to obtain an ambient audio frequency domain signal; obtain a sound source frequency domain signal by using a separation network based on the ambient audio frequency domain signal, where the separation network is formed by an impulse response of a separation filter; and perform inverse short-time Fourier transform on the sound source frequency domain signal to obtain at least one sound source signal in time domain.

In a possible implementation, the collaboration device is further configured to: identify a keyword of the at least one sound source signal, and determine, from the at least one sound source signal, at least one wanted signal that includes a preset keyword; or perform voiceprint matching on the at least one sound source signal, and determine, from the at least one sound source signal, at least one wanted signal that matches a preset voiceprint.

In a possible implementation, the collaboration device is further configured to: perform pre-emphasis and frame-based windowing on each sound source signal of the at least one sound source signal by using a high-pass filter, to obtain a plurality of frame signals corresponding to each sound source signal; perform fast Fourier transform on the plurality of frame signals, to obtain a spectral characteristic corresponding to each sound source signal; obtain a logarithmic energy spectrum of a Mel frequency corresponding to each sound source signal after filtering by a Mel filter; perform discrete cosine transform on the Mel frequency logarithmic energy spectrum to obtain a Mel coefficient corresponding to each sound source signal; calculate a cosine distance between the Mel coefficient corresponding to each sound source signal and the Mel coefficient of the preset keyword; and when the cosine distance is greater than or equal to a cosine distance threshold, use the sound source signal as a wanted signal. In this application, a keyword is identified, to ensure that an audio signal including the keyword is retained while active noise cancellation is performed.

In a possible implementation, the collaboration device is further configured to: preprocess each sound source signal of the at least one sound source signal to obtain a plurality of frame signals corresponding to each sound source signal; perform fast Fourier transform on the plurality of frame signals to obtain a spectral characteristic corresponding to each sound source signal; obtain a logarithmic energy spectrum of a Mel frequency corresponding to each sound source signal after filtering the spectral characteristic by a Mel filter; perform discrete cosine transform on the Mel frequency logarithmic energy spectrum to obtain a Mel coefficient corresponding to each sound source signal; calculate a similarity between the Mel coefficient corresponding to each sound source signal and a preset voiceprint feature Mel coefficient; and when the similarity is greater than or equal to a similarity threshold, use the sound source signal as a wanted signal. In this application, a voiceprint is identified, to ensure that a specific human voice or a specific melody of interest is retained while active noise cancellation is performed.

In a possible implementation, the collaboration device is further configured to: determine at least one preset frequency and/or frequency band; and process the ambient audio signal, to remove the at least one preset frequency and/or frequency band, to obtain the reference signal. In this application, filtering of a specific frequency may be further performed on the captured ambient signal, to ensure that after active noise cancellation, the user can still perceive an audio signal of a specific frequency.

In a possible implementation, the headset is further configured to: remove a sound of at least one preset frequency and/or frequency band from the ambient audio signal of the headset by using a band-pass filter, to obtain a reference signal corresponding to the ambient audio signal of the headset. In this application, filtering is performed on a specific frequency-domain frequency, to ensure that an audio signal of a specific frequency is retained while active noise cancellation is performed.

In a possible implementation, the collaboration device is further configured to: determine a working scenario of the collaboration device or the headset, and/or determine a working mode of the collaboration device or the headset. In this application, the collaboration device may determine, from two aspects: a working scenario and a working mode, content of interest in different cases.

In a possible implementation, the collaboration device is further configured to obtain first environment information of the collaboration device; and/or the headset is further configured to obtain second environment information, and send the second environment information to the collaboration device; the collaboration device is further configured to receive the second environment information sent by the headset; and the collaboration device is further configured to determine a corresponding working scenario of the collaboration device or the headset based on a correspondence between a working scenario and one or more of the preset first environment information and the preset second environment information. In this application, the collaboration device may determine a possible working scenario of the user with reference to current environment information, to determine corresponding content of interest based on the working scenario.

In a possible implementation, the collaboration device is further configured to: obtain first environment information of the collaboration device, and send the first environment information to the headset; the headset is further configured to receive the first environment information sent by the collaboration device; and/or the headset is further configured to obtain second environment information; the headset is further configured to determine a corresponding working scenario of the collaboration device or the headset based on a correspondence between the working scenario and one or more of the preset first environment information and the preset second environment information, and send the working scenario of the collaboration device or the headset to the collaboration device. In this application, the headset may determine a possible working scenario of the user with reference to current environment information, and send the possible working scenario to the collaboration device, so that the collaboration device determines corresponding content of interest based on the working scenario.

In a possible implementation, the first environment information includes at least one of the following: geographical location information of the collaboration device, an ambient audio signal of the collaboration device, or an ambient video signal of the collaboration device; and the second environment information includes at least one of the following: geographical location information of the headset, an ambient audio signal of the headset, or an ambient video signal of the headset.

In a possible implementation, the headset is further configured to: determine a device status of the headset, and send the device status of the headset to the collaboration device; the collaboration device is further configured to receive the device status of the headset sent by the headset; and/or the collaboration device is further configured to determine one or more of a historical habit preference of the user, a current trip, current time information, or a device status of the collaboration device; the collaboration device is further configured to determine the working scenario of the collaboration device or the headset based on the first environment information and/or the second environment information and with reference to one or more of the historical habit preference of the user, the current trip, the current time information, the device status of the collaboration device, and the device status of the headset. In this application, the collaboration device may further determine, based on an environment and with reference to other information of the user, content that the user may be currently interested in.

In a possible implementation, the collaboration device is further configured to: determine a device status of the collaboration device, and send the device status of the collaboration device to the headset; the headset is further configured to receive the device status of the collaboration device sent by the collaboration device; and/or the headset is further configured to determine one or more of a historical habit preference of the user, a current trip, current time information, or a device status of the headset. The headset is further configured to: determine a working scenario of the collaboration device or the headset based on the first environment information and/or the second environment information and with reference to one or more of the historical habit preference of the user, the current trip, the current time information, the device status of the collaboration device, and the device status of the headset, and send the working scenario of the collaboration device or the headset to the collaboration device. In this application, the headset may further determine, based on an environment and with reference to other information of the user, content that the user may be currently interested in.

In a possible implementation, the collaboration device is further configured to: receive a first input instruction, where the first input instruction indicates a selected working mode from a plurality of working modes prestored in the collaboration device; and determine the working mode based on the first input instruction, where the working mode is a working mode in an active noise cancellation mode.

In a possible implementation, the collaboration device is further configured to: receive the working mode of the headset sent by the headset; and use the working mode of the headset as the working mode of the collaboration device; or determine the working mode of the collaboration device based on the first input instruction and the working mode of the headset.

In a possible implementation, the headset is further configured to: receive a first input instruction, where the first input instruction indicates a selected working mode from a plurality of working modes prestored in the headset; determine the working mode based on the first input instruction, where the working mode is a working mode in an active noise cancellation mode; and send the working mode to the collaboration device.

In a possible implementation, the headset is further configured to: receive the working mode of the collaboration device sent by the collaboration device; use the working mode of the collaboration device as the working mode of the headset; or determine the working mode of the headset based on the first input instruction and the working mode of the collaboration device.

In a possible implementation, the collaboration device is further configured to: remove the at least one wanted signal from the ambient audio signal by using adaptive filtering, to obtain the reference signal; or remove the at least one wanted signal from the ambient audio signal by using a spectral subtraction method, to obtain the reference signal. In this application, the wanted signal is removed from the ambient audio signal, to ensure that the reference signal does not include the wanted signal of interest, so that during active noise cancellation, noise can be canceled and content of interest can be retained.

In a possible implementation, the headset is further configured to perform band-pass filtering on at least one wanted signal to obtain at least one filtered wanted signal; or the collaboration device is further configured to perform band-pass filtering on at least one wanted signal to obtain at least one filtered wanted signal, and the collaboration device is further configured to send the at least one filtered wanted signal to the headset; and the headset is further configured to receive at least one filtered wanted signal, so that the headset determines the reference signal based on the at least one filtered wanted signal.

In a possible implementation, the headset is further configured to: obtain a preset band-pass filtering range; or determine a band-pass filtering range in a working status based on a working status; or determine power level information of the headset, and determine a band-pass filtering range based on the power level information of the headset; or the collaboration device is further configured to obtain a preset band-pass filtering range; or determine a band-pass filtering range in a working status based on the working status; or determine power level information of the collaboration device, and determine a band-pass filtering range based on the power level information of the collaboration device.

In a possible implementation, the collaboration device is further configured to: omnidirectionally capture an ambient sound of the environment around the collaboration device; or control a microphone array to perform capturing in a specific direction. In this application, directional capturing may be further performed on the audio signal, so that the reference signal that does not include the wanted signal can be obtained more quickly.

In a possible implementation, the collaboration device is further configured to: if the microphone array is controlled to perform capturing in a specific direction, use a captured audio signal in at least one direction as a wanted signal, where a direction of a reference signal obtained based on the wanted signal is inconsistent with a direction of the wanted signal; or use a captured audio signal in at least one direction as a reference signal, and send the reference signal to the headset, so that the headset determines the to-be-played signal based on the received reference signal.

In a possible implementation, the headset is further configured to: determine a phase-inverted signal of the second ambient audio signal based on the reference signal and the active noise cancellation architecture, and use the phase-inverted signal of the second ambient audio signal as the to-be-played signal.

In a possible implementation, the headset is further configured to determine the phase-inverted signal of the second ambient audio signal based on the reference signal and the weight coefficient of the adaptive filter.

In a possible implementation, the headset is further configured to: capture a sound field feature of a quiet zone of the headset; and determine an updated weight coefficient based on the sound field feature, the weight coefficient of the adaptive filter, and the reference signal, so that the updated weight coefficient is used to determine a phase-inverted signal of the ambient audio signal next time.

According to a seventh aspect, an active noise cancellation device is provided, where the device is a collaboration device or a headset, and the device includes a microphone, a processor, a memory, a transmitter, and a receiver. The microphone is configured to capture an ambient sound and determine an ambient audio signal. If the device is a headset, the device further includes a speaker, configured to play a to-be-played signal. The processor is configured to be coupled to the memory, and read and execute instructions stored in the memory. When the processor runs, the instructions are executed, so that the device performs the method according to any one of the first aspect, the second aspect, or the third aspect.

According to an eighth aspect, a collaboration device is provided, where the collaboration device includes a microphone, a processor, a memory, a transmitter, and a receiver. The processor is configured to be coupled to the memory, and read and execute instructions stored in the memory; and when the processor runs, the instructions are executed, so that the processor is further configured to perform the method on a collaboration device side in the system according to any one of the fourth aspect, the fifth aspect, or the sixth aspect.

According to a ninth aspect, a headset is provided, where the headset includes a microphone, a processor, a memory, a transmitter, a receiver, and a speaker. The receiver is configured to receive at least one wanted signal sent by a collaboration device, where the wanted signal includes target content; the microphone is configured to capture an ambient sound in an environment around the headset, and determine a second ambient audio signal; the speaker is configured to play a to-be-played signal; the processor is configured to be coupled to the memory and read and execute instructions stored in the memory; and when the processor runs, the instructions are executed, so that the processor is further configured to perform the method on the headset side in the system according to any one of the fourth aspect, the fifth aspect, or the sixth aspect.

According to a tenth aspect, a computer-readable storage medium is provided. The computer-readable storage medium stores instructions, and when the instructions are run on a terminal, the terminal is enabled to perform the method according to any one of the first aspect, the second aspect, or the third aspect.

According to an eleventh aspect, a computer program device including instructions is provided. When the computer program device runs on a terminal, the terminal is enabled to perform the method according to any one of the first aspect, the second aspect, or the third aspect.

This application discloses an active noise cancellation method, device, and system, where the wanted signal is removed from the reference signal, so that the headset processes, by using the adaptive filter, the reference signal from which the wanted signal is removed, to obtain the phase-inverted signal of the ambient audio signal. In this way, after playing the phase-inverted signal, the headset can cancel noise in the environment, so that the sound of interest is retained while active noise cancellation is implemented.

DESCRIPTION OF EMBODIMENTS

The following describes the technical solutions in embodiments of this application with reference to the accompanying drawings in embodiments of this application.

A scenario to which this application is applied may be a scenario in which wanted information that a user wants to hear exists in a surrounding environment of daily life, and a large amount of noise is also filled. When the user uses a noise cancellation headset to perform active noise cancellation on ambient noise, the noise cancellation headset generates an audio that has a same spectrum as the ambient noise and a phase opposite to the ambient noise to compensate for the ambient noise, thereby effectively suppressing the ambient noise. The noise cancellation headset used by the user usually uses an active noise cancellation (ANC) manner to reduce ambient noise.

Figure 1:
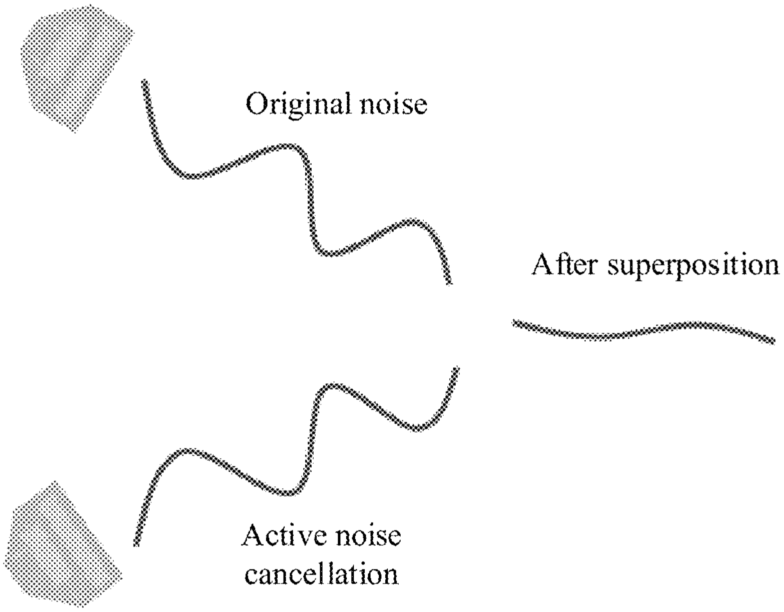
FIG. 1 is a schematic diagram of an active noise cancellation principle.
Figure 2:
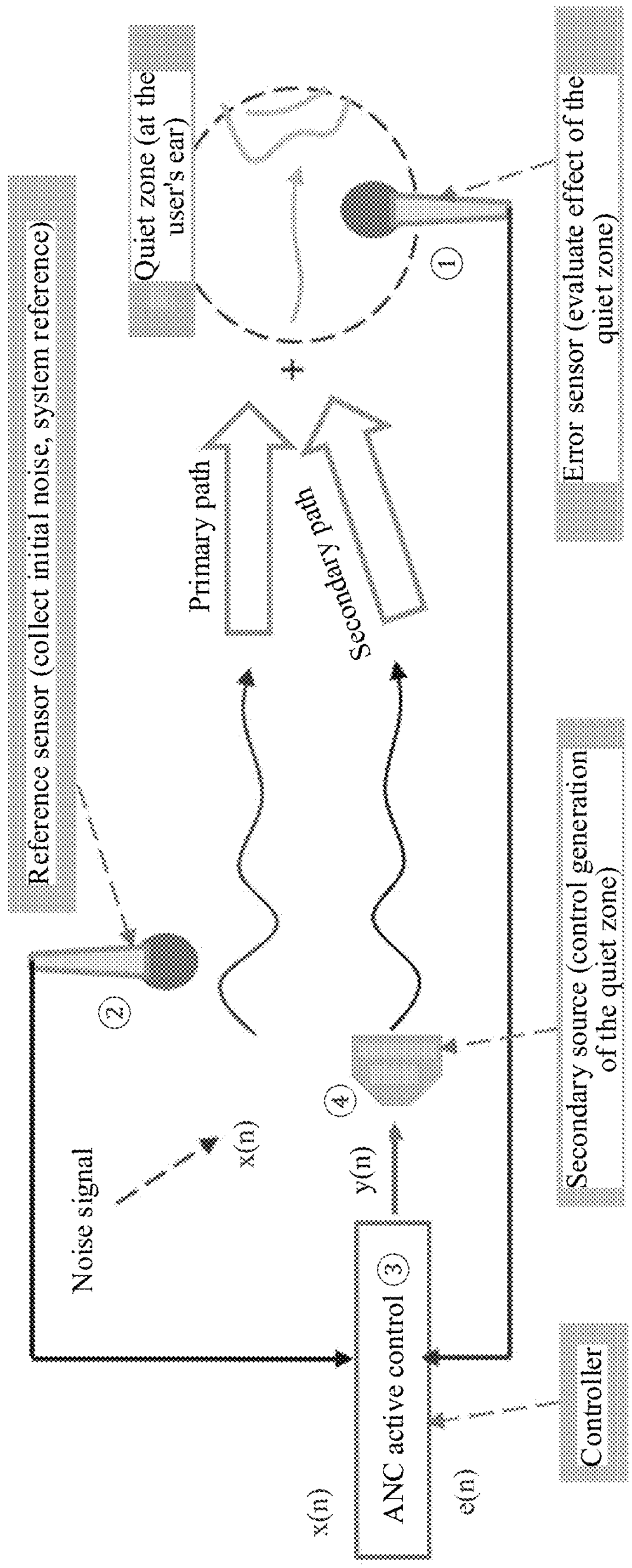
FIG. 2 is a schematic diagram of an active noise cancellation system.

FIG. 2 is a schematic diagram of an active noise cancellation system.

It can be learned that the ANC system may include a reference sensor, an error sensor, a speaker (secondary source), and a controller. ① indicates that the error sensor captures a sound field feature e(c) in a quiet zone (at the user's ear) and transmits the captured e(c) to the controller. Herein, e(c) may also be referred to as a noise-canceled error signal, and c represents a time index value and represents a signal captured at a moment c. The e(c) captured by the error sensor may include features such as a sound pressure and particle velocity in different directions. ② indicates that the reference sensor captures initial noise, for example, captures a noise feature x(c), where x(c) may also be referred to as a noise reference signal. The reference sensor then transmits the captured x(c) to the controller. It may be understood that, in the ANC system, there is no strict sequence in a process of performing ① and ②, that is, ① may be performed before ② is performed, or ② may be performed after ① is performed, or certainly, ① and ② may be performed at the same time. ③ indicates that after the controller receives e(c) captured by the error sensor and x(c) captured by the reference sensor, the controller may calculate an error cost function, that is, a loss function, based on e(c). Based on a principle of minimizing the error cost function, y(c) for noise suppression is predicted with reference to x(c). After the controller outputs the calculated y(c) to the speaker (secondary source), the speaker sends a signal y(c), as shown in ④. In this way, y(c) passing through a secondary path and x(c) passing through a primary path are superimposed in the quiet zone, thereby minimizing the cost function of the e(c) signal captured by the error sensor.

Figure 3:
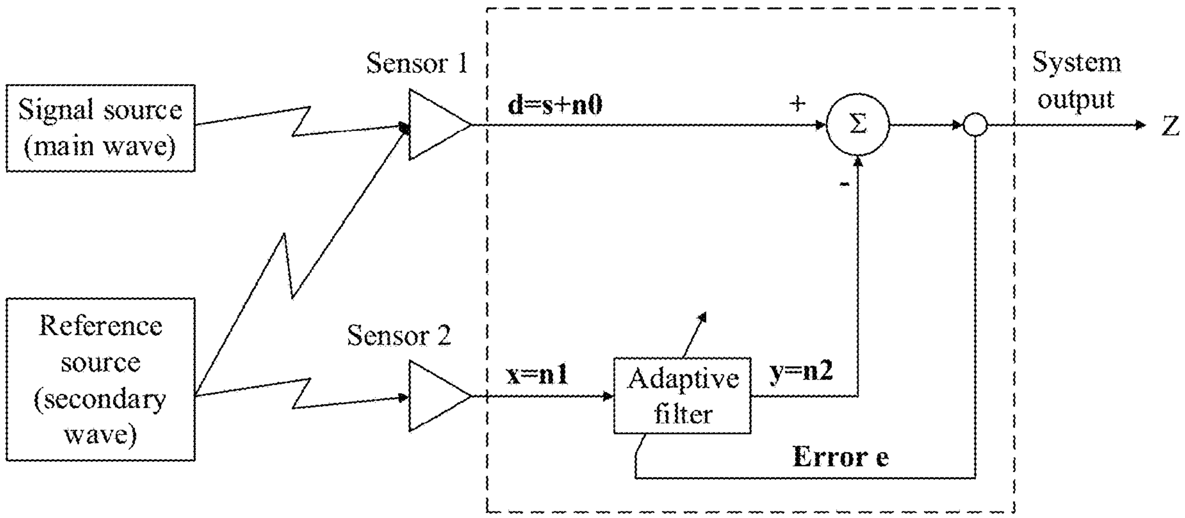
FIG. 3 is a schematic diagram of an active noise cancellation algorithm model.

FIG. 3 is a schematic diagram of an active noise cancellation algorithm model.

It is assumed that, in a stationary random process, s, $n_0$, and $n_1$ are zero-mean values, and s, $n_0$, and $n_1$ are mutually independent. An ambient signal d is a sum of a wanted signal s and noise $n_0$, a reference signal x is noise $n_1$ related to $n_0$, and an output $y=n_2$ of an adaptive filter is a filtered signal of the noise $n_1$. The ambient signal d may include a signal source signal and a reference source signal, and the reference signal x may include the reference source signal. The output z of the ANC system may be expressed as $z=d-y=s+n_0-y$. In this case, after both sides of the equation are squared, $z^2=s^2+(n_0-y)^2+2s\,(n_0-y)$ may be obtained. In this case, expectations are taken on both sides of the equation, and the equation may be written as $E[z^2]=E[s^2]+E[(n_0-y)^2]+2E[s(n_0-y)]$. Because s, $n_0$, and $n_1$ are zero-mean values and are mutually independent, $2E[s(n_0-y)]$ is 0, and the formula may also be equivalent to $E[z^2]=E[s^2]+E[(n_0-y)^2]$. $E[s^2]$ may represent power of a signal. It can be learned from the foregoing formula that, to make z output by the system as close as possible to the signal s, a minimum value of $E[(n_0-y)^2]$ needs to be taken. In an ideal case of $z-s=n_0-y$, if $y=n_0$, $z=s$. In this way, the output signal z retains only the wanted signal s, and the noise is completely canceled. It may be understood that, because features such as an amplitude, a phase, and a frequency of noise change at any time, the ANC algorithm model needs to adapt to and process the foregoing changes. Therefore, an adaptive filter is used in the ANC algorithm model.

More specifically, reference may be made to the "Active Noise Control (ANC) Technology" described at the following website "https://wenku.baidu.com/view/4cf5af553c1ec5da51e27006.html", and details are not described herein again.

When the ANC system is deployed on the headset, the headset may be referred to as a noise cancellation headset. The noise cancellation headset may be classified into two structures: a feedforward structure and a feedback structure. A feature of the noise cancellation headset is that all components are arranged together.

Figure 4:
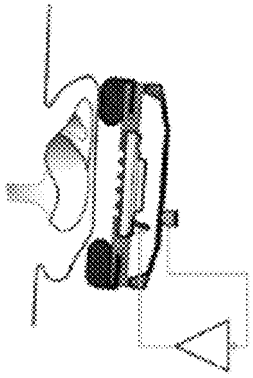
FIG. 4 is a schematic diagram of a feedforward noise cancellation headset.
Figure 5:
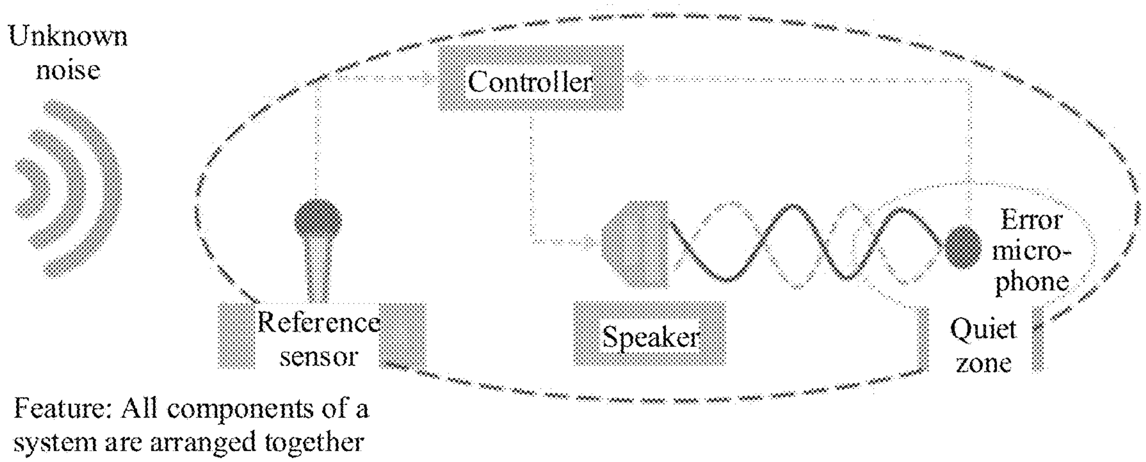
FIG. 5 is a schematic diagram of a structure of the feedforward noise cancellation headset shown in FIG. 4.

For example, FIG. 4 is a schematic diagram of a feedforward noise cancellation headset. With reference to the schematic diagram of a structure shown in FIG. 5, it can be learned that the feedforward noise cancellation headset includes a reference sensor, a controller, and a speaker. The reference sensor, such as a microphone, may be deployed outside the headset, so that the reference sensor can capture external noise outside the headset. The controller is configured to directly perform phase inversion on a reference signal x(c) of the noise captured by the reference sensor, for example, directly perform symbol inversion on an audio sampling point, to obtain y(c). Then, the controller performs scaling on y(c) by using a circuit, and transmits the scaled y(c) to the speaker, and finally the speaker of the headset performs playing, to implement a noise cancellation effect.

In an example, the phase-inverted signal y(c) may be calculated in the following manner. First, an external sound is received and digitized by using the reference sensor, to obtain a reference signal x(c) of noise. x(c) may be a plurality of audio sampling points. Then, the controller performs inversion on each sampling point symbol of the reference signal x(c) of the noise, to obtain the phase-inverted signal y(c).

Figure 6:
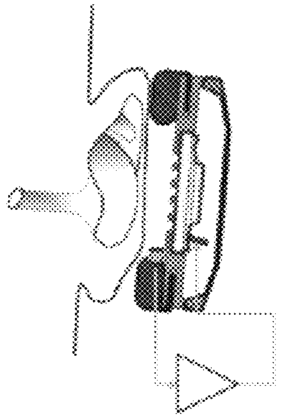
FIG. 6 is a schematic diagram of a feedback noise cancellation headset.
Figure 7:
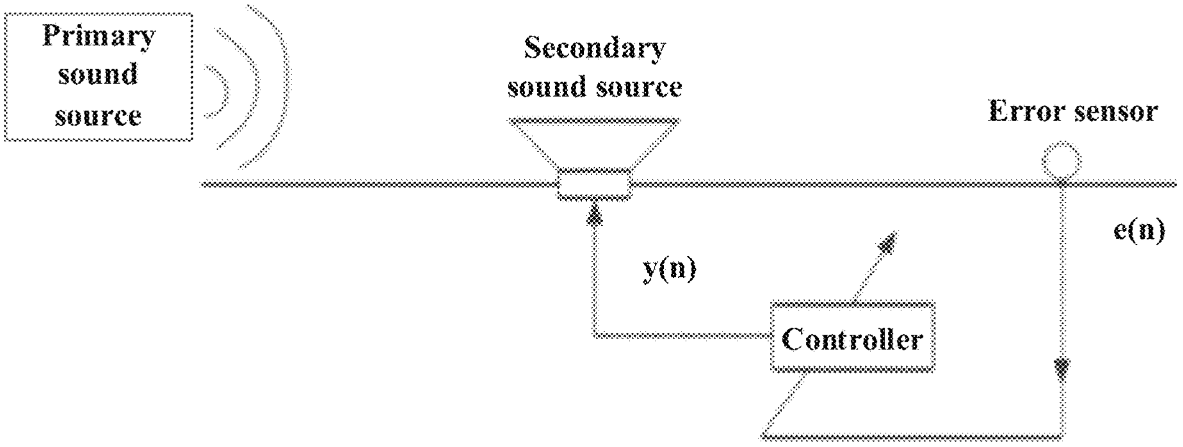
FIG. 7 is a schematic diagram of a structure of the feedback noise cancellation headset shown in FIG. 6.

FIG. 6 is a schematic diagram of a feedback noise cancellation headset. With reference to the schematic diagram of a structure shown in FIG. 7, it can be learned that the feedback noise cancellation headset includes an error sensor, a controller, and a speaker. The error sensor, such as a microphone, may be deployed inside the headset. In this way, the error sensor can collect, inside the headset, an internal noise-canceled audio signal. The noise-canceled audio signal captured by the error sensor may be, for example, a noise-canceled error signal e(c). After capturing e(c), the error sensor transmits e(c) to the controller. The controller may use, for example, a filter, to obtain a phase-inverted signal y(c) through the controller. It may be understood that, a purpose of the feedback noise cancellation headset is to minimize the obtained e(c) by adding the phase-inverted signal y(c) and a noise signal in an external environment. Apparently, the foregoing process is a closed-loop process.

Figure 8:
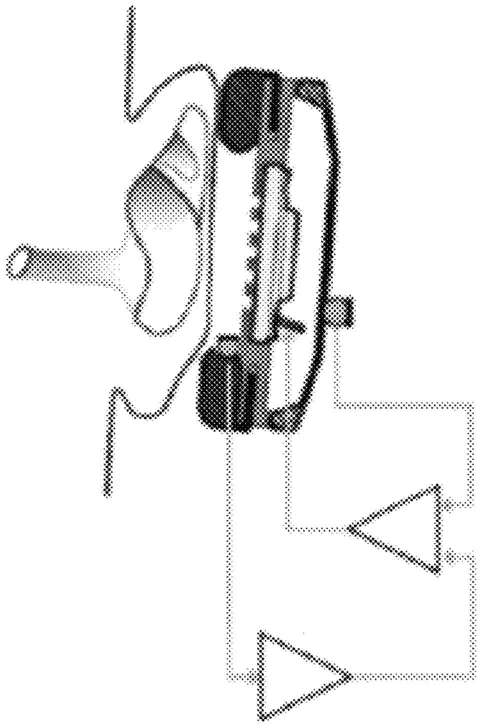
FIG. 8 is a schematic diagram of an integrated noise cancellation headset.
Figure 9:
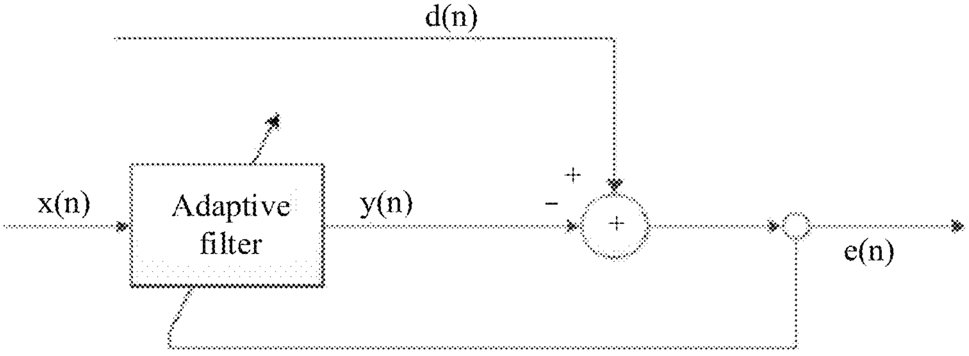
FIG. 9 is a schematic diagram of a structure of the integrated noise cancellation headset shown in FIG. 8.

As shown in FIG. 8, FIG. 8 is a schematic diagram of an integrated noise cancellation headset. With reference to the schematic diagram of a structure shown in FIG. 9, it can be learned that the integrated noise cancellation headset includes a reference sensor, an error sensor, a controller, and a speaker. It may be understood that the integrated noise cancellation headset may be a combination of the feedforward noise cancellation headset shown in FIG. 4 and the feedback noise cancellation headset shown in FIG. 6. That is, the error sensor is deployed inside the headset, and the reference sensor is deployed outside the headset. For the integrated noise cancellation headset, a processing manner of the integrated noise cancellation headset may be capturing a reference signal x(c) of external noise by using the reference sensor, and capturing a noise-canceled error signal e(c) inside the headset by using the error sensor. It may be understood that there is no strict sequence between the step of capturing x(c) and the step of capturing e(c) in an execution process. In this case, it is assumed that an external ambient signal is d(c), and a phase-inverted signal y(c) required by the integrated noise cancellation headset is calculated by using a filter x least mean square (FxLMS) algorithm. In an example, the foregoing phase-inverted signal y(c) may be obtained through calculation according to $y(c)=w^T(c)x(c)$. $w^T(c)$ is the transpose of w(c). w(c) is a weight coefficient of an adaptive filter. In an example, w(c) may be updated according to w(c+1)=w(c)+ue(c)x(c), where u is a convergence factor, and a value of u may be random, or may be preset. Certainly, at the beginning, w(c) may be preset, and e(c) may be determined according to e(c)=d(c)−y(c). It can be learned that, an objective of the integrated noise cancellation headset is to continuously predict y(c) based on e(c) and x(c), and to minimize e(c), that is, the system gradually converges to 0.

More specifically, for the noise cancellation headset and the noise cancellation principle, refer to "ANC" in "https://wenku.baidu.com/view/651e78d6376baf1ffd4fadc4.html", "ANC Active Noise Cancellation Theory and Matlab Code Implementation" in "https://www.cnblogs.com/LXP-Never/archive/2019/10/18/11693567.html", and "ANC Noise Cancellation Learning" in "https://blog.csdn.net/weixin_42183571/article/details/80615660". Details are not described herein again in this application.

It can be learned that an essence of the ANC algorithm model is to remove a signal that includes x or is related to x from d. However, if content of x is basically the same as content of d, the signal d is completely suppressed by using the ANC algorithm model. In other words, in the foregoing solution, if the external environment includes noise and also wanted information, when the noise cancellation headset is worn to perform active noise cancellation, the reference signal x(c) captured by the noise cancellation headset is basically the same as the ambient signal d(c), that is, includes noise and wanted information. The noise cancellation headset can not only suppress the external noise, but also suppress the wanted information that the user wants to hear together with the ambient noise. Consequently, the user cannot hear the wanted information from the outside. Obviously, while the noise cancellation headset implements comprehensive noise cancellation to the greatest extent, any sound of the external environment is suppressed to the greatest extent. As a result, in daily life, the user cannot hear wanted information. Apparently, noise cancellation of the noise cancellation headset is not user-friendly and is not personalized.x(c)d(c)

To resolve the foregoing problem, this application provides an active noise cancellation method. An audio signal of interest or that is related to some requirements is removed from the reference signal x(c). Because this type of signal still exists in an ambient signal d(c), after noise cancellation is performed by using ANC, a noise-canceled error signal e(c) also retains this part of audio signal of interest or that is related to the requirements. In this way, the user can obtain the part of signal and obtain content that the user wants to hear. In this application, in a framework of an active noise cancellation model, an audio signal of interest or that is related to some requirements may still be perceived by the user, thereby effectively improving humanization and practicability of the active noise cancellation headset.

The following describes in detail technical solutions in embodiments of this application with reference to the accompanying drawings in embodiments of this application.

Figure 10A:
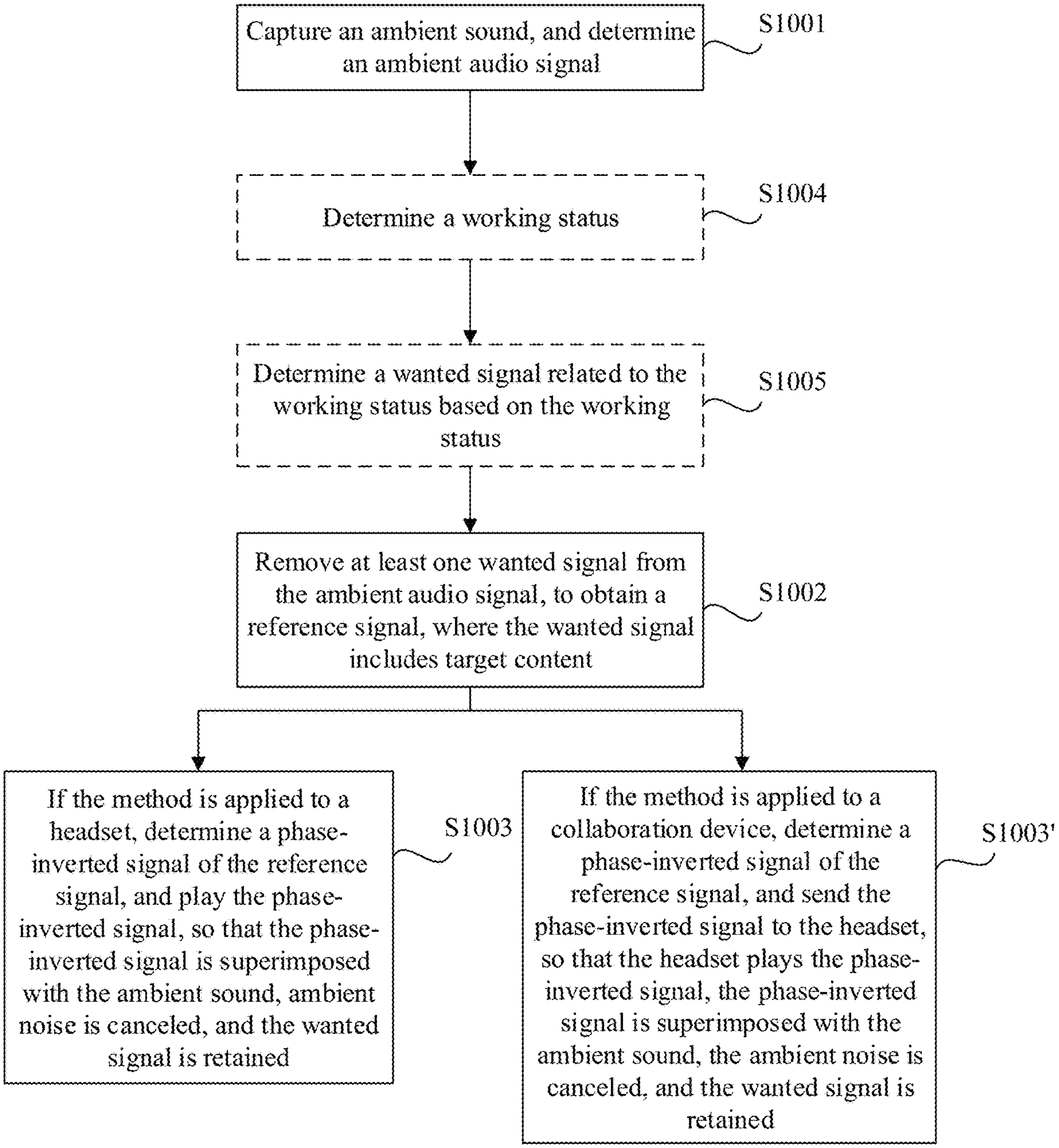
FIG. 10*a* to FIG. 10*c* are flowcharts of an active noise cancellation method according to an embodiment of this application.
Figure 10B:
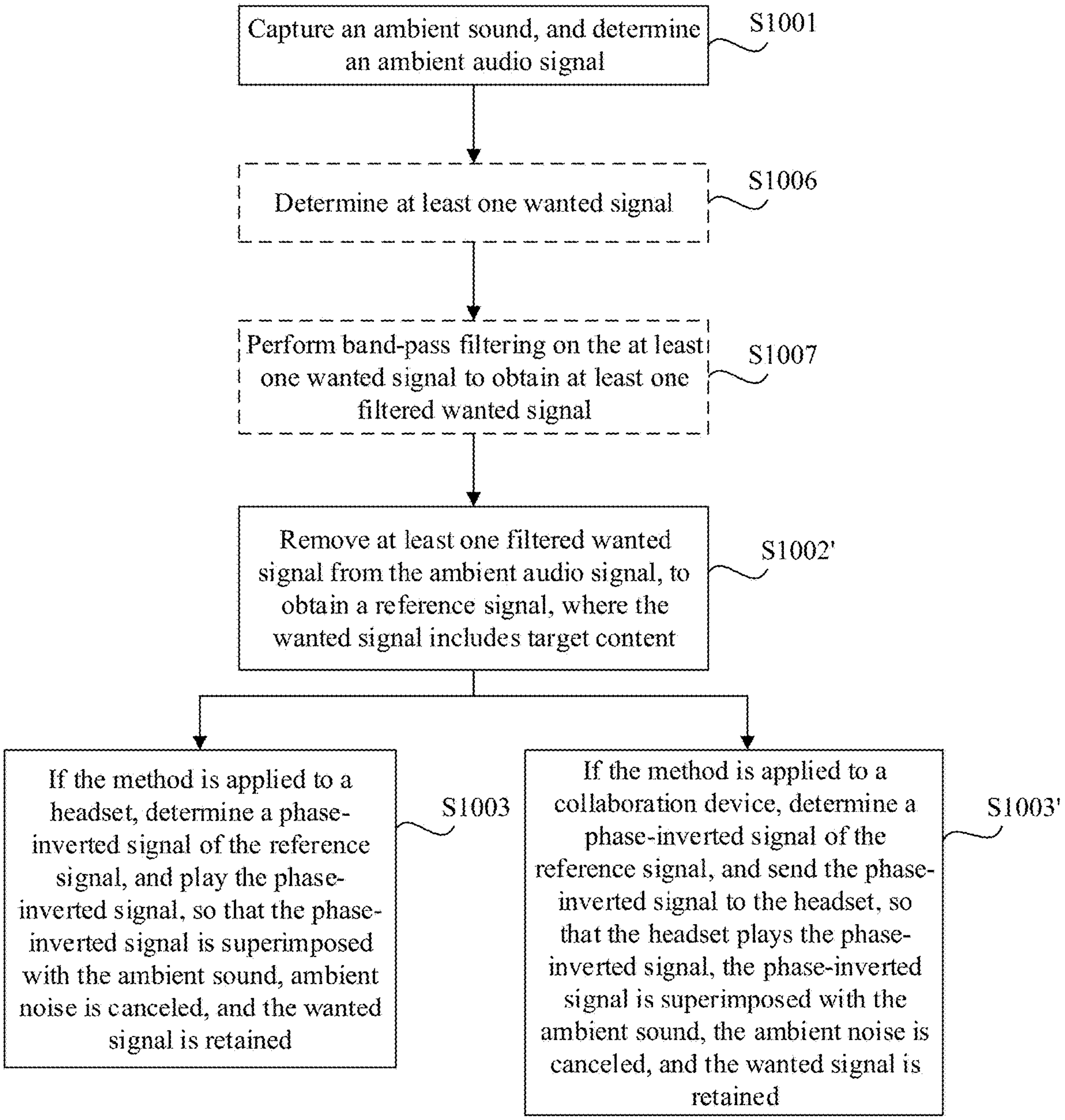
Figure 10C:
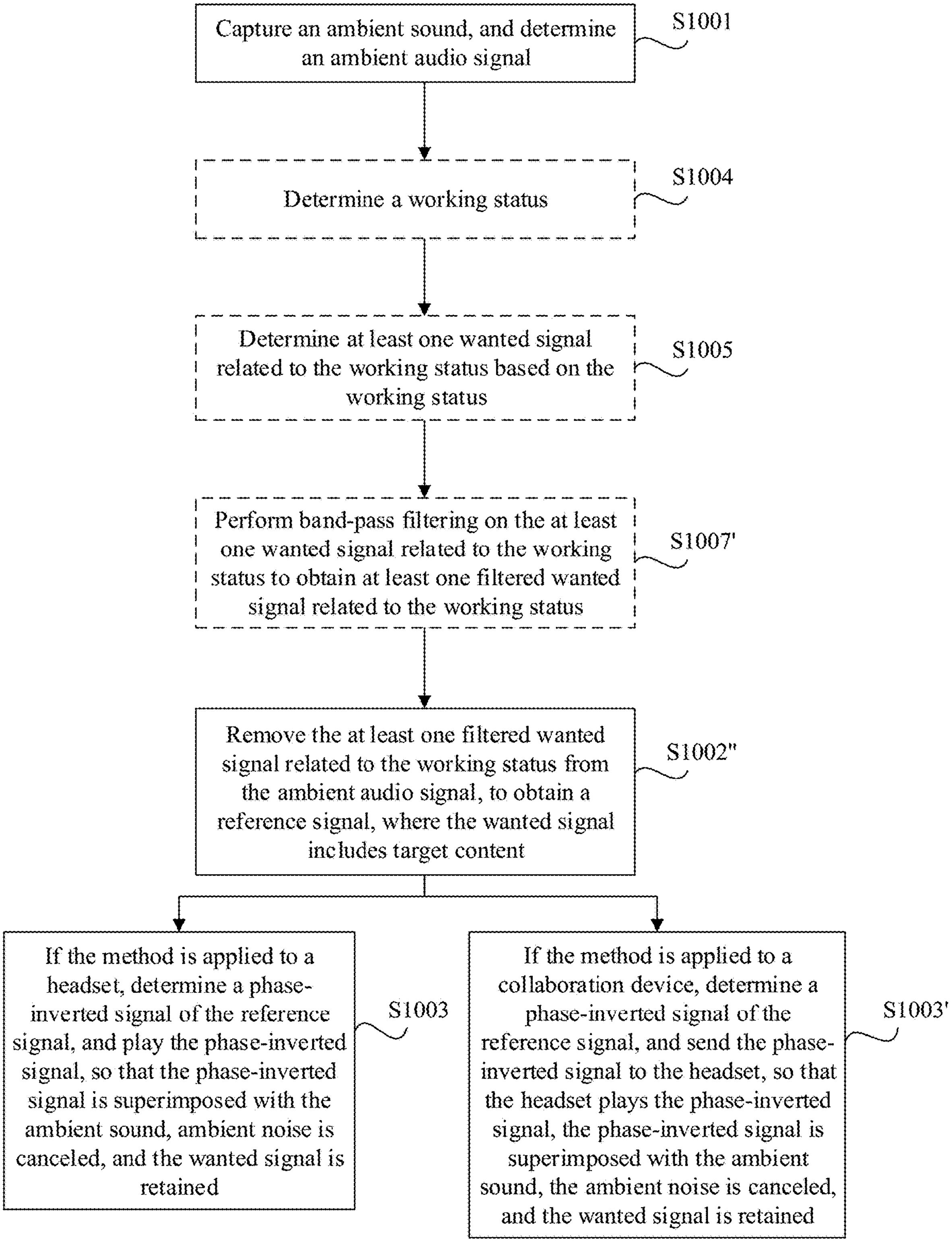

FIG. 10*a* to FIG. 10*c* are flowcharts of an active noise cancellation method according to an embodiment of this application.

This application provides an active noise cancellation method, and the method may be applied to a collaboration device or a headset. The collaboration device may be any terminal device or portable terminal device other than a headset, such as, a mobile phone, a smart television, a smart acoustic device, a wearable device, a tablet computer, a desktop computer, a handheld computer, a notebook computer, an ultra-mobile personal computer (UMPC), a netbook, a personal digital assistant (PDA), a laptop computer (laptop), a mobile computer, an augmented reality (AR) device, a virtual reality (VR) device, an artificial intelligence (AI) device, an in-vehicle device, a smart home device, a smart city device, and/or the like.

In an example, a wireless manner used in this application may be, for example, Bluetooth, ZigBee, Wireless Fidelity (Wi-Fi), or a cellular network. The cellular network may include any possible cellular network such as a Global System for Mobile Communications (GSM), Code Division Multiple Access (CDMA), General Packet Radio Service (GPRS), Wideband Code Division Multiple Access (WCDMA), Time Division-Synchronous Code Division Multiple Access (tTD-SCDMA), Code Division Multiple Access 2000 (CDMA 2000), Long Term Evolution (LTE), Long Term Evolution-Advanced (LTE-A), evolution-Long Term Evolution (e-LTE), and New Radio Access Technology (NR).

The method may include the following steps.

S1001: Capture an ambient sound, and determine an ambient audio signal.

In an example, the ambient sound may be captured in all directions, and when the device has a microphone array, an audio signal in at least one direction may be captured by controlling delay compensation. It may be understood that the microphone array needs to include at least two microphones.

In an example, if the method is applied to a headset, the ambient sound is captured, and the determining an ambient audio signal may be: The headset receives an ambient audio signal sent by a collaboration device. The ambient audio signal is obtained by the collaboration device by capturing the ambient sound.

In some examples, if the method is applied to the collaboration device, the collaboration device may further receive an ambient audio signal sent by the headset. The audio signal may be an ambient sound around the headset. Certainly, in some other examples, if the method is applied to the headset, the headset may further receive the ambient audio signal sent by the collaboration device. The audio signal may be an ambient sound around the collaboration device.

S1002: Remove at least one wanted signal from the ambient audio signal, to obtain a reference signal, where the wanted signal includes target content.

In an example, the at least one wanted signal needs to be determined. The wanted signal includes the target content. The target content may be understood as content of interest, or may be understood as content that the user wants to hear. In some examples, the target content may be valuable information or information of interest to the user, and may include audio information that may affect user security, for example, a horn sound, an alarm sound, or a specific security-related keyword. The target content may further include audio information that may affect a trip of the user, for example, audio information that is used to report a station in each station such as an airport or a subway station, that is, a subway station report or a flight forecast. Certainly, the target content may further include audio information that may affect working efficiency of the user, for example, a name of the user, a phone ringtone, or a specific keyword. It can be learned that the target content is at least audio information that needs to be perceived by the user, or that is perceived by the user and that is used to determine a next action. In other words, the user needs to give feedback on, respond to, or intervene in the valuable information or the information of interest. It may be understood that "audio information" and "audio signal" in this application have a same meaning.

The foregoing examples provide only several possible types of target content. However, it should be understood that the target content in this application is not limited to the foregoing examples, and may further include any possible valuable information or information of interest to the user. This is not limited in this application.

It may be understood that "content of interest" and "target content" mentioned below in this application have a same meaning, and "audio signal of interest" and "wanted signal" have a same meaning. The at least one wanted signal may be prestored in the collaboration device or the headset. In this way, the device can directly filter the ambient audio signal by using the prestored wanted signal.

In an example, if the method is applied to the headset, the headset may further receive at least one wanted signal sent by the collaboration device. The at least one wanted signal is prestored in the collaboration device. Alternatively, in another example, if the method is applied to the collaboration device, the collaboration device may receive at least one wanted signal sent by the headset. The at least one wanted signal is prestored in the headset.

In another example, if the prestored wanted signal does not well match a wanted signal in a real case, the device may determine a wanted signal from the ambient audio signal. For example, the device may perform signal separation on the ambient audio signal to obtain at least one sound source signal. Then, the at least one sound source signal is identified, and the at least one wanted signal is determined from the at least one sound source signal. Signal separation may be performed in a blind separation manner, or in any equivalent manner such as a deep neural network (DNN) manner.

If the blind separation manner is used, the device may perform short-time Fourier transform on the ambient audio signal to obtain an ambient audio frequency domain signal. Then, a sound source frequency domain signal is obtained through a separation network based on the ambient audio frequency domain signal. Finally, after inverse short-time Fourier transform is performed on the sound source frequency domain signal, at least one sound source signal in time domain is obtained.

The identifying the at least one sound source signal may be: identifying a keyword of the at least one sound source signal, and determining, from the at least one sound source signal, at least one wanted signal that includes a preset keyword; and/or performing voiceprint matching on the at least one sound source signal, and determining, from the at least one sound source signal, at least one wanted signal that matches a preset voiceprint. When keyword identification or voiceprint matching is performed, the preset keyword and the preset voiceprint may be prestored in the collaboration device or the headset.

In an example, the identifying a keyword of the at least one sound source signal, and determining, from the at least one sound source signal, at least one wanted signal that includes a preset keyword may be performing pre-emphasis and frame division and windowing on each sound source signal in the at least one sound source signal by using a high-pass filter, to obtain a plurality of frame signals corresponding to each sound source signal. Then, fast Fourier transform is performed on the plurality of frame signals to obtain a spectral characteristic corresponding to each sound source signal. Then, the spectral characteristic is filtered by a Mel filter and a logarithm is obtained, to obtain a Mel frequency logarithmic energy spectrum corresponding to each sound source signal. Discrete cosine transform is performed on the Mel frequency logarithmic energy spectrum to obtain a Mel coefficient corresponding to each sound source signal. A cosine distance between the Mel coefficient corresponding to each sound source signal and a Mel coefficient of the preset keyword is calculated. When the cosine distance is greater than or equal to a cosine distance threshold, the sound source signal is used as a wanted signal.

In another example, the performing voiceprint matching on the at least one sound source signal, and determining, from the at least one sound source signal, at least one wanted signal that matches a preset voiceprint may be preprocessing each sound source signal in the at least one sound source signal to obtain a plurality of frame signals corresponding to each sound source signal. Then, fast Fourier transform is performed on the plurality of frame signals to obtain a spectral characteristic corresponding to each sound source signal. Then, the spectral characteristic is filtered by a Mel filter and a logarithm is obtained, to obtain a Mel frequency logarithmic energy spectrum corresponding to each sound source signal. Discrete cosine transform is performed on the Mel frequency logarithmic energy spectrum to obtain a Mel coefficient corresponding to each sound source signal. A similarity between the Mel coefficient corresponding to each sound source signal and a preset voiceprint feature Mel coefficient is calculated. When the similarity is greater than or equal to a similarity threshold, the sound source signal is used as a wanted signal.

In an example, if the prestored wanted signal does not well match a wanted signal in a real case, the device may process the ambient audio signal or the at least one sound source signal, for example, perform frequency domain filtering. A reference signal is determined after a sound of at least one preset frequency and/or frequency band is filtered out. When frequency domain filtering is performed, the preset frequency and/or frequency band may be prestored in the collaboration device or the headset as a wanted signal.

For example, the performing frequency domain filtering on the ambient audio signal or the at least one sound source signal and filtering out a sound of at least one preset frequency and/or frequency band to obtain a reference signal may be: removing, by using a band-pass filter, the sound of the at least one preset frequency and/or frequency band from the ambient audio signal or each sound source signal of the at least one sound source signal, to obtain the reference signal corresponding to the ambient audio signal or each sound source signal.

In still another example, if an audio signal in at least one direction is captured in S1001, the audio signal in the at least one direction may be used as a wanted signal. Alternatively, the audio signal in the at least one direction is used as a reference signal.

In an example, the at least one wanted signal may be removed from the ambient audio signal by using an active noise cancellation architecture, to obtain the reference signal. The active noise cancellation architecture may be an adaptive filtering architecture. For example, the reference signal may be determined based on the at least one wanted signal and a weight coefficient of the adaptive filtering architecture.

In an embodiment, as shown in FIG. 10*a*, after S1001 and before S1002, a working status of the collaboration device and/or a working status of the headset may be further determined, and a wanted signal related to the working status is determined based on the working status. For example, before S1002, the method may further include the following step.

S1004: Determine a working status.

The collaboration device or the headset may further determine the working status of the collaboration device and/or the working status of the headset.

In an example, the collaboration device or the headset may determine the working status of the collaboration device and/or the working status of the headset. The working status may include a working scenario and/or a working mode.

In an example, the working scenario may include, for example, an outdoor scenario, a home scenario, an office scenario, a hotspot scenario, and the like. It may be understood that more scenarios may be further included, and each scenario may further include one or more sub-scenarios. This is not limited in this application.

The collaboration device or the headset may obtain environment information of the collaboration device and/or the headset, to determine a working scenario of the collaboration device and/or a working scenario of the headset. The environment information may include one or more of geographical location information, an ambient audio signal, and ambient video information. Certainly, the environment information may further include, based on an actual situation, more other information that may indicate an environment around the collaboration device and/or an environment around the headset.

The geographical location information is used to indicate a geographical location of the collaboration device and/or a geographical location of the headset. For example, the collaboration device or the headset may directly obtain geographical location information of the collaboration device or the headset through positioning. Certainly, the geographical location information of the collaboration device and/or the headset may alternatively be obtained indirectly by using another device, for example, a smart terminal device such as a mobile phone, a smart watch, a smart band, a personal computer (PC), or smart glasses. A positioning manner may be, for example, the Global Positioning System (GPS), the BeiDou Navigation Satellite System (BDS), the Galileo Navigation Satellite System, or the Global Navigation Satellite System (GLONASS). Certainly, other equivalent high-precision positioning may also be used, for example, using a wireless technology, or simultaneous localization and mapping (SLAM).

In another example, the collaboration device or the headset may further capture an ambient audio signal around the device by using a microphone, and captures ambient video information of an environment around the device by using a camera, an infrared sensor, or the like.

If the method is applied to the collaboration device, the collaboration device may determine a current working scenario of the collaboration device based on the obtained environment information of the collaboration device. For example, if a current location is positioned as an office building, the working scenario may be an office scenario; or if it is detected that a sound of tapping a keyboard, a sound of clicking a mouse, a specific working term, and/or the like exist in an ambient audio signal, the working scenario may be an office scenario; or if it is detected that a key feature image such as a desk, a PC, and/or a folder appears in photographed ambient video information, the working scenario may be an office scenario. It may be understood that the working scenario may be determined based on one or more of the geographical location information, the ambient audio signal, and the ambient video information. In another example, the collaboration device may further obtain environment information of the mobile phone, and determine a current working scenario of the headset. Certainly, in still another example, the collaboration device may further comprehensively determine a current working scenario of the user with reference to the current working scenario of the collaboration device and the current working scenario of the headset. It may be understood that, if the method is applied to the headset, a manner of determining the working scenario is the same as that of the method applied to the collaboration device. For ease of description, details are not described herein again.

In still another example, the working scenario may be alternatively determined based on the environment information with reference to one or more of a historical habit preference of the user, a current trip of the user, current time information, or a device status of the collaboration device and/or a device status of the headset. The device status may be, for example, whether the device is playing music, whether the user is currently in a call, and current power level information of the device. It may be understood that, in this application, the working scenario may be comprehensively determined based on one or more of or any combination of the environment information, the historical habit preferences of the user, the current trip of the user, the current time information, or the device status of the collaboration device and/or the device status of the headset.

In some examples, a device that performs the method may make a comprehensive decision with reference to the working scenario of the collaboration device and the working scenario of the headset, to determine a final working scenario.

In another example, the working mode may include, for example, a safe mode, a business mode, a leisure mode, and the like. It may be understood that more modes may be further included, and each mode may further include one or more submodes. This is not limited in this application.

For example, whether the user is currently speaking may be detected, and if it is detected that the user is speaking, the mode may be a business mode; or whether the headset is currently playing music may be detected, and if the headset is playing music, the mode may be a leisure mode; or whether the device is moving may be detected, and if it is detected that a displacement of the device in a unit time exceeds a specific distance, or it is detected by using an acceleration sensor that the device moves in a unit time, the mode may be a safe mode. If the headset or the collaboration device has a motion mode or an equivalent mode, the mode of the device may be directly matched.

Certainly, the device may further select an indicated working mode from a plurality of preset working modes by receiving a first input operation of the user. For example, the user can directly select a proper working mode.

In some examples, the device that performs the method may make a comprehensive decision with reference to the working mode of the collaboration device and the working mode of the headset, to determine a final working mode.

It may be understood that all working modes in this application are working modes based on an active noise cancellation mode.

S1005: Determine a wanted signal related to the working status based on the working status.

After the working status is determined in S1004, at least one wanted signal related to the working status may be determined based on the working status.

For example, the at least one related wanted signal may be determined based on a preset correspondence between a working scenario and a wanted signal and/or a preset correspondence between a working mode and a wanted signal.

In an example, Table 1 shows a table of a correspondence between a working scenario and a wanted signal.

TABLE 1

| Work scenario | Wanted signal |
|---|---|
| Outdoor scenario | Horn sound, alarm sound, outdoor-related keyword, sound signal in a specific direction, emergency sound signal, or the like |
| Office scenario | Phone ringtone, specific office-related keyword, specific office-related voiceprint, or the like |
| Hotspot scenario | Station reporting sound, train information (flight, train number, bus number, subway number, or the like), sound signal related to user's trip, or the like |
| Home scenario | Door knock, door ringtone, phone ringtone, home-related keyword, home-related voiceprint, or the like |

Certainly, it may be understood that Table 1 shows only some cases. Certainly, more scenarios may be further included, and each scenario may further correspond to more related wanted signals. This is not limited in this application.

In another example, Table 2 is a table of a correspondence between a working mode and a wanted signal.

TABLE 2

| Working mode | Wanted signal |
|---|---|
| Safe mode | Horn sound, alarm sound, outdoor-related keyword, sound signal in a specific direction, emergency sound signal, or the like |
| Business mode | Phone ringtone, specific office-related keyword (such as user's name), specific office-related voiceprint, station reporting sound, train information (flight, train number, bus number, subway number, or the like), sound signal related to user's trip, or the like |
| Leisure mode | Door knock, door ringtone, phone ringtone, home-related keyword, home-related voiceprint, or the like |

Certainly, it may be understood that Table 2 shows only some cases. Certainly, more modes may be further included, and each mode may further correspond to more related wanted signals. This is not limited in this application.

Apparently, the collaboration device or the headset may determine a related wanted signal based on the correspondence in Table 1 and/or the correspondence in Table 2. It may be understood that, if the wanted signal is determined by referring to the working mode and the working scenario together, an intersection set or a union set of wanted signals may be selected with reference to Table 1 and Table 2 as the related wanted signal.

In an example, a sound signal in a specific direction is involved in an outdoor scenario and a safe mode. The collaboration device or the headset may determine, in the foregoing manner, that the user may be traveling on an outdoor street in this case. In this case, the specific direction may be a preset direction of approaching a road. For example, a specific direction of approaching the road may be determined based on a map, geographical location information, and a traveling direction.

In another example, the emergency sound signal in Table 1 and Table 2 may represent a sound signal related to an emergency that occurs around the user. For example, when the device determines that the user may be in an outdoor scenario or a safe mode in this case, if it is detected that a construction sound or a roadblock prompt sound exists in a specific range around the user, the construction sound or the roadblock prompt sound may be used as an emergency sound signal, to retain the sound during active noise cancellation. The specific range around the user may be a preset surrounding distance threshold, for example, may be set to 20 meters, 30 meters, or 15 meters. It may be understood that if it is detected that a distance between a sound source and the user is greater than the surrounding distance threshold, it may be considered that the emergency does not affect the user, and the detected sound is ignored. For a specific manner of determining the distance between the sound source and the user, refer to an existing manner. Details are not described herein again in this application.

In another example, the specific keyword or the specific voiceprint in Table 1 and Table 2 may be a possible keyword or voiceprint determined based on a corresponding scenario or mode. For example, in an outdoor scenario or a safe mode, the keyword may be “pay attention to safety”, “please slow down”, or the like; and in an office scenario or a business mode, the keyword may be a keyword that may involve work, such as “report” or “payment”. Certainly, the voiceprint may be a voiceprint of the user, a voiceprint of a colleague around the user, or a voiceprint of a superior leader. For another example, in a home scenario or a leisure mode, a voice of a family member may be determined as the specific voiceprint. For another example, in a hotspot scenario or a business mode, train information may be “XX flight number”, “XX train number”, “Arrive at XX”, or the like. The foregoing manner of obtaining the specific voiceprint may be pre-recording specific voiceprint information, or learning and recording during a call with a specific person. Certainly, another manner may alternatively be used for obtaining. This is not limited in this application.

Certainly, in some examples, a possible wanted signal may alternatively be determined based on a current time. For example, in a home scenario, if a current time point is within a period from 11:00 a.m. to 1:00 p.m., it may be considered that the user may be in a meal time period. In this case, the specific keyword may also be “food”, and the like. After 1:00 p.m., the keyword may no longer include “food” or the like.

After the related wanted signal is determined in S1005, S1002 may continue to be performed to remove the at least one related wanted signal from the ambient audio signal, to obtain the reference signal. Certainly, it may be understood that, in the process of determining the wanted signal in S1005, the determining manner described in S1002 may be further included. Certainly, after the wanted signal is determined in S1005, the wanted signal does not need to be determined again in S1002, but the at least one wanted signal is directly removed from the ambient audio signal.

Apparently, after S1004 and S1005, a suitable wanted signal may be determined more intelligently and accurately based on a working scenario and/or a working mode.

Go back to S1003 and S1003'.

S1003: If the method is applied to the headset, determine a to-be-played signal, and play the to-be-played signal, so that the to-be-played signal is superimposed with the ambient sound, the ambient noise is canceled, and the wanted signal is retained.

In an example, the headset may process the reference signal by using an active noise cancellation architecture, to obtain a phase-inverted signal of the ambient audio signal. It may be understood that the phase-inverted signal may be a phase-inverted signal obtained after simple symbol negation is performed on the reference signal or after calculation is performed on the reference signal in some specific manners. The phase-inverted signal is the to-be-played signal. Processing the reference signal by using the active noise cancellation architecture may be processing the reference signal by using an adaptive filtering architecture. For example, the headset may determine the phase-inverted signal of the ambient audio signal based on the reference signal and a weight coefficient of an adaptive filter.

In an example, the headset may further capture a sound field feature of a quiet zone of the headset, and then determine an updated weight coefficient based on the sound field feature, the weight coefficient of the adaptive filter, and the reference signal, to determine a phase-inverted signal of an ambient audio signal next time, that is, a to-be-played signal.

S1003': If the method is applied to the collaboration device, determine a to-be-played signal, and send the to-be-played signal to the headset, so that the headset plays the to-be-played signal, the to-be-played signal is superimposed with the ambient sound, the ambient noise is canceled, and the wanted signal is retained.

In another embodiment, as shown in FIG. 10*b*, after S1001 and before S1002, the working status of the collaboration device and/or the working status of the headset may be further determined, and wanted information related to the working status is determined based on the working status. For example, before S1002, the method may further include the following steps.

S1006: Determine at least one wanted signal.

The collaboration device or the headset determines at least one wanted signal, where the wanted signal may be prestored in the collaboration device or the headset. Alternatively, the wanted signal may be determined from the ambient audio signal. For a specific manner, refer to descriptions of a corresponding part in S1002. However, it should be understood that, after the wanted signal is determined in S1006, the wanted signal does not need to be determined again in S1002, but the at least one wanted signal is directly removed from the ambient audio signal.

S1007: Perform band-pass filtering on the at least one wanted signal to obtain at least one filtered wanted signal.

Before removing the wanted signal from the ambient audio signal, the collaboration device or the headset may further perform band-pass filtering on the wanted signal to determine the filtered wanted signal.

When the headset performs active noise cancellation, an upper limit of an audio frequency is generally about 1 kHz, that is, active noise cancellation of 0 kHz to 1 kHz can be implemented theoretically. When the audio frequency exceeds 1 kHz, a noise cancellation effect becomes less obvious. For example, if a frequency of the wanted signal is relatively high, for example, 3 kHz or even 4 kHz or higher, because active noise cancellation has a poor noise cancellation effect for such a high-frequency signal, no matter whether active noise cancellation is performed on such audio, the user can hear such a high-frequency sound. Obviously, if the wanted signal is within the frequency range, computing power is increased in vain and power consumption is increased, and the user can still hear the sound. Therefore, considering that an active noise cancellation effect for some frequencies is not ideal, a wanted signal in a frequency band with a better noise cancellation effect may be determined, thereby reducing power consumption of a device and improving computing efficiency.

Therefore, a band-pass filtering range may be first determined, that is, a lower limit FL of band-pass filtering and an upper limit FH of band-pass filtering are determined. Then, band-pass filtering is performed on the at least one wanted signal based on the band-pass filtering range [FL, FH], to obtain at least one filtered wanted signal.

In an example, the band-pass filtering range [FL, FH] may be manually input by the user. Alternatively, several possible band-pass filtering ranges may be preconfigured, and then the user selects one from the possible band-pass filtering ranges.

In another example, the band-pass filtering range [FL, FH] may be determined based on current power level of the device. For example, a band-pass filtering range in a case of low power level is preconfigured. Then, it is determined, based on whether current power level of the device is sufficient or low, whether to perform band-pass filtering on the wanted signal. It may be understood that, whether the current power level of the device is sufficient or low may be determined by using a preset power level threshold (for example, 30%). If the current power level is greater than or equal to the power level threshold, it is considered that the current power level is sufficient; otherwise, it is considered that the current power level is low.

In still another example, the band-pass filtering range [FL, FH] may be determined based on a noise-canceled error signal e(c) captured by an error microphone deployed on the headset. For example, a high-frequency component of e(c) is obtained through fast Fourier transform (FFT) based on e(c). Then, a start frequency of the high-frequency component is used as FH. In this manner, an appropriate band-pass filtering range may be determined based on an actual noise cancellation capability of the device. FL may be set to 0. It may be understood that the determining the start frequency of the high-frequency component of e(c) may be implemented in an existing manner, and details are not described herein again.

In still another example, with reference to S1004 and S1005 in FIG. 10*a*, the band-pass filtering range [FL, FH] may alternatively be determined based on a working scenario and/or a working mode. For example, reference may be made to a table of a correspondence between a working scenario and a band-pass filtering range shown in Table 3.

TABLE 3

| Work scenario | FL (Hz) | FH (Hz) |
|---|---|---|
| Outdoor scenario | 0 | 1000 |
| Office scenario | 100 | 2000 |
| Hotspot scenario | 50 | 1500 |
| Home scenario | 300 | 1500 |

Certainly, it may be understood that Table 3 shows only some cases. Certainly, more working scenarios may be further included, and specific values of FL and FH corresponding to each working scenario may be randomly adjusted based on an actual situation. This is not limited herein in this application.

Table 4 shows a table of a correspondence between a working mode and a band-pass filtering range.

TABLE 4

| Working mode | FL (Hz) | FH (Hz) |
|---|---|---|
| Safe mode | 0 | 1500 |
| Business mode | 50 | 2000 |
| Leisure mode | 50 | 1500 |

Certainly, it may be understood that Table 4 shows only some cases. Certainly, more working modes may be further included, and specific values of FL and FH corresponding to each working mode may be randomly adjusted based on an actual situation. This is not limited herein in this application.

Apparently, the collaboration device or the headset may determine an appropriate band-pass filtering range [FL, FH] based on the correspondence in Table 1 and/or the correspondence in Table 2. It may be understood that, if the band-pass filtering range [FL, FH] is determined based on both the working mode and the working scenario, with reference to Table 1 and Table 2, an intersection set or a union set of band-pass filtering ranges [FL, FH] may be selected as a final band-pass filtering range [FL, FH].

After determining the band-pass filtering range [FL, FH] in the foregoing manner, the collaboration device or the headset performs band-pass filtering on the determined at least one wanted signal to obtain at least one filtered wanted signal, so that the at least one filtered wanted signal is used to obtain the reference signal in subsequent S1002 and subsequent steps are performed.

Because filtering processing is performed on the wanted signal in S1007, S1002 is replaced with S1002'.

S1002': Remove the at least one filtered wanted signal from the ambient audio signal, to obtain the reference signal, where the wanted signal includes target content.

It may be understood that, a difference between S1002' and S1002 lies only in that the wanted signal in S1002 is replaced with the filtered wanted signal.

By using the foregoing steps S1006 and S1007, a wanted signal in a frequency band that has relatively great impact on active noise cancellation is selected, and this part of wanted signal is retained, thereby reducing computing power, improving execution efficiency, and further saving more power consumption and improving performance.

Definitely, in some embodiments, with reference to steps S1004 and S1005 in FIG. 10*a* and steps S1006 and S1007 in FIG. 10*b*, a wanted signal corresponding to the working status is first determined, and then band-pass filtering is performed on the wanted signal to obtain a filtered wanted signal corresponding to the working status. For example, the procedure shown in FIG. 10*c* may include the following steps.

S1001: Capture an ambient sound, and determine an ambient audio signal.

S1004: Determine a working status.

S1005: Determine, based on the working status, at least one wanted signal related to the working status.

S1001, S1004, and S1005 are the same as corresponding steps in FIG. 10*a*, and details are not described herein again.

S1007': Perform band-pass filtering on the at least one wanted signal related to the working status to obtain at least one filtered wanted signal related to the working status.

A difference between S1007' and S1007 in FIG. 10*b* lies only in that the wanted signal on which band-pass filtering is to be performed is replaced with the wanted signal related to the working status. For a specific execution process, refer to descriptions in S1007. Details are not described herein again.

S1002": Remove the at least one filtered wanted signal related to the working status from the ambient audio signal, to obtain a reference signal, where the wanted signal includes target content.

A difference between S1002" and S1002 in FIG. 10*a* lies only in that the at least one wanted signal related to the working status is replaced with the at least one filtered wanted signal related to the working status. A difference between S1002" and S1002' in FIG. 10*b* lies only in that the at least one filtered wanted signal is replaced with the at least one filtered wanted signal related to the working status. Apparently, S1002" may be considered as a combination of S1002 and S1002'. For a specific execution process, refer to corresponding descriptions in S1002 and S1002'. Details are not described herein again in this application.

S1003: If the method is applied to the headset, determine a to-be-played signal, and play the to-be-played signal, so that the to-be-played signal is superimposed with the ambient sound, the ambient noise is canceled, and the wanted signal is retained.

S1003': If the method is applied to the collaboration device, determine a to-be-played signal, and send the to-be-played signal to the headset, so that the headset plays the to-be-played signal, so that the to-be-played signal is superimposed with the ambient sound, the ambient noise is canceled, and the wanted signal is retained.

S1003 and S1003' are the same as corresponding steps in FIG. 10a and FIG. 10b, and details are not described herein again.

The following describes in more details the solutions described in FIG. 10a to FIG. 10c with reference to more specific embodiments.

Figure 11:
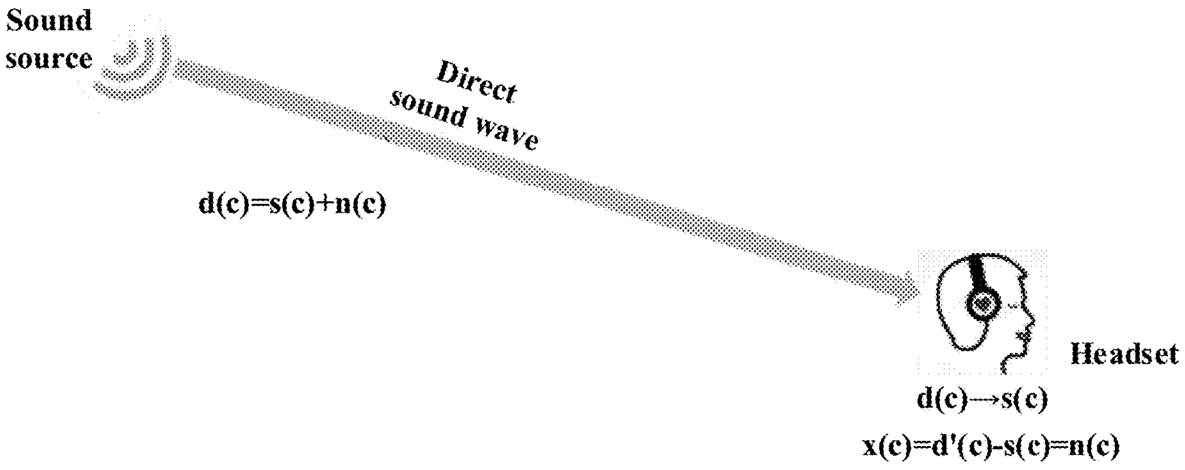
FIG. 11 is a schematic diagram of an active noise cancellation architecture according to an embodiment of this application.

In an embodiment, if the methods shown in FIG. 10a to FIG. 10c are applied to the headset, the active noise cancellation architecture may be shown in FIG. 11. After active noise cancellation is performed on the sound of the surrounding environment by using the headset, content that is of interest to the user is still retained. For example, the headset may extract a wanted signal from the ambient sound, or the wanted signal may be prestored in the headset. Then, the headset retains the wanted signal based on the determined wanted signal when performing active noise cancellation, so that the headset can suppress noise in an environment, and it is ensured that the user can still hear the wanted signal.

Figure 12:
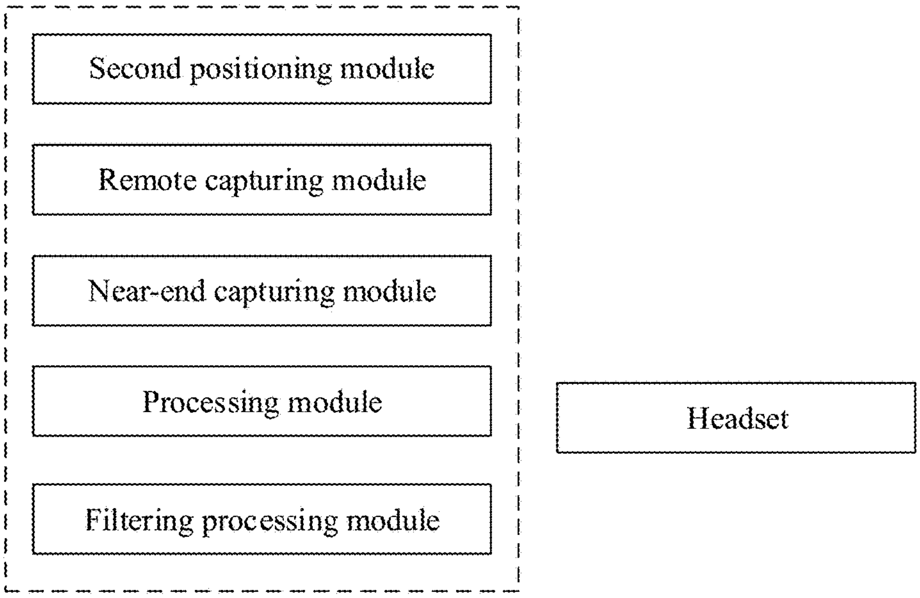
FIG. 12 is a schematic diagram of a headset module according to an embodiment of this application.

In an example, a schematic module diagram of the headset in FIG. 11 may be shown in FIG. 12. It can be seen that the headset may include a near-end capturing module, a remote capturing module, a filtering processing module, a processing module, and a second positioning module. The near-end capturing module and the remote capturing module are configured to capture an ambient audio signal. In an example, the remote capturing module and the near-end capturing module may be a same capturing module. The processing module may extract a wanted signal from the ambient audio signal. Definitely, the wanted signal may also be prestored and extracted from a memory of the headset. Then the headset removes the wanted signal from the ambient audio signal, and determines a reference signal. The filtering processing module is configured to perform filtering processing on the reference signal to obtain a to-be-played signal. Finally, when the headset plays the to-be-played signal, noise cancellation may be performed on noise in an environment, and content in which the user is interested is retained.

Figure 13:
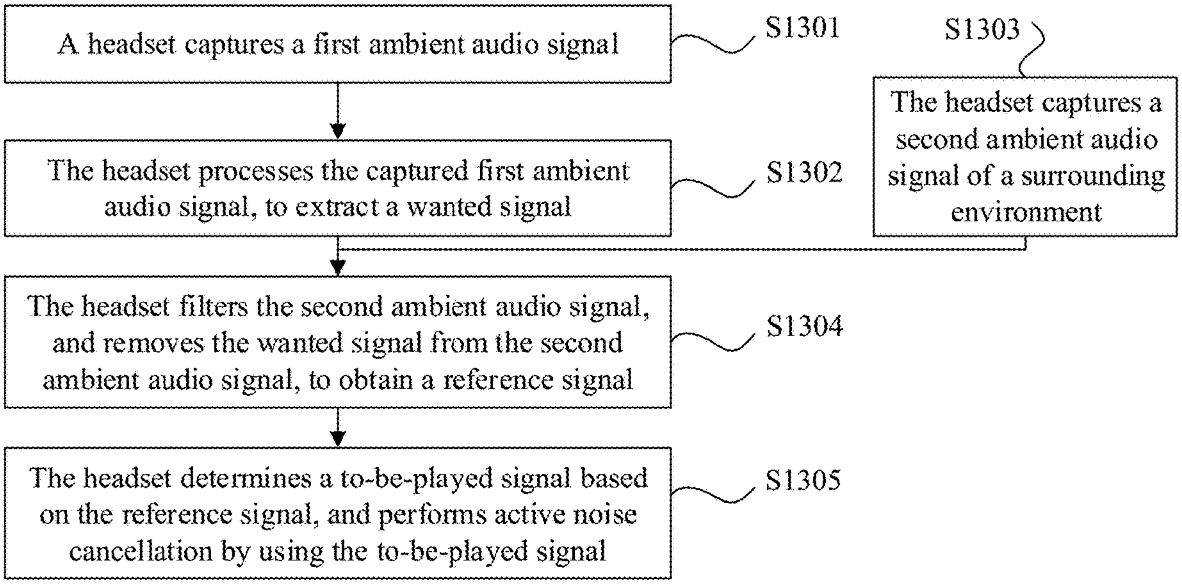
FIG. 13 is a flowchart of another active noise cancellation method according to an embodiment of this application.

With reference to FIG. 11 and FIG. 12, in an example, this application provides a more detailed flowchart of an active noise cancellation method. For example, as shown in FIG. 13, the method is mainly applied to a headset, and the method may include the following steps.

S1301: The headset captures a first ambient audio signal.

The headset captures a sound of a surrounding environment by using the remote capturing module, to obtain the first ambient audio signal d(c) of the surrounding environment. It may be understood that, in this case, the first ambient audio signal d(c) includes a wanted signal s(c) and a noise signal n(c).

S1302: The headset processes the captured first ambient audio signal, to extract the wanted signal.

The headset processes, by using the processing module, the first ambient audio signal d(c) captured in S1301, to extract the wanted signal s(c). It may be understood that the wanted signal s(c) is an audio signal of interest, or an audio signal related to some requirements. Apparently, the wanted signal s(c) is a signal that the user expects to still hear after the headset performs active noise cancellation.

In an example, the wanted signal s(c) may be an audio signal having some keywords, or a voice of some specific people speaking, or the like. Certainly, the wanted signal may alternatively be any audio signal that the user expects to retain. This is not limited in this application.

In another example, the wanted signal s(c) may be prestored in the headset. Therefore, if the wanted signal s(c) is prestored in the headset, the headset may not perform S1301 or S1302, but directly obtain the wanted signal s(c) prestored in the memory.

S1303: The headset captures a second ambient audio signal of the surrounding environment.

The headset may capture an ambient sound outside the headset by using the near-end capturing module, and use the ambient sound as the second ambient audio signal d'(c). In an example, the near-end capturing module may be a reference sensor, and is configured to capture an ambient sound outside the headset as the second ambient signal d'(c). It may be understood that S1303 may be performed at any moment before, between, or after S1301 to S1304. This is not limited in this application.

Certainly, in some examples, the near-end capturing module and the remote capturing module in the headset may be a same module. Therefore, the headset may directly use the first ambient audio signal d(c) as the second ambient audio signal d'(c). This avoids repeated capturing, improves a running speed, and reduces power consumption.

S1304: The headset filters the second ambient audio signal, and removes the wanted signal from the second ambient audio signal, to obtain a reference signal.

The filtering processing module in the headset may filter the second ambient audio signal d'(c), and remove the wanted signal s(c) from the second ambient audio signal d'(c). It may be understood that the wanted signal s(c) obtained in S1302 and the second ambient audio signal d'(c) captured in S1303 need to be used in S1304. Therefore, S1304 needs to be performed after S1302 and S1303 are performed.

It can be learned from FIG. 11 that, after the headset removes the wanted signal s(c) from the second ambient audio signal d'(c), only the noise signal n(c) is retained in the obtained reference signal x(c).

S1305: The headset determines a to-be-played signal based on the reference signal, and performs active noise cancellation by using the to-be-played signal.

The headset uses the reference signal x(c) obtained in S1304 as a compensation signal used by the active noise cancellation headset, and obtains a phase-inverted signal y(c) of the reference signal x(c) by using the adaptive filter. It may be understood that, the phase-inverted signal y(c) is a to-be-played signal, and is used to cancel content of interest in the reference signal x(c) captured by the headset. The headset suppresses noise in an external environment by playing the phase-inverted signal y(c), so that a noise-canceled error signal e(c) captured by the error sensor in the headset still includes the wanted signal s(c).

In an example, the collaboration device may further include a first positioning module, and/or the headset may further include the second positioning module, so that the collaboration device and/or the headset may perform positioning according to the positioning module on the collaboration device and/or the positioning module on the headset, and obtain geographical location information of the collaboration device and/or the headset. The geographic location information of the collaboration device may be sent to the headset in a wireless manner. Therefore, the headset may further include a second wireless module, configured to receive the geographic location information of the collaboration device by using the second wireless module. The collaboration device may include a first wireless module, configured to send the geographical location information of the collaboration device to the headset by using the first wireless module. Then, the headset may determine, based on the geographical location information of the collaboration device and/or the headset, a possible scenario in which the user is located, and determine, based on different use scenarios, a possible wanted signal s(c) in a corresponding scenario. For a specific manner, refer to corresponding descriptions in FIG. 10*a* to FIG. 10*c*. Details are not described herein again.

Figure 14:
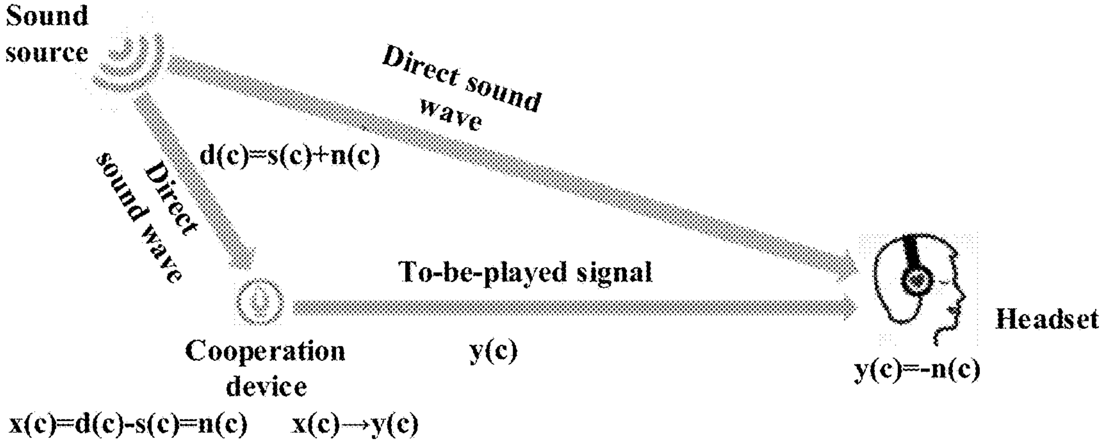
FIG. 14 is a schematic diagram of another active noise cancellation architecture according to an embodiment of this application.

In another embodiment, if the methods shown in FIG. 10*a* to FIG. 10*c* are applied to the collaboration device, the active noise cancellation architecture may be shown in FIG. 14. The collaboration device determines the wanted signal of interest, and removes the wanted signal from the ambient audio signal, to obtain the reference signal. Then, the collaboration device determines the to-be-played signal based on the reference signal. The to-be-played signal is sent to the headset, so that when the headset performs active noise cancellation by using the to-be-played signal, the noise in the environment can be suppressed and the content of interest can be retained.

Figure 15:
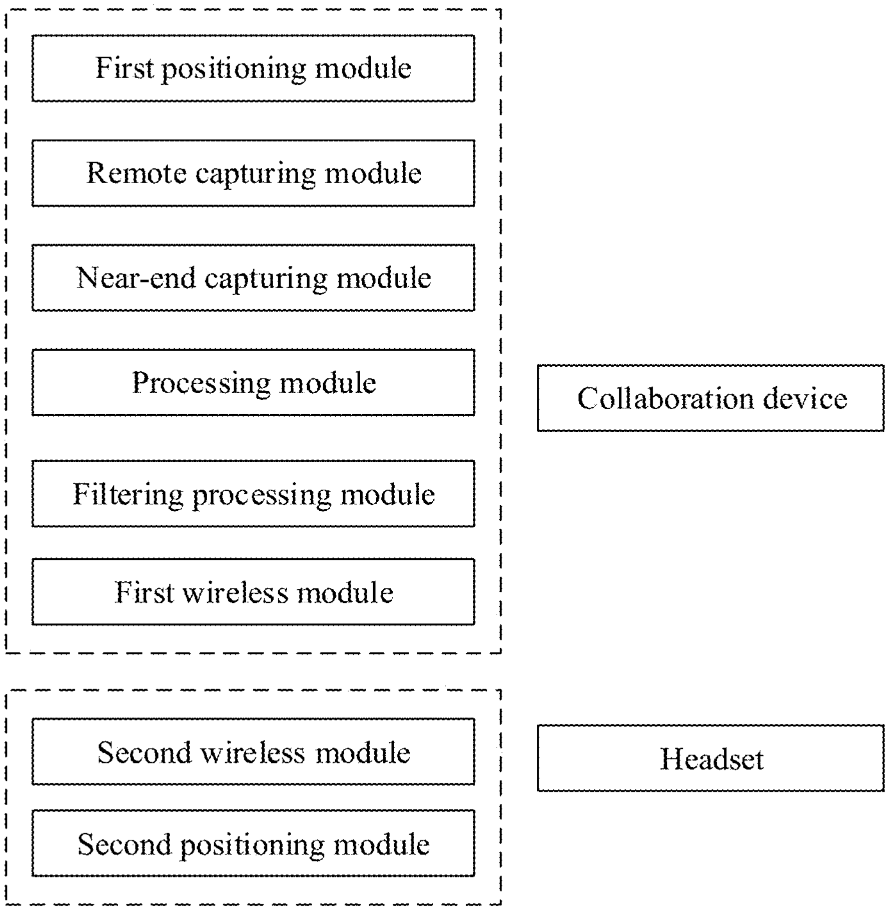
FIG. 15 is a schematic diagram of another active noise cancellation module according to an embodiment of this application.

In an example, a schematic module diagram of the collaboration device and the headset in FIG. 12 may be shown in FIG. 15. It can be learned that the collaboration device includes a remote capturing module, a near-end capturing module, a processing module, a filtering processing module, and a wireless module. In other words, after capturing a first ambient audio signal d(c), the collaboration device may determine a wanted signal s(c) from the first ambient audio signal d(c). The collaboration device further captures a second ambient audio signal d'(c), and removes the wanted signal s(c) from the second ambient audio signal d'(c) by using the processing module, to obtain a reference signal x(c). The processing module of the collaboration device is further configured to determine a to-be-played signal y(c) based on the reference signal x(c), and then send the reference signal x(c) to the headset by using the first wireless module. The headset may include only a second wireless module, configured to receive the to-be-played signal y(c). Then, active noise cancellation is performed by using the to-be-played signal. In some examples, the remote capturing module and the near-end capturing module may be a same capturing module.

Figure 16:
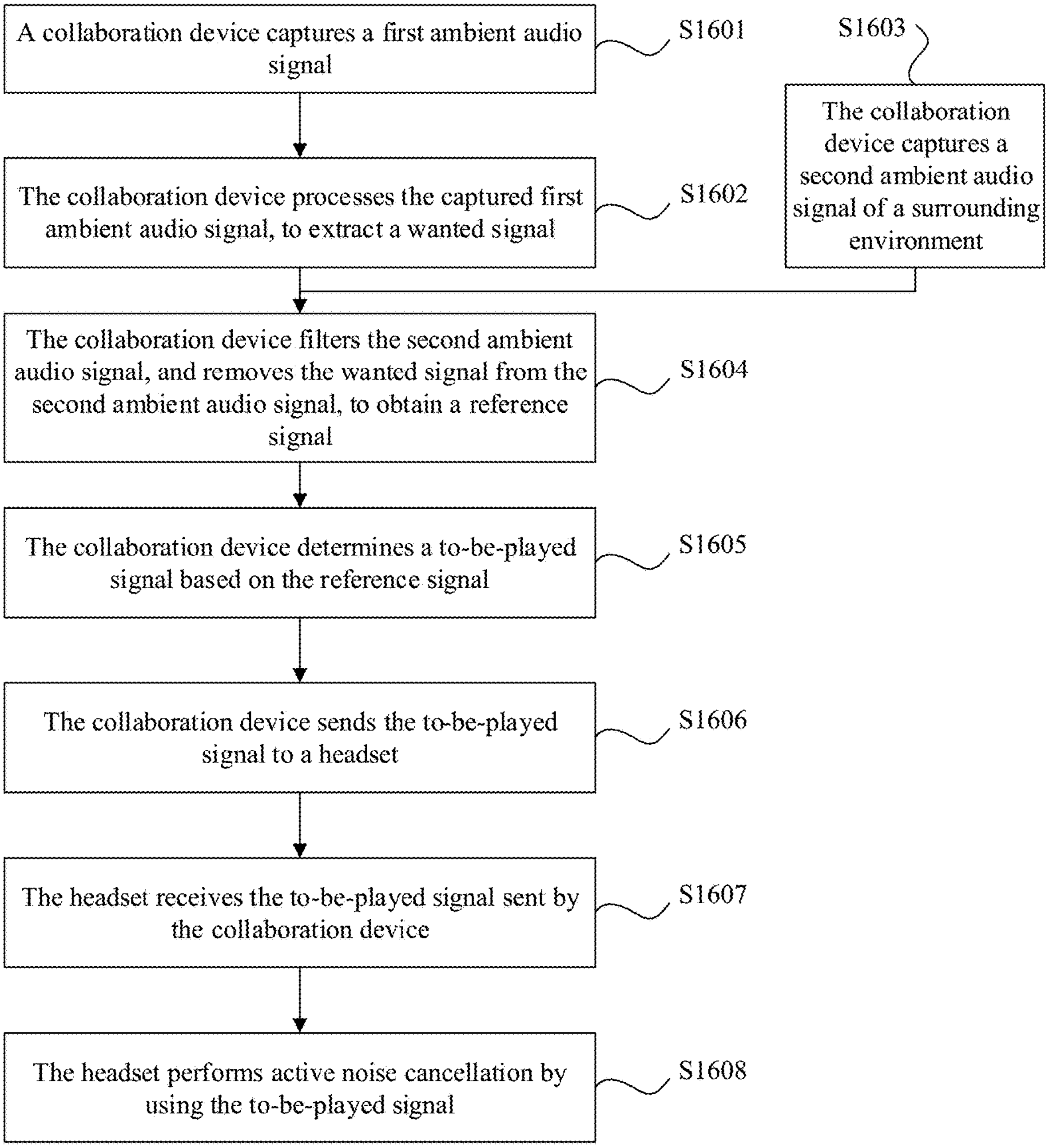
FIG. 16 is a flowchart of another active noise cancellation method according to an embodiment of this application.

With reference to FIG. 14 and FIG. 15, in an embodiment, for example, FIG. 16 is a flowchart of another active noise cancellation method. The method may include the following steps:

S1601: The collaboration device captures a first ambient audio signal.

The collaboration device may capture a sound of a surrounding environment by using the remote capturing module, to obtain the first ambient audio signal d(c) of the surrounding environment.

S1602: The collaboration device processes the captured first ambient audio signal, to extract a wanted signal.

The collaboration device processes, by using the processing module, the first ambient audio signal d(c) captured in S1601, and extracts the wanted signal s(c). In an example, the wanted signal s(c) may be prestored in the collaboration device. Therefore, if the wanted signal s(c) is prestored in the collaboration device, the headset may not perform S1301 or S1302, but directly obtain the wanted signal s(c) prestored in the memory.

S1603: The collaboration device captures a second ambient audio signal of the surrounding environment.

The collaboration device may capture an ambient sound outside the collaboration device by using the near-end capturing module, and use the ambient sound as the second ambient audio signal d'(c). In an example, the near-end capturing module may be a reference sensor, and is configured to capture an ambient sound outside the collaboration device as the second ambient audio signal d'(c). It may be understood that, in an example, the remote capturing module and the near-end capturing module in the collaboration device may be a same capturing module, so that the collaboration device can directly use the captured first ambient audio signal d(c) as the second ambient audio signal d'(c), thereby avoiding a resource waste caused by multiple times of capturing performed by the collaboration device.

It may be understood that S1603 may be performed at any moment before, between, or after S1601 and S1602. This is not limited in this application.

S1604: The collaboration device filters the second ambient audio signal, and removes the wanted signal from the second ambient audio signal, to obtain a reference signal.

The collaboration device may further include a filtering processing module, configured to filter the second ambient audio signal d'(c), and remove the wanted signal s(c) from the second ambient audio signal d'(c) to obtain the reference signal x(c). It may be understood that because the wanted signal s(c) extracted in S1602 and the second ambient audio signal d'(c) captured in S1603 need to be used in S1604, S1604 needs to be performed after S1602 and S1603 are performed.

S1605: The collaboration device determines a to-be-played signal based on the reference signal.

The collaboration device uses the reference signal x(c) obtained in S1604 as a compensation signal used for active noise cancellation, and obtains a phase-inverted signal y(c) of the reference signal x(c) by using an adaptive filter, that is, the to-be-played signal.

S1606: The collaboration device sends the to-be-played signal to the headset.

The collaboration device may send the phase-inverted signal y(c) obtained in S1604 to the headset by using the first wireless module.

In an example, the phase-inverted signal y(c) may be sent by using a wireless module in a wireless manner, for example, any possible wireless manner such as Bluetooth, ZigBee, Wi-Fi, GSM, CDMA, GPRS, WCDMA, TD-SCDMA, CDMA 2000, LTE, LTE-A, e-LTE, and NR.

S1607: The headset receives the to-be-played signal sent by the collaboration device.

The headset may receive, by using the second wireless module in the headset, the phase-inverted signal y(c) sent by the collaboration device in S1606.

S1608: The headset performs active noise cancellation by using the to-be-played signal.

The headset suppresses noise in the external environment by playing the phase-inverted signal y(c), so that a noise-canceled error signal e(c) captured by the error sensor in the headset still includes the wanted signal s(c).

In an example, the collaboration device may further include a first positioning module, and/or the headset may further include a second positioning module. In this way, the collaboration device and/or the headset may perform positioning according to the positioning module on the collaboration device and/or the positioning module on the headset, to obtain geographical location information of the collaboration device and/or the headset. The geographical location information of the headset may be sent to the collaboration device in a wireless manner. For example, the headset sends the geographical location information of the headset to the collaboration device by using the second wireless module, and the collaboration device receives the geographical location information of the headset by using the first wireless module. Then, the collaboration device may determine, based on the geographical location information of the collaboration device and/or the headset, a possible scenario in which the user is located, and determine, based on different use scenarios, a possible wanted signal s(c) in a corresponding scenario. For a specific manner, refer to corresponding descriptions in FIG. 10*a* to FIG. 10*c*. Details are not described herein again.

Figure 17:
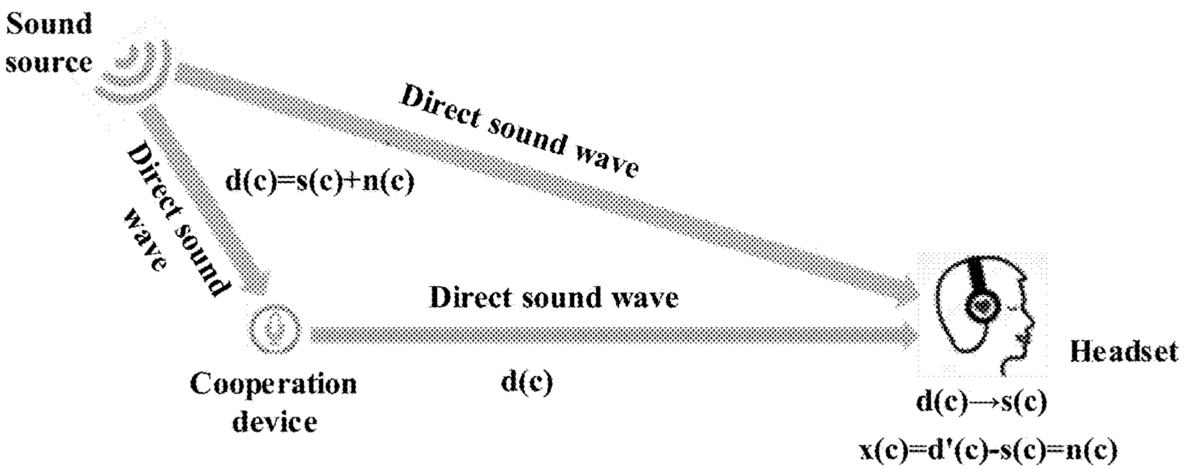
FIG. 17 is a schematic diagram of still another active noise cancellation architecture according to an embodiment of this application.
Figure 18:
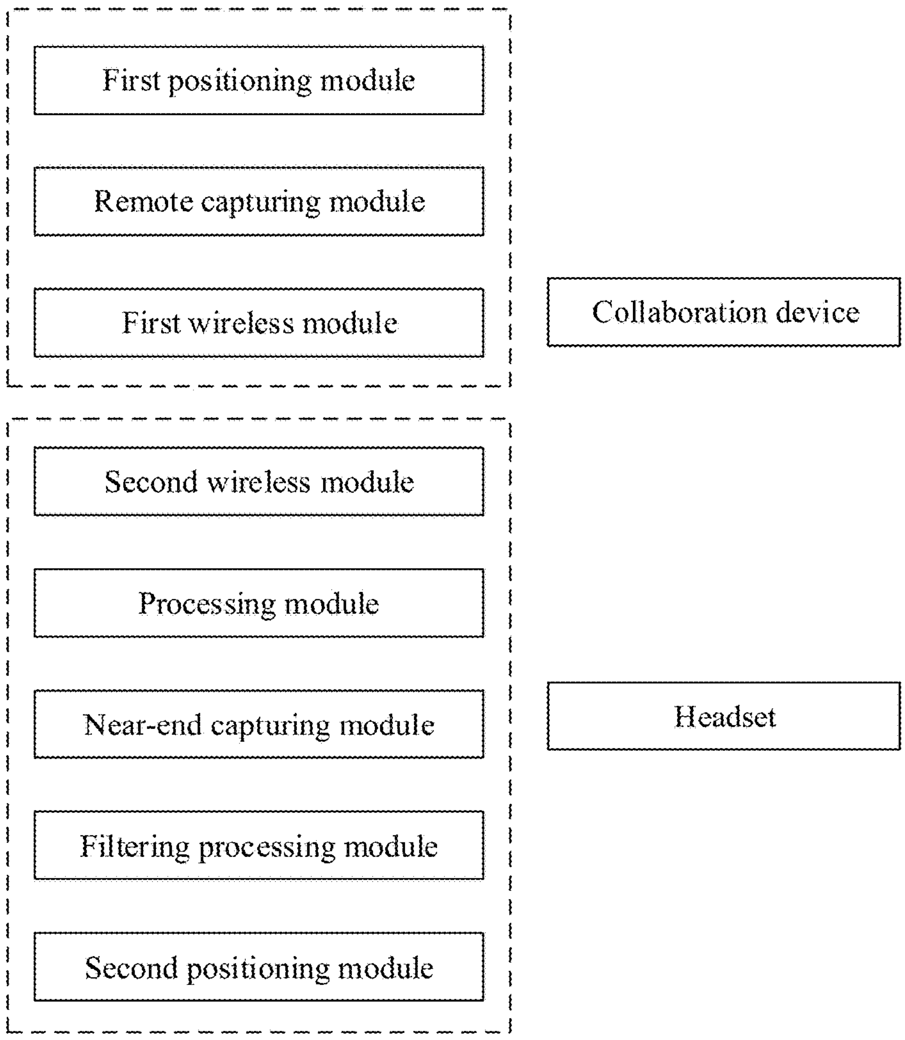
FIG. 18 is a schematic diagram of still another active noise cancellation module according to an embodiment of this application.

In still another embodiment, if the method shown in FIG. 10*a* to FIG. 10*c* is applied to the headset, the active noise cancellation architecture may be further shown in FIG. 17. The first ambient audio signal required by the headset may be captured by the collaboration device and sent by the collaboration device to the headset. For example, FIG. 18 is a schematic diagram of another active noise cancellation module. It can be learned that the collaboration device includes only a remote capturing module and a first wireless module. After capturing the first ambient audio signal d(c), the collaboration device may transmit the first ambient audio signal d(c) to the headset by using the wireless module. The headset may include a second wireless module, a processing module, a near-end capturing module, and a filtering processing module. The modules in the headset are the same as the corresponding modules in FIG. 12, and reference may be made to corresponding descriptions in FIG. 12. Details are not described herein again.

Figure 19:
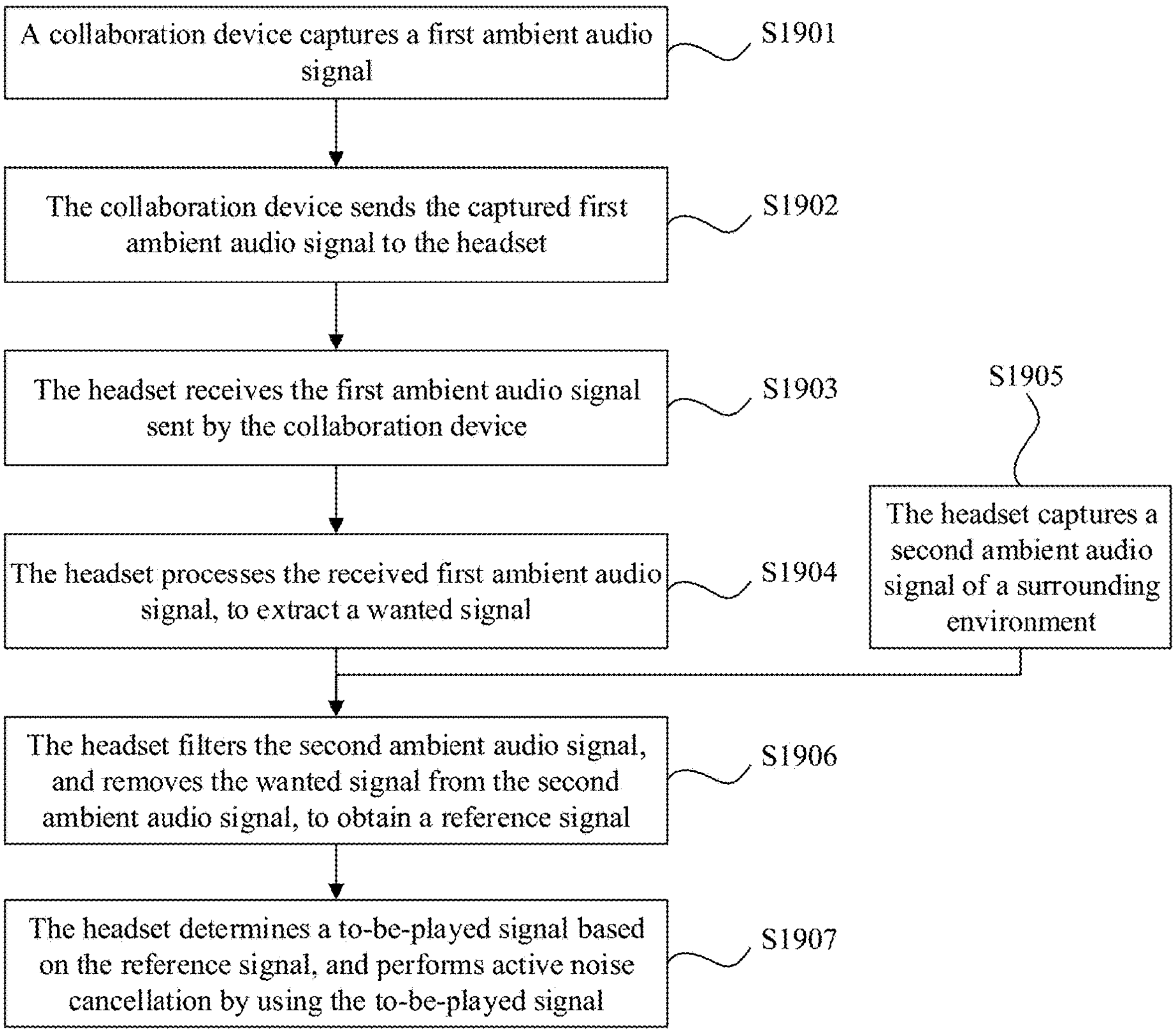
FIG. 19 is a flowchart of still another active noise cancellation method according to an embodiment of this application.

With reference to FIG. 17 and FIG. 18, in an embodiment, for example, FIG. 19 is a flowchart of still another active noise cancellation method. The method may include the following steps:

S1901: The collaboration device captures a first ambient audio signal.

S1901 is the same as S1601. For details, refer to related descriptions of S1601. Details are not described herein again.

S1902: The collaboration device sends the captured first ambient audio signal to the headset.

The collaboration device may send, to the headset by using the first wireless module, the first ambient audio signal d(c) captured in S1901.

In an example, the collaboration device may send the first ambient audio signal d(c) by using the first wireless module in a wireless manner, for example, any possible wireless manner such as Bluetooth, ZigBee, Wi-Fi, GSM, CDMA, GPRS, WCDMA, TD-SCDMA, CDMA 2000, LTE, LTE-A, e-LTE, or NR.

S1903: The headset receives the first ambient audio signal sent by the collaboration device.

The headset may receive, by using the second wireless module in the headset, the first ambient audio signal d(c) sent by the collaboration device in S1902.

S1904: The headset processes the received first ambient audio signal, to extract a wanted signal.

S1905: The headset captures a second ambient audio signal of a surrounding environment.

S1906: The headset filters the second ambient audio signal, and removes the wanted signal from the second ambient audio signal, to obtain a reference signal.

S1907: The headset determines a to-be-played signal based on the reference signal, and performs active noise cancellation by using the to-be-played signal.

S1904, S1905, S1906, and S1907 are the same as S1302, S1303, S1304, and S1305. For details, refer to related descriptions of S1302, S1303, S1304, and S1305. Details are not described herein again. It should be noted that S1905 may be performed at any moment before, between, or after S1901 to S1904. This is not limited in this application.

In an example, the collaboration device may further include a first positioning module, and/or the headset may further include a second positioning module. In this way, the collaboration device and/or the headset may perform positioning according to the positioning module on the collaboration device and/or the positioning module on the headset, and obtain geographical location information of the collaboration device and/or the headset. The geographical location information of the collaboration device may be sent to the headset in a wireless manner. For example, the collaboration device sends the geographical location information of the collaboration device to the headset by using the first wireless module, and the headset receives the geographical location information of the collaboration device by using the second wireless module. Then, the headset determines, based on the geographic location information of the collaboration device and/or the headset, a possible scenario in which the user is located, and determines, based on different use scenarios, a possible wanted signal s(c) in a corresponding scenario. For a specific manner, refer to corresponding descriptions in FIG. 10*a* to FIG. 10*c*. Details are not described herein again.

In this application, the collaboration device captures the first ambient audio signal, and extracts the wanted signal from the first ambient audio signal. Then, the wanted signal is sent to the headset, so that the headset may remove the wanted signal from the second ambient audio signal based on the wanted signal, to obtain the reference signal. Alternatively, after capturing the first ambient audio signal, the collaboration device sends the first ambient audio signal to the headset. Then, the headset determines the wanted signal from the received first ambient audio signal, and removes the wanted signal from the second ambient audio signal, to obtain the reference signal. In this way, when the headset performs active noise cancellation, it can be ensured that the user can still hear content related to the wanted signal, and audio content in which the user is interested is retained.

Certainly, when all the methods shown in FIG. 10*a* to FIG. 10*c* are applied to the headset, when determining the wanted signal or the reference signal, the headset may further perform directional capturing in some directions by using a microphone array. In this case, the active noise cancellation architecture may also be shown in FIG. 20. It can be learned that, in this architecture, the near-end capturing module of the headset may perform directional capturing, for example, does not capture an audio signal in a direction in which a user is interested. When the headset captures an ambient audio signal, the captured audio signal does not include an audio signal in a direction of interest. Therefore, the headset may directly use the captured audio signal as the reference signal x(c). It may be understood that the reference signal x(c) captured by the headset includes only a noise signal n(c).

Figure 20:
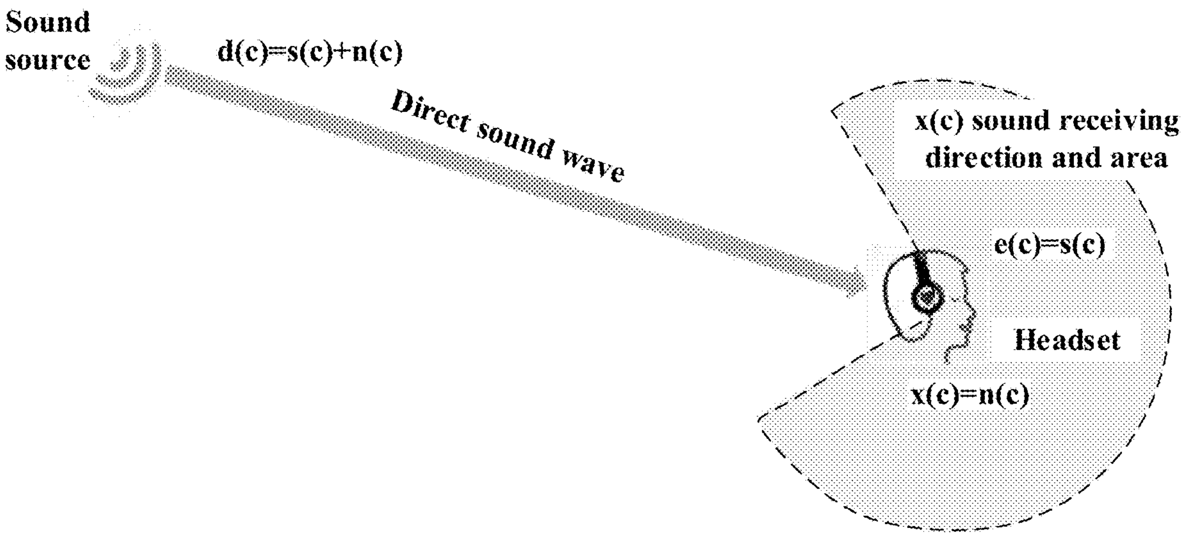
FIG. 20 is a schematic diagram of yet another active noise cancellation architecture according to an embodiment of this application.
Figure 21:
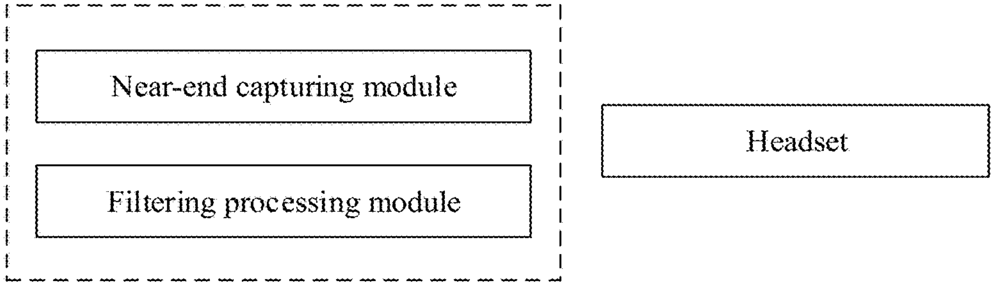
FIG. 21 is a schematic diagram of yet another active noise cancellation module according to an embodiment of this application.

Apparently, based on the active noise cancellation architecture shown in FIG. 20, FIG. 21 provides a schematic diagram of yet another active noise cancellation module. The headset includes a near-end capturing module configured to perform directional capturing on an audio signal, and further includes a filtering processing module configured to improve a specific frequency band. Certainly, in some examples, the headset may further include a wireless module configured to connect the headset to another terminal device, for example, a mobile phone, a tablet computer, a notebook computer, or a wearable device.

Figure 22:
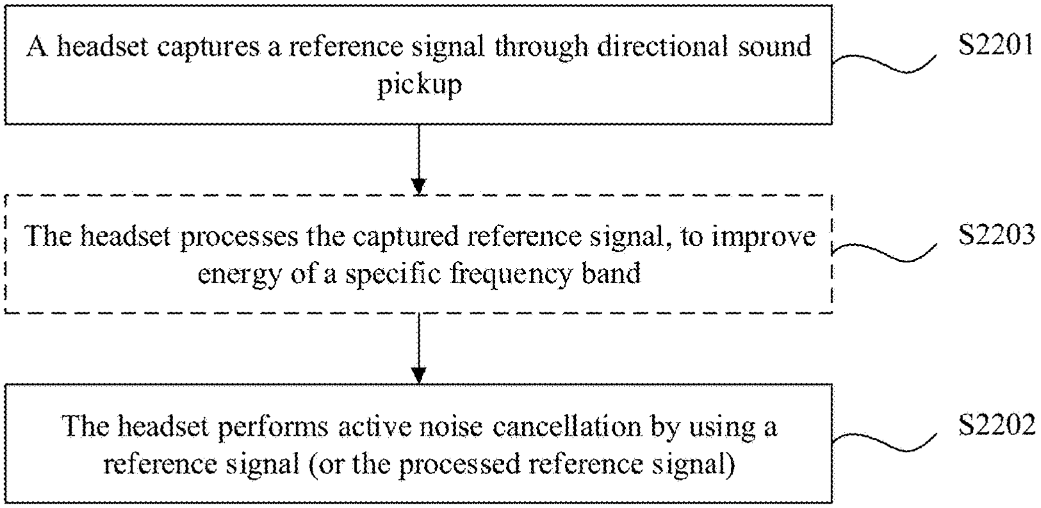
FIG. 22 is a flowchart of yet another active noise cancellation method according to an embodiment of this application.

With reference to FIG. 20 and FIG. 21, in an embodiment, this application provides a flowchart of yet another active noise cancellation method, for example, as shown in FIG. 22. The method is mainly applied to the headset, and directional sound pickup is performed by using the headset, so that when the headset performs active noise cancellation, a reference signal does not include an audio signal in a direction of interest, so that content of interest can be retained after noise cancellation. The method may include the following steps.

S2201: The headset captures a reference signal through directional sound pickup.

The headset may perform directional sound pickup, and does not capture an audio signal in a direction of interest, so that the captured reference signal x(c) does not include an audio signal in the direction of interest. In other words, the headset may capture only an audio signal in a direction in which the user is not interested. In this case, the captured audio signal definitely does not include content in which the user is interested, and the captured audio signal may be directly used as the reference signal x(c).

S2202: The headset performs active noise cancellation by using the reference signal.

After the headset captures the reference signal x(c) through directional sound pickup, the reference signal x(c) may be directly used to perform active noise cancellation. It can be figured out that after ANC noise cancellation, the user can still hear audio in the direction of interest.

Certainly, in some examples, before S2202, the method may further include the following step:

S2203: The headset processes the captured reference signal, to improve energy of a specific frequency band.

The headset processes the reference signal x(c) captured in S2201, to obtain a processed reference signal x'(c). For example, energy of some specific frequency bands is increased, and/or energy of other frequency bands is reduced. In this way, some specific frequency bands in the reference signal x(c) are promoted and highlighted. Certainly, it may be understood that if the reference signal x(c) is processed in S2203, in S2202, the headset needs to perform active noise cancellation by using the processed reference signal x'(c).

Certainly, in still another example, in S2201, omnidirectional capturing may be performed to obtain a second ambient audio signal d'(c), and then in S2202, the second ambient audio signal d'(c) obtained through omnidirectional capturing is processed. In other words, the headset may process an audio signal captured omnidirectionally, or may process an audio signal captured directionally. This is not limited in this application.

In this application, the headset may be further used to perform directional capturing of a reference signal, and/or perform filtering processing on the reference signal. When the headset performs active noise cancellation based on the reference signal, audio in a specific direction and/or audio of a specific frequency may be retained, to ensure that the user can perceive the retained audio in the specific direction and/or audio of the specific frequency.

Certainly, in another embodiment, this application further provides an active noise cancellation system. The system may include a collaboration device and a headset. In the system, the collaboration device cooperates with the headset, and some functions are implemented on the collaboration device. In addition, the collaboration device interacts with the headset, so that the headset can finally obtain a to-be-played signal and perform active noise cancellation. It is ensured that the headset can remove noise in an environment during active noise cancellation, and retain content that is of interest to the user.

Figure 23:
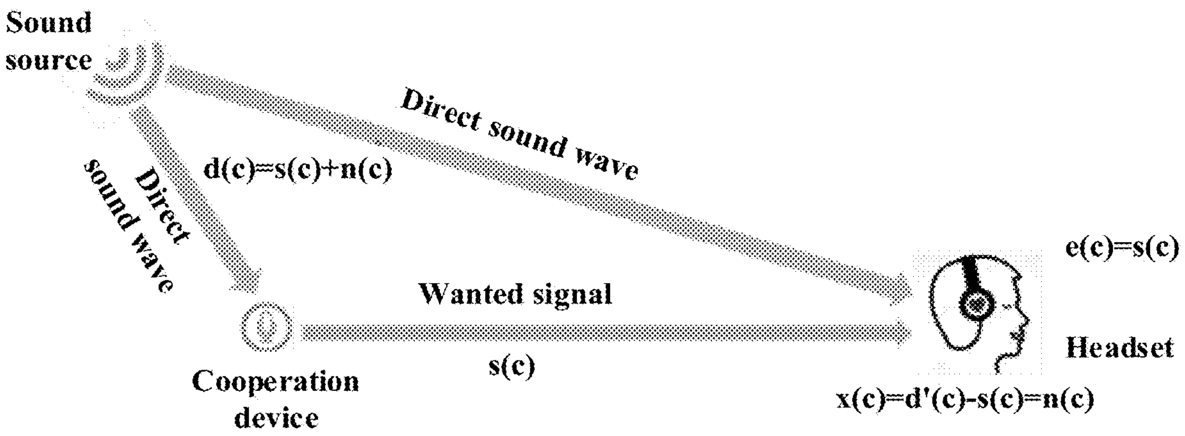
FIG. 23 is a schematic diagram of another active noise cancellation architecture according to an embodiment of this application.

FIG. 23 is a schematic diagram of another active noise cancellation architecture according to an embodiment of this application.

The active noise cancellation architecture in this application may include a collaboration device and a headset. The collaboration device cooperates with the headset, so that a user can still hear a wanted signal after active noise cancellation. The collaboration device may be configured to receive a sound of a surrounding environment, for example, a direct sound wave directly emitted by a sound source. Then, after extracting and removing the wanted signal, the collaboration device sends the wanted signal to the headset. In this way, when performing active noise cancellation, the headset retains the wanted signal, so that the active noise cancellation headset can ensure that the user can hear the wanted signal while suppressing noise.

It may be understood that, the collaboration device and the headset may be connected in a wireless manner, and exchange data in a wireless transmission manner.

Figure 24:
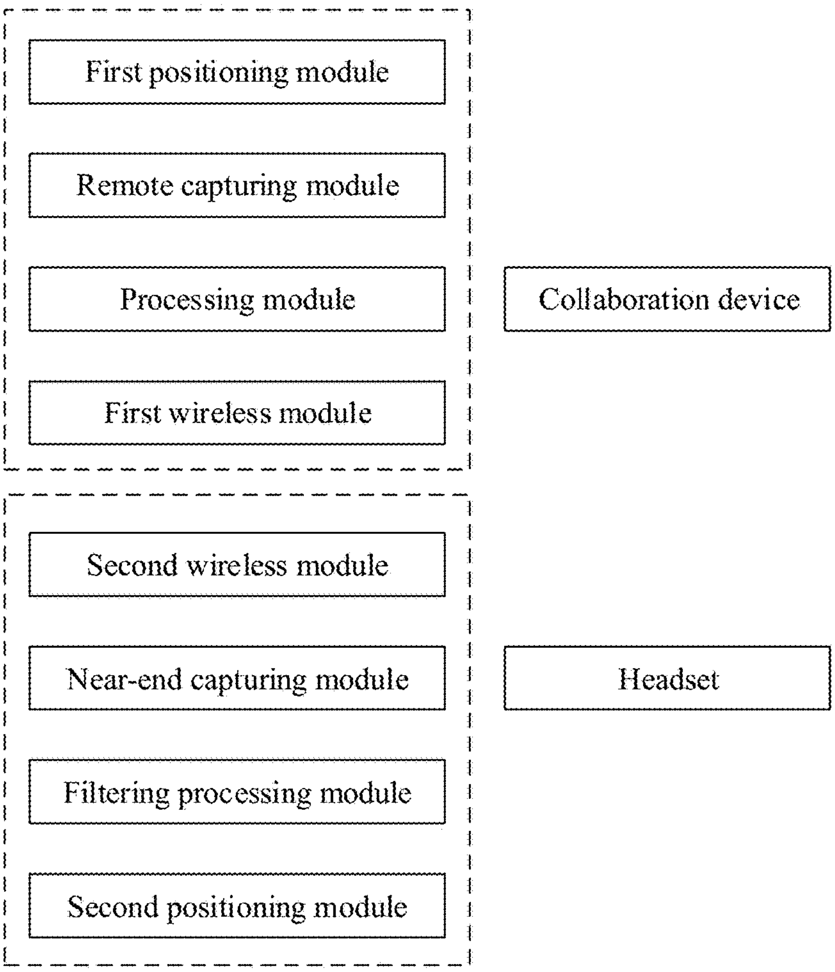
FIG. 24 is a schematic diagram of another active noise cancellation module according to an embodiment of this application.

In an example, a schematic module diagram of the collaboration device and the headset in FIG. 23 may be shown in FIG. 24. It may be learned that the collaboration device may include a remote capturing module, a processing module, and a first wireless module. The collaboration device is configured to capture an ambient audio signal, extract a wanted signal from the ambient signal, and transmit the wanted signal to the headset by using the first wireless module. In addition, the headset may include a second wireless module, a near-end capturing module, and a filtering processing module. The headset is configured to receive the wanted signal sent by the collaboration device, and remove the wanted signal from a captured reference signal based on the reference signal. Finally, the headset can retain the wanted signal while cancelling noise.

Figure 25:
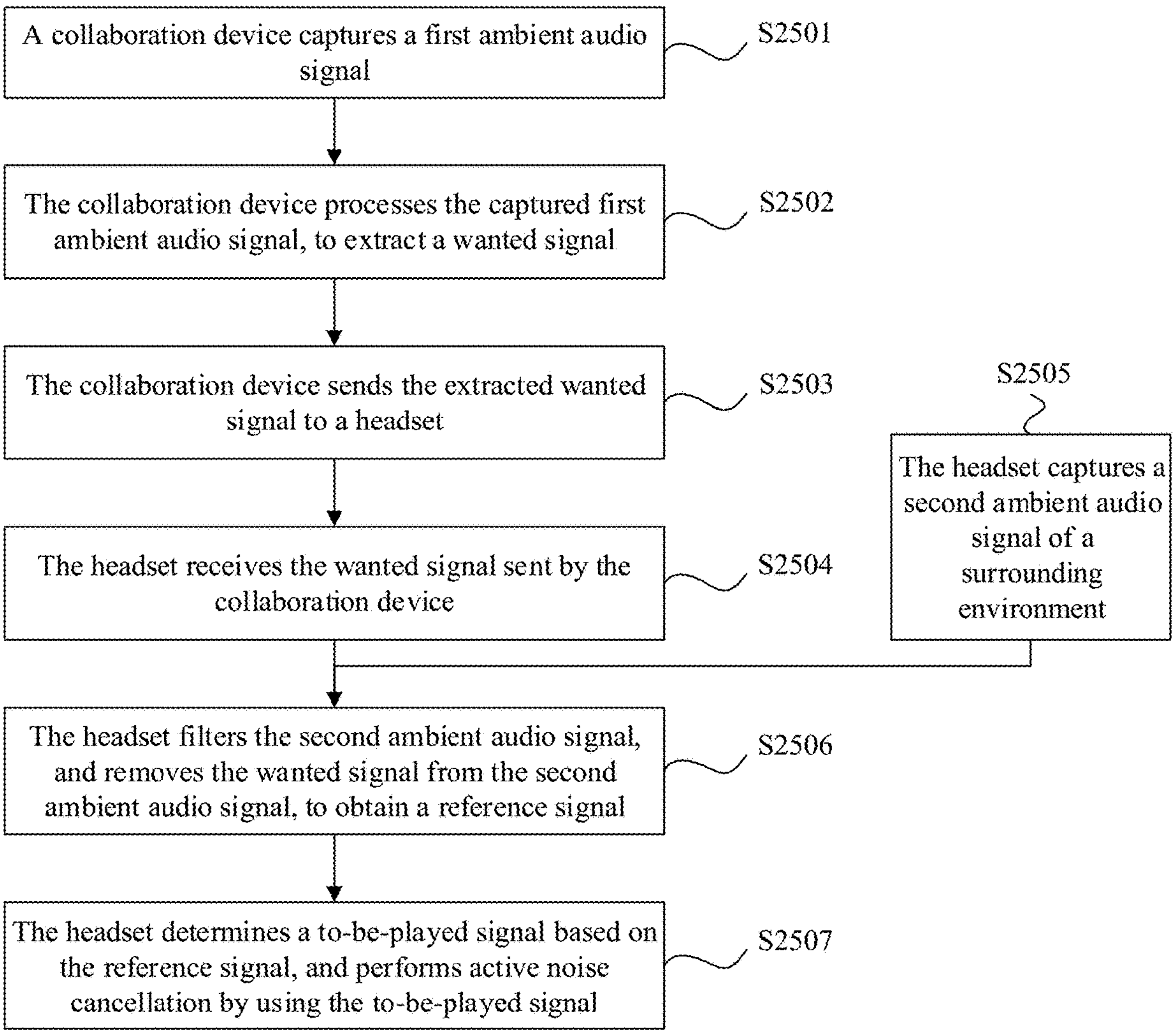
FIG. 25 is a flowchart of another active noise cancellation method according to an embodiment of this application.

With reference to FIG. 23 and FIG. 24, in an embodiment, this application provides a flowchart of another active noise cancellation method, for example, as shown in FIG. 25. The method is mainly applied to a collaboration device and a headset. The collaboration device sends a wanted signal to the headset, so that the headset can retain the wanted signal when performing active noise cancellation. The method may include the following steps.

S2501: The collaboration device captures a first ambient audio signal.

The collaboration device captures a sound of a surrounding environment by using the remote capturing module, to obtain the first ambient audio signal d(c) of the surrounding environment. It may be understood that, in this case, the first ambient audio signal d(c) includes a wanted signal s(c) and a noise signal n(c).

S2502: The collaboration device processes the captured first ambient audio signal, to extract the wanted signal.

The collaboration device processes, by using the processing module, the first ambient audio signal d(c) captured in S2501, and extracts the wanted signal s(c). The wanted signal is an audio signal of interest, or is a signal that the user wants to still hear after the headset performs active noise cancellation. The wanted signal may be an audio signal having some keywords, or a voice of a specific person speaking. In another example, the wanted signal s(c) may be prestored in the collaboration device. Therefore, if the wanted signal s(c) is prestored in the collaboration device, the collaboration device may not perform S2501 or S2502, but directly obtain the wanted signal s(c) prestored in the memory.

S2503: The collaboration device sends the extracted wanted signal to the headset.

After extracting the wanted signal s(c) in S2502, the collaboration device may send the wanted signal s(c) to the headset by using the first wireless module.

In an example, the collaboration device may send the wanted signal s(c) by using the first wireless module in a wireless manner, for example, Bluetooth, ZigBee, Wi-Fi, or a cellular network.

S2504: The headset receives the wanted signal sent by the collaboration device.

The headset may receive, by using the second wireless module in the headset, the wanted signal s(c) sent by the collaboration device in S2503.

S2505: The headset captures a second ambient audio signal of a surrounding environment.

The headset may capture an ambient sound outside the headset by using the near-end capturing module, and use the ambient sound as the second ambient audio signal d'(c). In an example, the near-end capturing module may be a reference sensor, and is configured to capture an ambient sound outside the headset as the second ambient signal d'(c).

It may be understood that S2505 may be performed at any moment before, between, or after S2501 to S2504. This is not limited in this application.

After S2504 and S2505 are performed, the method may further include the following step:

S2506: The headset filters the second ambient audio signal, and removes the wanted signal from the second ambient audio signal, to obtain a reference signal.

The filtering processing module in the headset may filter the second ambient audio signal d'(c), and remove the wanted signal s(c) from the second ambient audio signal d'(c). It may be understood that the wanted signal s(c) received in S2504 and the second ambient audio signal d'(c) captured in S2505 need to be used in S2506. Therefore, S2506 needs to be performed after S2504 and S2505 are performed.

It can be learned from FIG. 23 that the second ambient audio signal captured by the reference sensor of the headset is almost the same as the first ambient audio signal captured by the collaboration device, and each includes a wanted signal s(c) and a noise signal n(c). Therefore, after the headset removes the wanted signal s(c) from the second ambient audio signal d'(c), the obtained reference signal x(c) retains only the noise signal n(c).

S2507: The headset determines a to-be-played signal based on the reference signal, and performs active noise cancellation by using the to-be-played signal.

The headset uses the reference signal x(c) obtained in S2506 as a compensation signal used by the active noise cancellation headset, and obtains a phase-inverted signal y(c) of the reference signal x(c) by using an adaptive filter. It may be understood that the phase-inverted signal y(c) is used to cancel content of interest in the reference signal x(c) captured by the headset. The headset suppresses noise in an external environment by playing the phase-inverted signal y(c), so that a noise-canceled error signal e(c) captured by the error sensor in the headset still includes a wanted signal s(c).

In an example, the collaboration device may further include a first positioning module, and/or the headset may further include a second positioning module, so that the collaboration device and/or the headset may perform positioning according to the positioning module on the collaboration device and/or the positioning module on the headset, and obtain geographical location information of the collaboration device and/or the headset. The geographical location information of the headset may be sent to the collaboration device in a wireless manner. For example, the headset sends the geographical location information of the headset to the collaboration device by using the second wireless module, and the collaboration device receives the geographical location information of the headset by using the first wireless module. Then, the collaboration device may determine, based on the geographical location information of the collaboration device and/or the headset, a possible scenario in which the user is located, and determine, based on different use scenarios, a possible wanted signal s(c) in a corresponding scenario. For a specific manner, refer to corresponding descriptions in FIG. 10*a* to FIG. 10*c*. Details are not described herein again.

In some other examples, the collaboration device may further include a near-end capturing module, configured to capture a second ambient audio signal d'(c), and then remove the wanted signal from the second ambient audio signal d'(c), to obtain a reference signal x(c). Then, the collaboration device sends the reference signal x(c) to the headset. For the headset, the second ambient audio signal does not need to be captured, but filtering processing is directly performed based on the received reference signal x(c) to obtain the to-be-played signal.

In other words, the collaboration device does not need to extract the wanted signal, but directly sends the captured ambient signal to the headset by using the wireless module. The captured ambient signal does not need to be processed, and may be directly transmitted to the headset by using the wireless module. The headset may include a wireless module, a processing module, a near-end capturing module, and a filtering processing module. Obviously, processing is performed. Therefore, a corresponding processing module needs to be added to the headset, so that the headset processes the ambient signal and extracts a wanted signal. A wireless manner, for example, Bluetooth, may be used. The wanted signal is extracted. It may be understood that the wanted signal is an audio signal of interest, or an audio signal related to some requirements. The meanings are the same, and details are not described herein again. The wanted signal may be prestored in the mobile phone. If the wanted signal is prestored in the mobile phone, the extraction of the wanted signal may not be executed. After the wanted signal is extracted, filtering is performed, and the wanted signal is sent for active noise cancellation. For example, the wanted signal is removed. A reference signal is sent to the headset. Then, a to-be-played signal is determined, and the to-be-played signal is used. In an example, filtering is performed, and the wanted signal is removed. It may be understood that, the signal is sent to the headset by using a wireless module. A wireless manner, for example, Bluetooth, may be used. Refer to the foregoing FIG. 24, FIG. 18, and FIG. 15. The involved remote capturing module may be a microphone or a microphone array in an example, and is configured to capture an audio signal of a surrounding environment and/or separate and extract a sound source. The processing module is mainly configured to extract the wanted signal from the ambient signal. The first wireless module on the collaboration device and the second wireless module on the headset are mainly configured to establish a wireless link, and are used for communication between the collaboration device and the headset. In an example, the wireless module may perform wireless communication in any possible manner such as Bluetooth, ZigBee, Wi-Fi, GSM, CDMA, GPRS, WCDMA, TD-SCDMA, CDMA 2000, LTE, LTE-A, e-LTE, and NR. In an example, the near-end capturing module may be a microphone, and is configured to capture an ambient audio signal as a reference signal. Certainly, in some examples, when capturing an audio signal, the near-end capturing module may perform directional audio capturing. That is, only an audio signal in a specific direction is captured. In addition, the filtering processing module may be configured to remove the wanted signal from the reference signal. Certainly, in some other examples, the filtering processing module may further perform frequency domain shaping on the captured reference signal, for example, amplify or reduce energy of some specific frequency bands.

The following describes the solutions in the foregoing figures with reference to different application scenarios.

Figure 26:
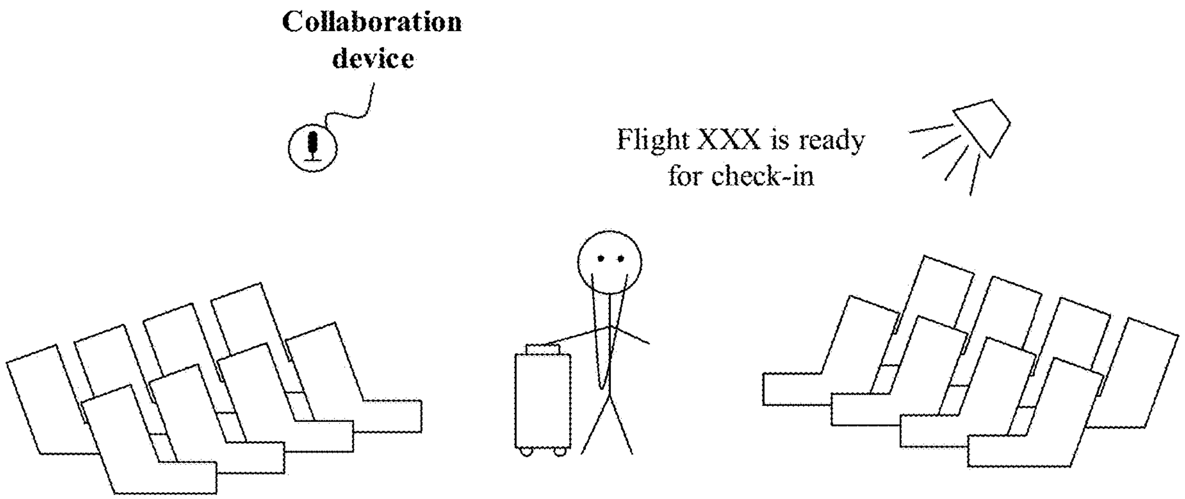
FIG. 26 is a schematic diagram of an active noise cancellation scenario according to an embodiment of this application.

FIG. 26 is a schematic diagram of an active noise cancellation scenario according to an embodiment of this application.

In an embodiment, when the collaboration device and/or the headset determine/determines, based on the geographical location information, that the user may be located in a broadcast scenario such as an airport, a railway station, or a shopping mall, the collaboration device or the headset may determine that the user may be interested in some keywords in the scenario. In this embodiment, an airport broadcast scenario is used as an example to describe the solution in more detail.

It can be learned that in this scenario, in addition to noise signals, the environment further includes airport broadcast. When people are waiting at the airport, the airport broadcasts important notifications or announcements at any time. These pieces of information are important and wanted information for users. Therefore, when active noise cancellation is performed, the user still wants to hear the sound broadcast by the airport, to avoid missing some important notifications. In this case, a wanted signal may be some keywords or key phrases, such as "XXX flight", "Passengers, please pay attention", and the name of the user.

Certainly, it may be understood that the scenario is not limited to an airport broadcast environment, but may also be a railway station broadcast environment or another environment in which a keyword is included. This is not limited in this application.

When the active noise cancellation manner in this application is applied to the scenario in FIG. 26, reference may be made to the following manners for implementation.

First, the collaboration device captures a first ambient audio signal. In an example, a microphone or a microphone array is deployed on the collaboration device as a remote capturing module. The collaboration device captures the first ambient audio signal d(c) by using the microphone or the microphone array. In this case, the first ambient audio signal d(c) may include at least one sound source. If only one sound source is included, the first ambient audio signal d(c) may be directly processed to determine whether information such as a preset keyword is included. Certainly, if the first ambient audio signal d(c) includes a plurality of sound sources, the remote capturing module further needs to separate the first ambient audio signal d(c) into a plurality of sound source signals. It may be understood that, because the prestored wanted signal may not be perfectly adapted in this environment, a more matched wanted signal needs to be extracted from the ambient audio. Certainly, in some examples, if the prestored wanted signal can be well adapted, the prestored wanted signal may be directly removed from the first ambient audio signal d(c).

In an example, the remote capturing module may perform blind separation on the first ambient audio signal d(c), to obtain a plurality of sound source signals. It is assumed that the first ambient audio signal d(c) has N independent sound sources and M microphones. A sound source vector is $a(c)=[a_1(c), \ldots, a_N(c)]^T$, an observation vector is $d(c)=[d_1(c), \ldots, d_N(c)]^T$, and a hybrid filter with a length of P is used. In this case, a convolutional mixing process from the sound source vector to the observation vector may be expressed as follows:

$$d(c) = H(c) * a(c) = \sum_{p=0}^{P-1} H(p)a(c-p) \quad \text{Formula 1}$$

The hybrid network H(c) is an M×N matrix sequence, which is formed based on an impulse response of the hybrid filter. "*" is used to indicate a convolution operation between matrices, and a value of p is [0, P−1].

If a length of a separation filter is L, and an estimated sound source vector $r(c)=[r_1(c), \ldots, r_N(c)]T$, an estimated sound source vector y(c) may be expressed as:

$$r(c) = W(c) * d(c) = \sum_{l=0}^{L-1} W(l)d(c-l) \quad \text{Formula 2}$$

The separation network W(c) is an N×M matrix sequence, which is formed based on an impulse response of the separation filter, where a value of 1 is [0, L−1].

In an example, the separation network W(c) may be obtained by using a frequency-domain blind source separation algorithm. For example, after L-point short-time Fourier transform (STFT), time-domain convolution is transformed into frequency-domain convolution, that is, the foregoing Formula 1 is changed to:

$$D(m,f)=H(f)A(m,f) \quad \text{Formula 3}$$

In addition, Formula 2 may be changed to:

$$R(m,f)=W(f)D(m,f) \quad \text{Formula 4}$$

Herein, m is determined after L-point down-sampling is performed on the time index value c. D(m, f) and R(m, f) are determined after STFT is performed on d(c) and r(c) respectively. H(f) and W(f) are respectively Fourier transformed forms of H(c) and W(c). f is frequency, where $$f \in \left[f_0, \ldots, f_{\frac{L}{2}}\right].$$

Finally, the obtained Y(m, f) through blind source separation is transformed back to time domain after inverse Fourier transform, to obtain estimated sound source signals $r_1(c), \ldots, r_N(C)$.

After obtaining the estimated sound source signals $r_1(c), \ldots, r_N(c)$, the collaboration device may analyze whether each of the sound source signals $r_1(c), \ldots, r_N(c)$ includes preset content of interest, for example, may identify whether the sound source signals $r_1(c), \ldots, r_N(c)$ include a preset key phrase (or keyword).

In an example, whether the sound source signal includes a key phrase (or keyword) may be identified in a template matching manner. This application is described by using a key phrase as an example. It may be understood that the keyword is only a special case when the key phrase is a word.

Figure 27:
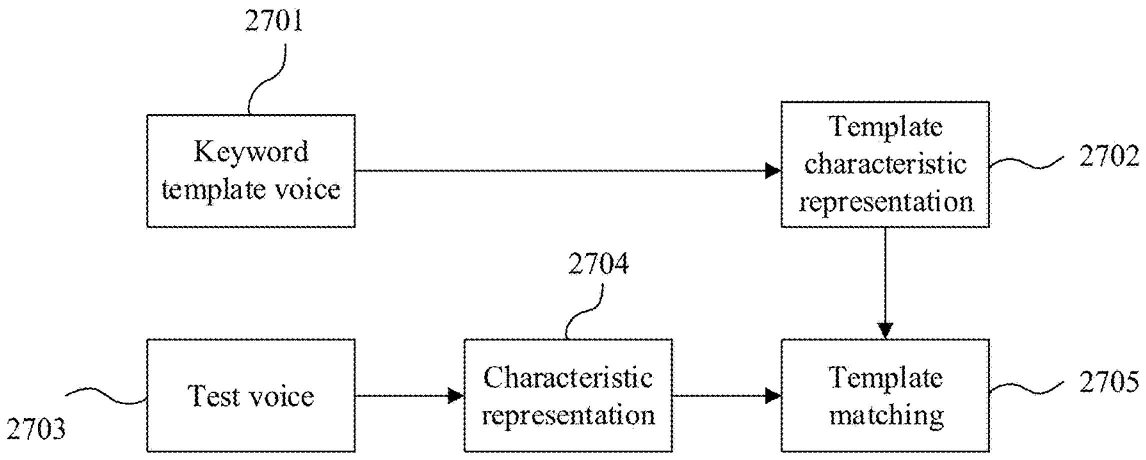
FIG. 27 is a flowchart of template matching according to an embodiment of this application.

For example, the template matching manner is shown in FIG. 27, and includes obtaining a key phrase template voice in step 2701. It may be understood that the key phrase template voice may be preset. Then, in step 2702, the key phrase is characterized. Before, during, or after step 2701 and step 2702, step 2703 may be further performed to obtain a test voice. It may be understood that the test voice may be the foregoing obtained sound source signal $r_1(c), \ldots, r_N(c)$. Then, each sound source signal $r_1(c), \ldots, r_N(c)$ is characterized and represented. Finally, the characteristic representation of the test voice is matched with a template characteristic representation, to determine whether the sound source signal includes the key phrase.

In an example, the template characteristic representation and the characteristic representation of the test voice may use a Mel frequency cepstrum coefficient (MFCC) characteristic. The MFCC characteristic is a basic characteristic widely used in the field of speech recognition and speaker identification. The MFCC characteristic is based on a human ear characteristic. That is, the human ear's perception of a sound frequency range of about 1000 Hz or above does not follow a linear relationship, but follows an approximate linear relationship on logarithmic frequency coordinates. The MFCC is a cepstrum parameter extracted from a Mel scale frequency domain, and the Mel scale describes a compromise non-linear feature of the human ear frequency.

Figure 28:
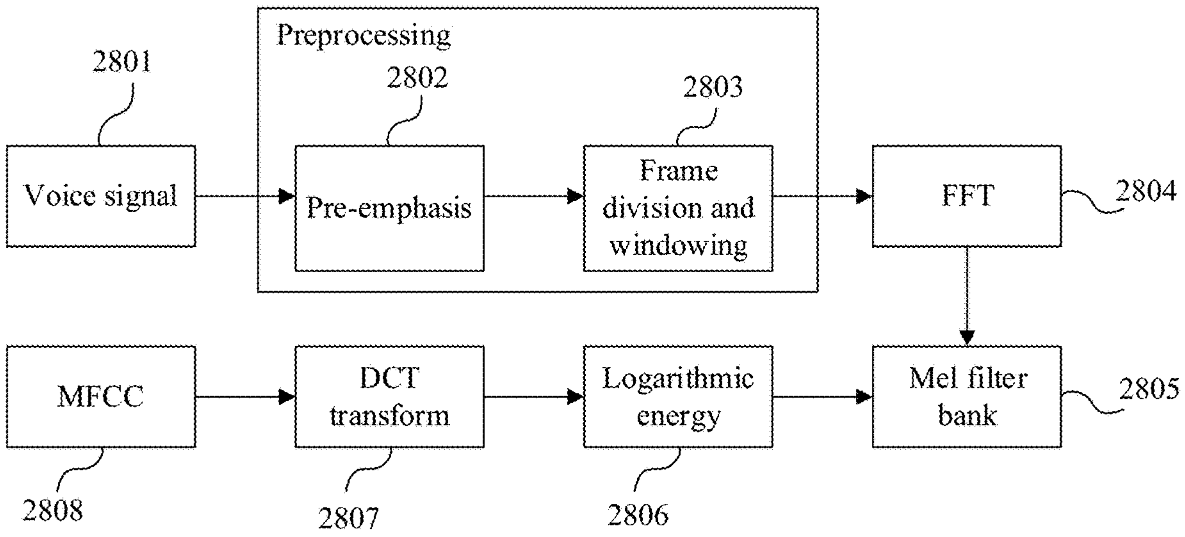
FIG. 28 is a flowchart of MFCC characteristic extraction according to an embodiment of this application.

In an example, for extraction of an MFCC characteristic, refer to the process described in FIG. 28. First, a voice signal is obtained by using step 2801. The voice signal may be the key phrase template voice in step 2701, or may be the test voice in step 2703, for example, a sound source signal $r_1(c), \ldots, r_N(c)$. Then, each key phrase template voice or each sound source signal obtained in step 2801 is preprocessed. In an example, the preprocessing may include pre-emphasis in step 2802 and frame division and windowing in step 2803. An objective of step 2802 is to eliminate an impact caused by mouth and nose radiation when the speech is pronounced. For example, a high-pass filter is used to improve a high-frequency part of a voice. Because the voice signal is stable for a short time, the voice signal may be divided into a short time segment through frame division and windowing in step 2803. Each short time segment may be referred to as a frame. In an example, to avoid loss of a dynamic signal in a voice signal, an overlapping area may exist between adjacent frames. Step 2804: Perform FFT on the time-domain signal obtained after the frame division and windowing, transform the time-domain signal to a frequency domain signal, and obtain a spectral characteristic b(k). After the FFT in step 2804, the Mel filter bank in step 2805 may filter the spectral characteristic b(k) of each voice signal obtained in step 2804, and obtain energy of each sub-band. The energy of the sub-band may be obtained through calculation by using a sum of squares of frequency domain signals. In step 2806, a logarithm of the energy of each sub-band of each voice signal obtained in step 2805 may be obtained, to obtain a Mel frequency logarithmic energy spectrum of each voice signal. In step 2807, discrete cosine transform (DCT) is performed on the Mel frequency logarithmic energy spectrum of each voice signal obtained in step 2806, and an MFCC coefficient is obtained, that is, step 2808.

After the MFCC coefficient of each key phrase template voice in step 2701 is obtained (that is, step 2702) and the MFCC coefficient of each sound source signal $r_1(c), \ldots, r_N(c)$ in step 2703 is obtained (that is, step 2704) in the manner in FIG. 28, template matching may be performed, that is, step 2705. In an example, template matching may be performed in a cosine distance manner.

Distance measurement between two vectors may describe a similarity between the two vectors. When the distance between two vectors is 0, the similarity is the highest. Therefore, a cosine distance may be used to define a similarity between two vectors. In an example, two N'-dimensional vectors $G=(g_1, g_2, \ldots, g_{N'})$ and $I=(i_1, i_2, \ldots, i_{N'})$ may be defined. The cosine distance may be represented by using Formula 5.

$$j = \frac{G \cdot I}{|G||I|} = \frac{\sum_{n'=1}^{N'} g_{n'} i_{n'}}{\sqrt{\sum_{n'=1}^{N'} g_{n'}^2}\sqrt{\sum_{n'=1}^{N'} i_{n'}^2}} \quad \text{Formula 5}$$

j is used to represent a cosine distance between $G=(g_1, g_2, \ldots, g_{N'})$ and $I=(i_1, i_2, \ldots, i_{N'})$. n' and N' are positive integers, and a value range of n' is [1, N'].

It may be understood that, during template matching, template matching needs to be performed on all key phrase template voices one by one for all sound source signals $r_1(c), \ldots, r_N(c)$. When a calculated cosine distance is greater than or equal to a preset cosine distance threshold, it may be considered that the sound source signal matches the key phrase template voice. In other words, it may be considered that the sound source signal includes a preset key phrase. The collaboration device may use the sound source signal as a wanted signal s(c).

After performing template matching on all the sound source signals $r_1(c), \ldots, r_N(c)$ and all the key phrase template voices one by one, and obtaining one or more wanted signals s(c), the collaboration device may send the obtained one or more wanted signals s(c) to the headset by using the wireless module. For a specific wireless transmission manner, refer to corresponding descriptions in FIG. 25, FIG. 19, and FIG. 16. Details are not described herein again.

Figure 29:
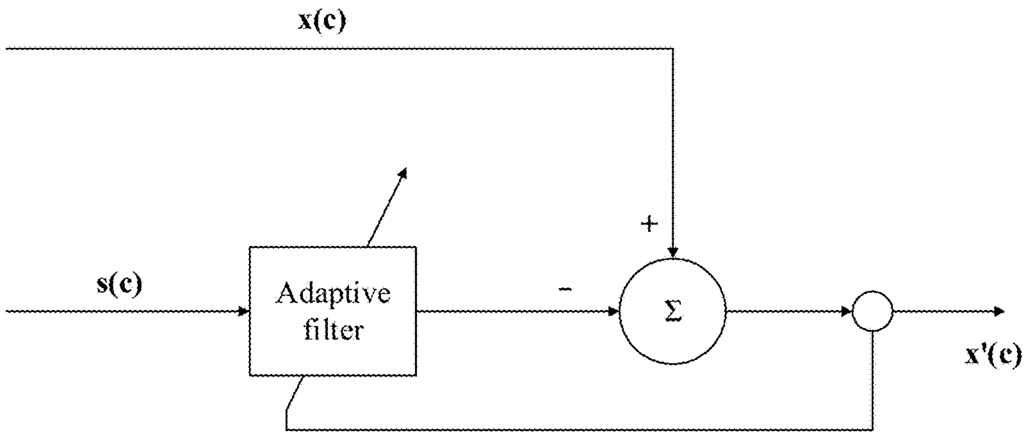
FIG. 29 is a schematic diagram of an architecture for removing a wanted signal according to an embodiment of this application.

The headset may receive, by using the wireless module located in the headset, the one or more wanted signals s(c) sent by the collaboration device. The headset may further capture an audio signal of a surrounding environment by using the near-end capturing module, and use the audio signal as the second ambient audio signal d'(c). In an example, the near-end capturing module may be one or more microphones. After the headset captures the second ambient audio signal d'(c) and receives the one or more wanted signals s(c), the one or more wanted signals s(c) may be removed from the second ambient audio signal d'(c) by using the filtering processing module. In an example, the ANC algorithm model may be used for removal. For example, as shown in FIG. 29, it can be learned that, in an architecture of FIG. 29, the wanted signal s(c) is removed from the second ambient audio signal d'(c) in a feedback adaptive learning manner. The wanted signal s(c) is superposed with the second ambient audio signal after being inverted by using an accumulator, to remove the wanted signal s(c) from the second ambient audio signal, to obtain the reference signal x(c). Obviously, the reference signal x(c) will no longer include the wanted signal s(c).

Certainly, in another example, the wanted signal s(c) may be removed from the second ambient audio signal d'(c) by using a spectral subtraction method. For example, FFT transformation may be first performed on the wanted signal s(c) and the second ambient audio signal d'(c). In addition, a frequency domain spectrum S(f) of the wanted signal and a frequency domain spectrum D'(f) of the second ambient audio signal are obtained. Then, noise cancellation is performed on the frequency domain spectrum D'(f) of the second ambient audio signal, for example, the frequency domain spectrum S(f) of the wanted signal is subtracted from the frequency domain spectrum D'(f) of the second ambient audio signal, to obtain a frequency domain spectrum X(f) of the reference signal. Then, inverse fast Fourier transform (IFFT) is performed on the frequency domain spectrum X(f) of the reference signal to obtain the reference signal x(c). It may be understood that the reference signal x(c) obtained in this manner also does not include the wanted signal s(c).

After obtaining the reference signal x(c), the headset may obtain a phase-inverted signal y(c) of the second ambient audio signal according to the ANC algorithm again based on the reference signal x(c) by using the adaptive filter, and perform active noise cancellation by using the phase-inverted signal y(c). For a specific active noise cancellation process, refer to corresponding descriptions in FIG. 2 to FIG. 9. Details are not described herein again. It may be understood that, after active noise cancellation, noise that does not include a wanted signal s(c) is suppressed, so that the wanted signal s(c) is finally retained in e(c) captured or heard by the user, thereby ensuring that after active noise cancellation is performed by using the headset, the user can still hear content that includes a keyword and that is of interest.

In an example, with reference to the active noise cancellation manners in FIG. 23, FIG. 18, and FIG. 19, a process of extracting sound source features and performing template matching in the foregoing process may be performed by the headset. For example, after capturing the first ambient audio signal d(c), the collaboration device may send, to the headset by using the first wireless module, one or more sound source signals separated from the first ambient audio signal d(c). After the headset receives one or more sound source signals by using the second wireless module on the headset, a processing module located on the headset performs sound source feature extraction and template matching on the one or more sound source signals. A specific implementation process is the same as that in the foregoing manner, and details are not described herein again.

In another example, the sound source signal of the ambient signal may also be separated by a headset. For example, the collaboration device directly sends the captured first ambient audio signal d(c) to the headset by using the first wireless module. After the headset receives the first ambient audio signal d(c) by using the second wireless module on the headset, a processing module located on the headset performs signal separation on the first ambient audio signal d(c) to obtain one or more sound source signals, and performs sound source feature extraction and template matching on the one or more sound source signals. A specific implementation process is the same as that in the foregoing manner, and details are not described herein again.

Certainly, in still another example, if the active noise cancellation manners in FIG. 23, FIG. 15, and FIG. 16 are combined, a process of capturing a reference signal and filtering and removing a wanted signal s(c) in the foregoing process may be performed by the collaboration device. For example, the collaboration device may capture a second ambient audio signal d'(c) by using a reference sensor, and after determining the wanted signal s(c), remove the wanted signal s(c) from the second ambient audio signal d'(c), to obtain the reference signal x(c). It may be understood that the collaboration device may directly use the first ambient audio signal d(c) as the second ambient audio signal d'(c). Then, the collaboration device sends the reference signal x(c) to the headset by using the first wireless module. After receiving the reference signal x(c) by using the second wireless module on the headset, the headset directly uses the reference signal as the reference signal of the ANC. It may be understood that, in this manner, no microphone may be deployed on the headset, but the received reference signal x(c) is directly used as a signal of the reference microphone. A specific implementation process is the same as that in the foregoing manner, and details are not described herein again.

Certainly, a person skilled in the art should note that the key phrase, the keyword, or some key content may be preconfigured on the headset, and then sent by the headset to the collaboration device, so that the collaboration device uses the keyword, the keyword, or the key content when performing template matching. Certainly, may also be prestored in the collaboration device. Certainly, the collaboration device may obtain the information from the server by using a network.

In still another example, the collaboration device and the headset may be further integrated into one device, and active noise cancellation is implemented by using the device, and content of interest of the user is retained.

The collaboration device captures the first ambient audio signal, and extracts a wanted signal of interest. Then, the wanted signal is sent to the headset, so that the headset removes the wanted signal from the second ambient audio signal, to obtain the reference signal, and performs active noise cancellation based on the reference signal. It is ensured that audio content of interest is retained in an active noise cancellation system framework, so that a user can still hear key content of interest. Apparently, the method in this application is particularly applicable to a noisy place that requires attention to broadcasting, such as an airport, a high-speed railway, a railway station, a square, or a supermarket. Certainly, this application is not limited to being applied to the foregoing scenario.

Figure 30:
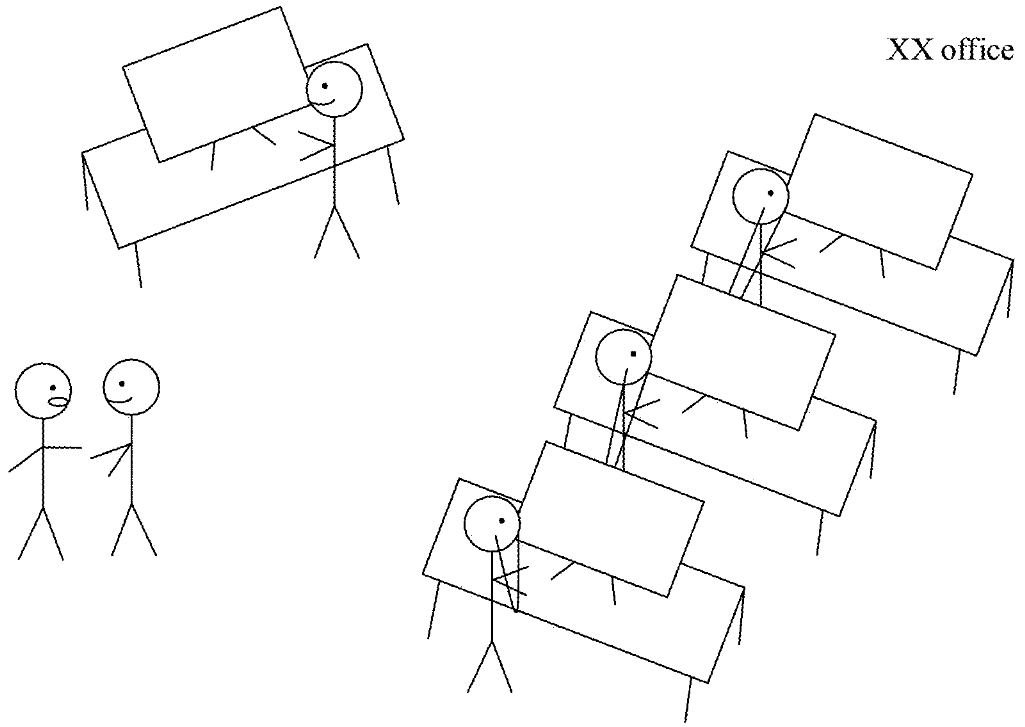
FIG. 30 is a schematic diagram of another active noise cancellation scenario according to an embodiment of this application.

FIG. 30 is a schematic diagram of another active noise cancellation scenario according to an embodiment of this application.

In another embodiment, when the collaboration device and/or the headset determine, by using the geographical location information, a scenario in which the user may be located in some working environments such as an office building or a building, the collaboration device or the headset may determine that the user may be interested in what some specific people say in the scenario. The office scenario in this embodiment is used as an example to describe the solution in more detail.

This scenario mainly applies to office scenarios, such as offices. In this scenario, the user may need to hear the voice of some specific people or colleagues. After wearing the active noise cancellation headset, the user still expects to retain voices of some specific people after active noise cancellation due to a working relationship.

In an example, audio information of a specific person may be extracted in a voiceprint identification manner and used as a wanted signal. It can be understood that, because a voiceprint is a melody of a sound, not only audio information of a specific person can be identified based on voiceprint identification, but also a melody that the user likes can be identified and used as a wanted signal, for example, some music. Certainly, the following description will be based on a voiceprint, but it may be understood that if the voiceprint is replaced with a musical melody, it is still applicable.

When the active noise cancellation manner in this application is applied to the scenario in FIG. 30, reference may be made to the following manners for implementation.

First, the collaboration device captures an ambient signal d(c). The ambient signal d(c) is separated into a plurality of sound source signals $r_1(c), \ldots, r_N(c)$. For a specific implementation of the historical data, refer to corresponding descriptions in the scenario in FIG. 26. Details are not described herein again. It may be understood that, in this environment, a prestored wanted signal, for example, a voiceprint signal, may not be perfectly adapted. Therefore, it is necessary to extract a more matching wanted signal from the ambient audio. Certainly, in some examples, if the prestored wanted signal can be well adapted, the prestored wanted signal may be directly removed from the first ambient audio signal d(c).

When the prestored wanted signal cannot be perfectly adapted, the collaboration device may determine the wanted signal s(c) in a voiceprint identification manner for the plurality of separated sound source signals $r_1(c), \ldots, r_N(c)$.

Figure 31:
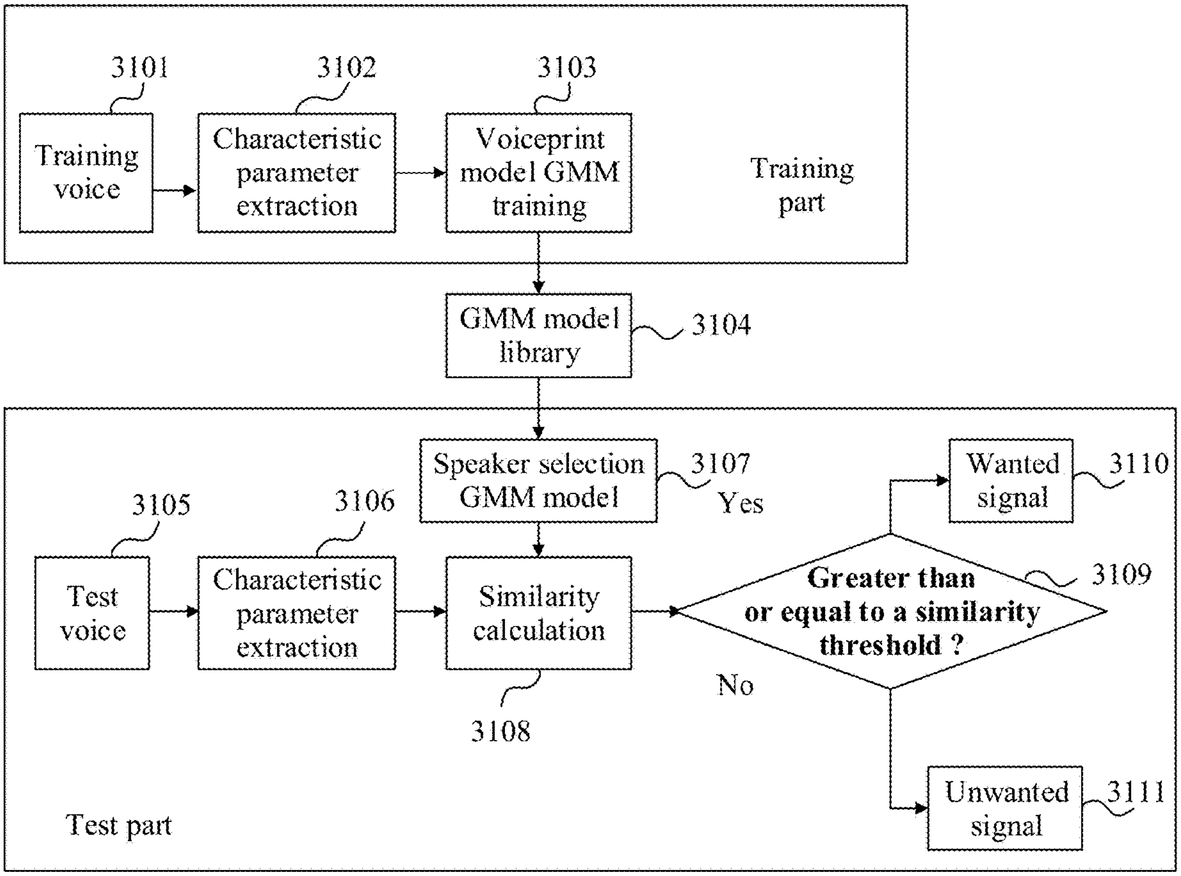
FIG. 31 is a flowchart of GMM-based voiceprint identification according to an embodiment of this application.

In an example, voiceprint identification may be performed in a manner based on a Gaussian mixture model (GMM). For example, FIG. 31 is a flowchart of GMM-based voiceprint identification.

It can be learned that the voiceprint identification process includes two parts, namely, a training part and a test part. The training part may be executed in advance before the test part. The training part may be performed on the collaboration device. Certainly, calculation may be performed on the server in advance, and the trained GMM model library is sent to the collaboration device. Certainly, the trained GMM model library may be prestored in the headset after calculation is performed in advance on the server, and the headset sends the GMM model library to the collaboration device. This is not limited in this application. In the training part, the training device first needs to perform step 3101 to obtain a training voice. For example, one or more pieces of voice information of a speaker that is expected to be retained may be obtained. In an example, such voice information may be captured in advance. Then, the training device performs step 3102 to extract the obtained characteristic parameter of the training voice, for example, an MFCC parameter. For a specific calculation process of the MFCC parameter, refer to corresponding descriptions in the scenario in FIG. 26. Details are not described herein again. Then, the training device performs step 3103 of training an original GMM model based on an MFCC parameter corresponding to the training voice, to obtain a GMM model of a voiceprint of a person. When the training device obtains, through training, GMM models corresponding to a plurality of different human voiceprints, the GMM models corresponding to the plurality of different human voiceprints form a GMM model library, that is, step 3104.

Then, the collaboration device may perform a test part, for example, perform step 3105 to obtain a test voice. The obtained test voice may be an ambient signal d(c) captured by the collaboration device by using the remote capturing module. Then, the processing module of the collaboration device may perform step 3106 to extract a characteristic parameter from the captured ambient signal d(c), for example, still use the MFCC parameter. For a specific calculation process, refer to the corresponding description in the scenario in FIG. 26, and details are not described herein again. The processing module of the collaboration device may further perform step 3107 of selecting, from the GMM model library, a GMM model corresponding to one or more speakers of interest. Step 3108 is performed to calculate a similarity between the characteristic parameter extracted from the ambient signal d(c) and the GMM model corresponding to the one or more speakers of interest. It may be understood that, in this process, a similarity is calculated between each characteristic parameter and each GMM model, and step 3109 is performed to determine whether the similarity is greater than or equal to a preset similarity threshold. If a similarity between a characteristic parameter of a sound source signal and a GMM model is greater than or equal to the preset similarity threshold, it is considered that the sound source signal may correspond to a speaker of interest. Therefore, the sound source signal may be used as a wanted signal s(c), that is, 3110. If a similarity between a characteristic parameter of a sound source signal and a GMM model is less than the preset similarity threshold, it is considered that the sound source signal is not related to the speaker of interest. Therefore, the sound source signal is not used as a wanted signal s(c), that is, 3111.

After the processing module of the collaboration device performs similarity calculation on all sound source signals and GMM models corresponding to all speakers of interest, one or more wanted signals s(c) may be determined. The collaboration device may send the determined one or more wanted signals s(c) to the headset by using the wireless module, so that the headset removes the one or more wanted signals s(c) from the second ambient audio signal d'(c), and obtains the reference signal x(c). Then, the headset obtains a phase-inverted signal y(c) of the second ambient audio signal d'(c) by using the adaptive filter and the reference signal x(c), and performs active noise cancellation based on the phase-inverted signal y(c), to ensure that the user can still hear content including a speaker of interest after performing active noise cancellation by using the headset.

In an example, with reference to the active noise cancellation manners in FIG. 23, FIG. 18, and FIG. 19, a process of performing voiceprint identification in the foregoing process may be executed by the headset. For example, after capturing the first ambient audio signal d(c), the collaboration device may send, to the headset by using the first wireless module, one or more sound source signals separated from the first ambient audio signal d(c). After the headset receives the one or more sound source signals through the second wireless module on the headset, the processing module located on the headset performs voiceprint identification on the one or more sound source signals. A specific implementation process is the same as that in the foregoing manner, and details are not described herein again.

In another example, the sound source signal of the ambient signal may also be separated by a headset. For example, the collaboration device directly sends the captured first ambient audio signal d(c) to the headset by using the first wireless module. After the headset receives the first ambient audio signal d(c) by using the second wireless module on the headset, a processing module located on the headset performs signal separation on the first ambient audio signal d(c) to obtain one or more sound source signals, and performs voiceprint identification on the one or more sound source signals. A specific implementation process is the same as that in the foregoing manner, and details are not described herein again.

Certainly, in still another example, if the active noise cancellation manners in FIG. 23, FIG. 15, and FIG. 16 are combined, a process of capturing a reference signal x(c) and filtering and removing a wanted signal s(c) in the foregoing process may be performed by the collaboration device. For example, the collaboration device may capture a second ambient audio signal d'(c) by using a reference sensor, and after determining the wanted signal s(c), remove the wanted signal s(c) from the second ambient audio signal d'(c), to obtain the reference signal x(c). Then, the collaboration device sends the reference signal x(c) to the headset by using the first wireless module. After receiving the reference signal x(c) by using the second wireless module on the headset, the headset directly uses the reference signal x(c) as the reference signal of the ANC. It may be understood that, in this manner, no microphone may be deployed on the headset, but a received reference signal x(c) is directly used as a signal of the reference microphone. A specific implementation process is the same as that in the foregoing manner, and details are not described herein again.

In still another example, the collaboration device and the headset may be further integrated into one device, and active noise cancellation is implemented by using the device, and content of interest of the user is retained.

The collaboration device captures the first ambient audio signal, and extracts a wanted signal of interest. The content of interest includes audio content of a specific voiceprint. Then, the wanted signal is sent to the headset, so that the headset removes the wanted signal from the second ambient audio signal, to obtain the reference signal, and performs active noise cancellation based on the reference signal. It is ensured that audio content of interest is retained in an active noise cancellation system framework, so that a user can still hear key content of interest. Apparently, the method in this application may be applied to an office scenario, and certainly may also be applied to an environment in which efficient communication is required. This application is not limited to being applied to the foregoing scenario. Then the processing module located on the headset performs on the ambient signal, thereby avoiding.

Figure 32:
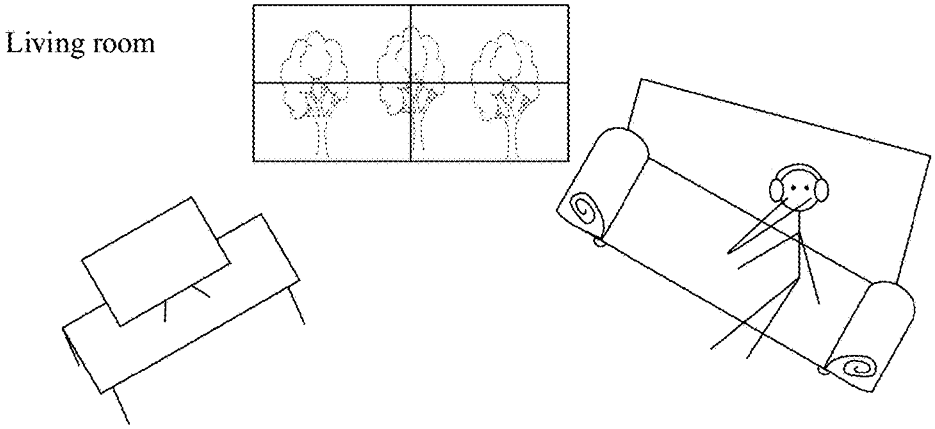
FIG. 32 is a schematic diagram of still another active noise cancellation scenario according to an embodiment of this application.

The reference signal includes only a noise signal, and does not include an audio signal in a direction of interest. Then, the reference signal may be directly used to perform active noise cancellation processing. If is performed in, and then. In other words, the headset may process an audio signal captured in an omnidirectional direction, or may process an audio signal captured in a directional direction. This is not limited in this application. FIG. 32 is a schematic diagram of still another active noise cancellation scenario according to an embodiment of this application.

In still another embodiment, when the collaboration device and/or the headset determine, by using the geographical location information, that the user may be located in some private environment scenarios such as a cell or a hotel, the collaboration device or the headset may determine that the user may be interested in audio signals in some specific directions in the scenario. In this embodiment, a home scenario is used as an example to describe the solution in more detail.

It can be learned that this scenario mainly relates to a home environment, for example, a living room or a bedroom in which a user is located at home. Obviously, such a scenario is relatively private for the user, and not too many other persons or sound sources exist. In addition, the positions of some specific sound sources are fixed. Therefore, directional sound pickup can be used to avoid a sound source that is interested in by the user and that is relatively fixed in a position. For example, the user may not capture an audio signal in a television direction, or may not capture an audio signal in a sound direction. In this way, after active noise cancellation, the user can hear audio in the foregoing direction.

Certainly, it may be understood that the scenario is not limited to a home environment, but may also be a hotel room environment or another environment scenario in which a sound source is relatively fixed. This is not limited in this application.

When the active noise cancellation manner in this application is applied to the scenario in FIG. 32, reference may be made to the following manners for implementation.

Figure 33:
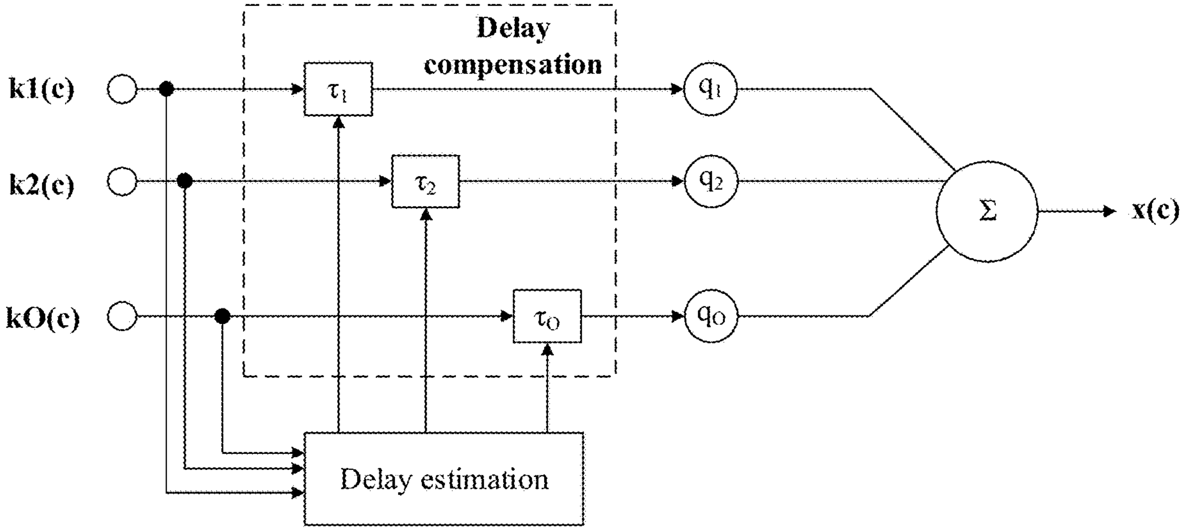
FIG. 33 is a schematic diagram of a structure of a beamformer according to an embodiment of this application.

First, the headset captures a reference signal x(c). The headset may perform directional capturing. For example, the headset does not capture an audio signal in the direction of interest, so that the captured reference signal x(c) does not include the audio signal in the direction of interest. In an example, directional capturing may be performed in a beam forming manner by using a microphone array. It is assumed that O microphones are deployed on the headset, where O is a positive integer. For example, FIG. 33 shows a beamformer. The beamformer may include two types: delay-summing beamforming and filter-summing beamforming. If the input signal of the microphone array is $k_o(c)$, and the filter transfer coefficient is $q_o(c)$, the system output of the filter-sum beamformer may be expressed as:

$$x(c) = \sum_{o=1}^{O} \left(q_o(c) * k_o(c - \tau_o)\right) \qquad \text{Formula 6}$$

In an example, if the filter transfer coefficient is a single weighting constant, the filter-sum beamformer may be simplified into a delay-sum beamformer, that is, formula 6 may be simplified into Formula 7. For example, $$x(c) = \sum_{o=1}^{O} q_o * k_o(c - \tau_o) \qquad \text{Formula 7}$$

In the foregoing formula 6 and formula 7, $\tau_0$ represents delay compensation obtained through delay estimation. The near-end capturing module of the mobile phone may control, by controlling a value of $\tau_0$, a beam of the microphone array to point to a specific direction, and capture audio signals in this direction. Apparently, if the user is interested in an audio signal in a direction, the near-end capturing module may control the beam not to point to the direction of interest, so that the finally captured reference signal x(c) does not include the audio signal in the direction of interest.

It may be understood that, if the user only wants not to listen to audio signals in several directions, for example, the user is in a home environment, the user does not want to hear a sound outside a window. In this case, the headset may specially capture audio in a direction of no interest in the foregoing manner, so that the captured reference signal x(c) includes only an audio signal of no interest.

After capturing the reference signal x(c), the headset may directly use the reference signal x(c) as a reference signal, obtain, by using an adaptive filter, a phase-inverted signal y(c) used to cancel ambient noise, and perform active noise cancellation based on the phase-inverted signal y(c). For a specific noise cancellation process, refer to corresponding descriptions in FIG. 2 to FIG. 9. Details are not described herein again. It may be understood that, after active noise cancellation is performed, audio signals in the direction of interest are included in e(c) heard or captured by the end user. In other words, the user may hear audio in the direction of interest.

In still another embodiment, when the collaboration device and/or the headset determine, by using the geographical location information, that the user may be located in a road scenario such as a street, a road, or a highway, the collaboration device or the headset may determine that the user may be interested in audio signals of some specific frequencies in the scenario, for example, an alarm sound or a horn sound. In an example, after capturing the second ambient audio signal d'(c), the headset may further process the captured second ambient audio signal d'(c). For example, frequency domain filtering may be performed on the captured second ambient audio signal d'(c), to remove a specific frequency band. For example, the alarm sound of some devices or the horn sound of a car. In general, the alarm sound is a fixed sound, and the frequency can be about 1000 Hz. Therefore, the filtering processing module of the headset may select a band-pass filter, and filter the captured second ambient audio signal d'(c) by using the band-pass filter, to remove audio content of 950 Hz to 1050 Hz, so that the reference signal x(c) obtained after filtering no longer includes content of the frequency band, that is, a processed reference signal is obtained. When the headset uses the reference signal x(c) as a reference signal to perform active noise cancellation, it can be ensured that the user can still hear an alarm sound. In this way, when a special event or an unexpected event occurs, the alarm sound can be perceived by the user. It may be understood that the headset may filter second ambient audio signals d'(c) obtained through capturing in all directions, or may filter reference signals x(c) obtained through capturing in some specific directions. For example, frequency domain filtering is performed.

A relatively typical scenario may be, for example, an in-vehicle environment. When a user is located in a relatively private vehicle, the user wants to shield noise outside a vehicle window, and still wants to retain an external horn and an alarm sound, to ensure driving safety. Alternatively, when the user walks or rides on a street, the user wants to cancel noise in the environment, and still wants to retain an external horn and an alarm sound, to ensure walking or riding safety.

When data is captured in all directions, the captured reference signals may also be filtered. A filtering manner thereof is the same as that described above, and details are not described herein again. In this scenario, the headset may perform directional capturing when capturing a reference signal, so that the captured reference signal no longer includes audio signals in some specific directions. After the headset performs active noise cancellation by using the reference signal, an audio signal in a specific direction can still be perceived by the user. Alternatively, some specific frequencies are filtered, so that after active noise cancellation is performed on the headset, audio signals of some specific frequencies can still be perceived by the user.

Figure 34:
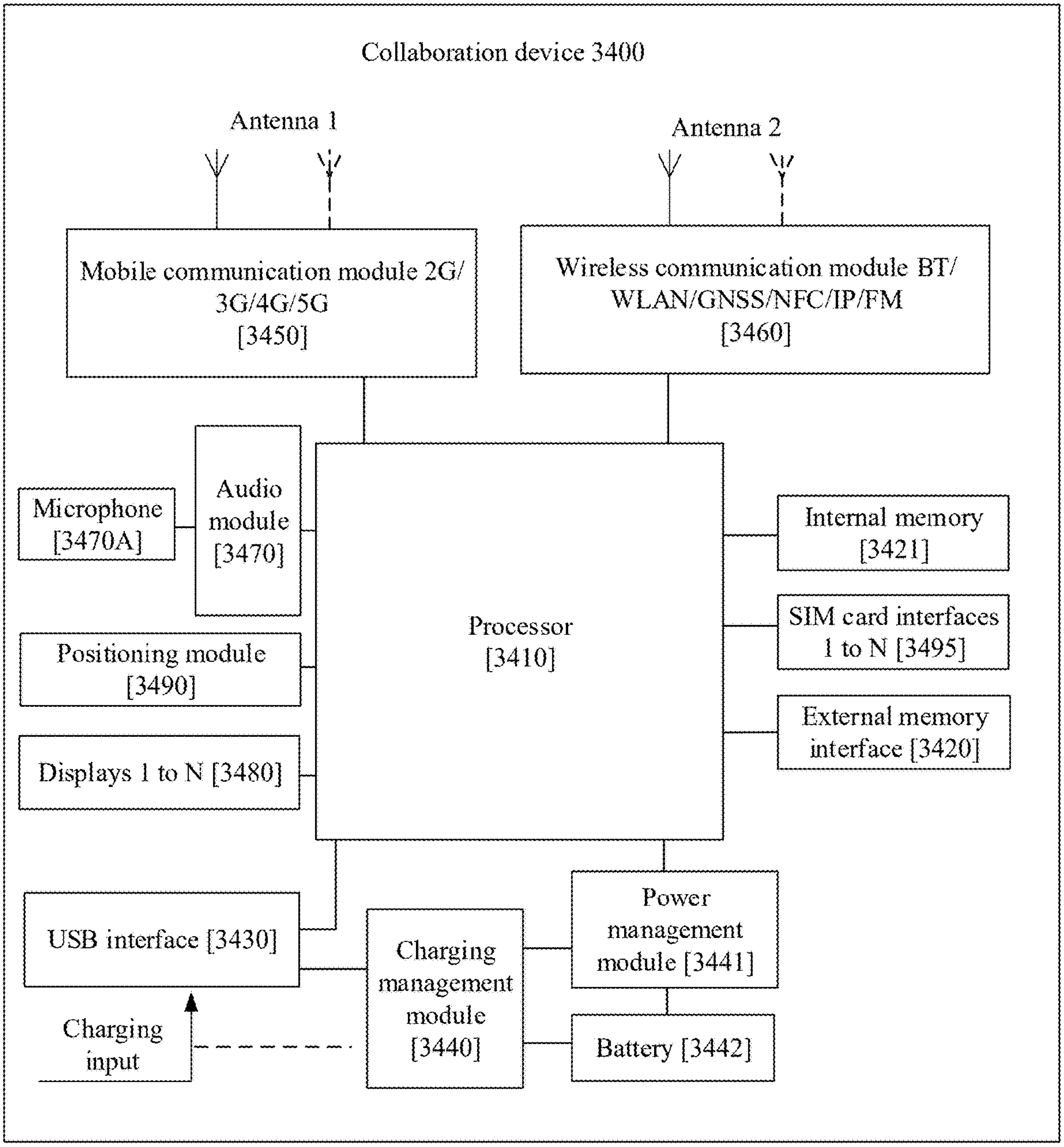
FIG. 34 is a schematic diagram of a collaboration device according to an embodiment of this application.

FIG. 34 is a schematic diagram of a collaboration device according to an embodiment of this application.

As shown in FIG. 34, a collaboration device 3400 is provided. The collaboration device 3400 may be a mobile phone, a tablet computer, a desktop computer, a laptop computer, a handheld computer, a notebook computer, an ultra-mobile personal computer (UMPC), a netbook, a cellular phone, a personal digital assistant (personal digital assistant, PDA), an augmented reality (AR) device, a virtual reality (VR) device, an artificial intelligence (AI) device, a wearable device, an in-vehicle device, a smart home device, and/or a smart city device. In this embodiment of this application, a specific type of the collaboration device 3400 is not specially limited.

The collaboration device 3400 may include a processor 3410, an external memory interface 3420, an internal memory 3421, a universal serial bus (USB) interface 3430, a charging management module 3440, a power management module 3441, a battery 3442, an antenna 1, an antenna 2, a mobile communication module 3450, a wireless communication module 3460, an audio module 3470, a microphone 3470A, a display 3480, a positioning module 3490, a subscriber identity module (SIM) card interface 3495, and the like.

It can be understood that the structure shown in this embodiment of the present invention does not constitute a specific limitation on the collaboration device 3400. In some other embodiments of this application, the collaboration device 3400 may include more or fewer components than those shown in the figure, or combine some components, or split some components, or have different component arrangements. The components shown in the figure may be implemented by hardware, software, or a combination of software and hardware.

The processor 3410 may include one or more processing units. For example, the processor 3410 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction fetching and instruction execution.

A memory may be further disposed in the processor 3410, and is configured to store instructions and data. In some embodiments, the memory in the processor 3410 is a cache. The memory may store instructions or data that has been used or cyclically used by the processor 3410. If the processor 3410 needs to use the instruction or the data again, the processor 3410 may directly invoke the instruction or the data from the memory. This avoids repeated access, reduces waiting time of the processor 3410, and improves system efficiency.

In some embodiments, the processor 3410 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a universal serial bus (USB) interface, and/or the like.

The I2S interface may be configured to perform audio communication. In some embodiments, the processor 3410 may include a plurality of groups of I2S buses. The processor 3410 may be coupled to the audio module 3470 through the I2S bus, to implement communication between the processor 3410 and the audio module 3470. In some embodiments, the audio module 3470 may transmit an audio signal to the wireless communication module 3460 through an I2S interface, to implement a function of transmitting audio data through Bluetooth.

The PCM interface may also be used to perform audio communication, and sample, quantize, and code an analog signal. In some embodiments, the audio module 3470 may be coupled to the wireless communication module 3460 through the PCM bus interface. In some embodiments, the audio module 3470 may alternatively transmit an audio signal to the wireless communication module 3460 through the PCM interface, to implement a function of transmitting audio data through Bluetooth. Both the I2S interface and the PCM interface may be used for audio communication.

It may be understood that an interface connection relationship between the modules that is shown in this embodiment of the present disclosure is merely an example for description, and does not constitute a limitation on a structure of the collaboration device 3400. In some other embodiments of this application, the collaboration device 3400 may alternatively use an interface connection manner different from the interface connection manner in the foregoing embodiment, or a combination of a plurality of interface connection manners.

The external memory interface 3420 may be used to connect to an external storage card, for example, a Micro SD card, to extend a storage capability of the collaboration device 3400. The external storage card communicates with the processor 3410 through the external memory interface 3420, to implement a data storage function. For example, a file such as music or a video is stored in the external storage card.

The internal memory 3421 may be configured to store computer-executable program code, and the computer-executable program code includes an instruction. In addition, the internal memory 3421 may include a high-speed random access memory, or may include a nonvolatile memory such as at least one disk storage device, a flash memory, or a universal flash storage (UFS). The processor 3410 runs the instructions stored in the internal memory 3421, and/or the instructions stored in the memory disposed in the processor, to perform various function applications of the collaboration device 3400 and data processing.

The collaboration device 3400 may implement an audio function, for example, music recording, by using the audio module 3470, the microphone 3470A, the application processor, and the like.

The audio module 3470 is configured to convert digital audio information into an analog audio signal for output, and is also configured to convert analog audio input into a digital audio signal. The audio module 3470 may be configured to code and decode an audio signal. In some embodiments, the audio module 3470 may be disposed in the processor 3410, or some function modules in the audio module 3470 are disposed in the processor 3410.

The microphone 3470A, also referred to as a "mike" or a "microphone", is configured to convert a sound signal into an electrical signal. At least one microphone 3470A may be disposed in the collaboration device 3400. In some other embodiments, a plurality of microphones 3470A may be disposed in the collaboration device 3400, to form a microphone array, to implement a sound signal capturing function, a noise cancellation function, a sound source identification function, a directional recording function, and the like.

The positioning module 3490 may be configured to perform positioning on the collaboration device 3400, for example, perform positioning by using the GPS, the BDS, the Galileo navigation satellite system, the GLONASS, or the like.

The collaboration device 3400 may further include sensors such as an infrared sensor and a gyroscope.

The collaboration device 3400 provided in this application may implement any function of the collaboration device in the examples in FIG. 10*a* to FIG. 25. For a specific implementation, refer to corresponding descriptions in FIG. 10*a* to FIG. 25. Details are not described herein again.

Figure 35:
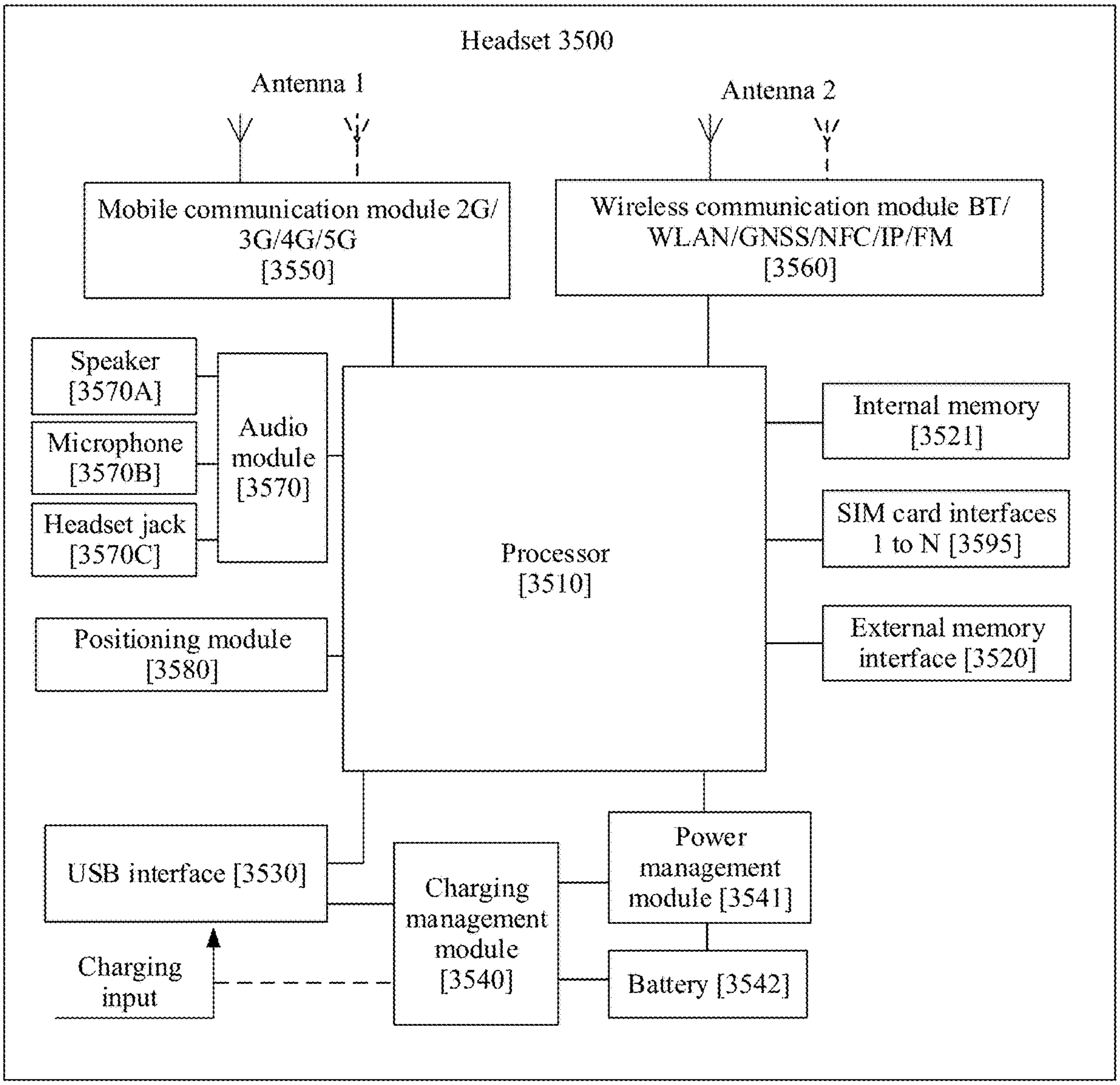
FIG. 35 is a schematic diagram of a headset according to an embodiment of this application.

FIG. 35 is a schematic diagram of a headset according to an embodiment of this application.

As shown in FIG. 35, a headset 3500 is provided. The headset 3500 may be a wireless noise cancellation headset.

The headset 3500 may include a processor 3510, an external memory interface 3520, an internal memory 3521, a universal serial bus (USB) interface 3530, a charging management module 3540, a power management module 3541, a battery 3542, an antenna 1, an antenna 2, a mobile communication module 3550, a wireless communication module 3560, an audio module 3570, a speaker 3570A, a microphone 3570B, a headset jack 3570C, a positioning module 3580, and a SIM card interface 3595.

It can be understood that the structure shown in this embodiment of the present invention does not constitute a specific limitation on the headset 3500. In some other embodiments of this application, the headset 3500 may include more or fewer components than those shown in the figure, or some components may be combined, or some components may be split, or there may be a different component layout. The components shown in the figure may be implemented by hardware, software, or a combination of software and hardware.

The processor 3510 may include one or more processing units. For example, the processor 3510 may include an AP, a modem processor, a GPU, an ISP, a controller, a video codec, a DSP, a baseband processor, and/or an NPU. Different processing units may be independent components, or may be integrated into one or more processors.

The controller may generate an operation control signal based on instruction operation code and a time sequence signal, to complete control of instruction fetching and instruction execution.

A memory may be further disposed in the processor 3510, and is configured to store instructions and data. In some embodiments, the memory in the processor 3510 is a cache. The memory may store instructions or data that has been used or cyclically used by the processor 3510. If the processor 3510 needs to use the instruction or the data again, the processor 3510 may directly invoke the instruction or the data from the memory. This avoids repeated access, reduces waiting time of the processor 3510, and improves system efficiency.

In some embodiments, the processor 3510 may include one or more interfaces. The interface may include an I2C interface, an I2S interface, a PCM interface, a UART interface, an MIPI, a GPIO interface, and/or a USB interface.

The I2S interface may be configured to perform audio communication. In some embodiments, the processor 3510 may include a plurality of groups of I2S buses. The processor 3510 may be coupled to the audio module 3570 through the I2S bus, to implement communication between the processor 3510 and the audio module 3570. In some embodiments, the audio module 3570 may transmit an audio signal to the wireless communication module 3560 by using an I2S interface, to implement a function of transmitting audio data by using a Bluetooth headset.

The PCM interface may also be used to perform audio communication, and sample, quantize, and code an analog signal. In some embodiments, the audio module 3570 may be coupled to the wireless communication module 3560 through the PCM bus interface. In some embodiments, the audio module 3570 may alternatively transmit an audio signal to the wireless communication module 3560 by using the PCM interface, to implement a function of transmitting audio data by using a Bluetooth headset. Both the I2S interface and the PCM interface may be used for audio communication.

It may be understood that an interface connection relationship between the modules shown in this embodiment of the present invention is merely an example for description, and does not constitute a limitation on the structure of the headset 3500. In some other embodiments of this application, the headset 3500 may alternatively use an interface connection manner different from that in the foregoing embodiment, or a combination of a plurality of interface connection manners.

The external memory interface 3520 may be configured to connect to an external storage card, for example, a micro SD card, to extend a storage capability of the headset 3500. The external storage card communicates with the processor 3510 through the external memory interface 3520, to implement a data storage function. For example, a file such as music or a video is stored in the external storage card.

The internal memory 3521 may be configured to store computer-executable program code, and the computer-executable program code includes an instruction. The internal memory 3521 may include a program storage area and a data storage area. The program storage area may store an operating system, an application required by at least one function (for example, a sound playing function or an image playing function), and the like. The data storage area may store data (for example, audio data) and the like created when the headset 3500 is used. In addition, the internal memory 3521 may include a high-speed random access memory, or may include a nonvolatile memory, for example, at least one magnetic disk storage device, a flash memory, or a UFS. The processor 3510 runs the instructions stored in the internal memory 3521 and/or the instructions stored in the memory disposed in the processor, to execute various function applications of the headset 3500 and data processing.

The headset 3500 may implement an audio function, for example, music playing and recording, by using the audio module 3570, the speaker 3570A, the microphone 3570B, the headset jack 3570C, the application processor, and the like.

The audio module 3570 is configured to convert digital audio information into an analog audio signal for output, and is also configured to convert analog audio input into a digital audio signal. The audio module 3570 may be configured to code and decode an audio signal. In some embodiments, the audio module 3570 may be disposed in the processor 3510, or some function modules in the audio module 3570 are disposed in the processor 3510.

The speaker 3570A, also referred to as a "horn", is configured to convert an audio electrical signal into a sound signal. The headset 3500 may play audio by using the speaker 3570A.

The microphone 3570B, also referred to as a "mike" or a "microphone", is configured to convert a sound signal into an electrical signal. At least one microphone 3570B may be disposed in the headset 3500. In some other embodiments, a plurality of microphones 3570B may be disposed on the headset 3500, to form a microphone array, to implement a sound signal capturing function, a noise cancellation function, a sound source identification function, a directional recording function, and the like.

The headset jack 3570C is configured to connect the headset 3500 to the collaboration device 3400. The headset jack 3570C may be a USB interface 3530, or may be a 3.5 mm open mobile terminal platform (OMTP) standard interface or a cellular telecommunications industry association of the USA (CTIA) standard interface.

The positioning module 3580 may be configured to perform positioning on the headset 3500, for example, perform positioning in a manner such as using the GPS, the BDS, the Galileo Navigation Satellite System, or the GLONASS.

The headset 3500 may further include sensors such as an infrared sensor and a gyroscope.

The headset 3500 provided in this application may implement any function of the headset in the examples in FIG. 10*a* to FIG. 25. For a specific implementation, refer to corresponding descriptions in FIG. 10*a* to FIG. 25. Details are not described herein again.

A person of ordinary skill in the art should be aware that units and algorithm steps in the examples described with reference to embodiments disclosed in this specification can be implemented by electronic hardware, computer software, or a combination of computer software and electronic hardware. To clearly illustrate interchangeability of hardware and software, various illustrative components and steps have been described above generally in terms of functions. Whether the functions are performed by hardware or software depends on particular applications and design constraints of the technical solution. A person skilled in the art may use different methods to implement the described functions for each particular application, but it should not be considered that the implementation goes beyond the scope of this application.

A person of ordinary skill in the art may understand that all or some of the steps in the foregoing method of the embodiments may be implemented by a program instructing a processor. The foregoing program may be stored in a computer-readable storage medium. The storage medium may be a non-transitory medium, such as a random-access memory, a read-only memory, a flash memory, a hard disk, a solid state drive, a magnetic tape, a floppy disk, an optical disc, or any combination thereof.

The foregoing descriptions are merely preferred specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, wherein the method is applied to a collaboration device or a headset, and the method comprises:

capturing an ambient sound around the collaboration device or the headset, and determining an ambient audio signal;

determining a working status of the collaboration device or the headset;

determining, based on a preset correspondence between a working status and a wanted signal, at least one wanted signal related to the working status of the collaboration device or the headset, wherein the at least one wanted signal comprises target content;

removing at least one filtered wanted signal from the ambient audio signal, to obtain a reference signal, wherein the at least one filtered wanted signal is determined by band-pass filtering the at least one wanted signal, and the at least one filtered wanted signal is within a band-pass filtering range determined based on the working status of the collaboration device or the headset; and determining, based on the reference signal, a to-be-played signal for active noise cancellation, wherein after the headset plays the to-be-played signal, ambient noise is canceled and the target content in an environment is retained.

2. The method according to claim 1, wherein the determining a working status of the collaboration device or the headset comprises at least one of: determining a working scenario of the collaboration device or the headset, or determining a working mode of the collaboration device or the headset.

3. The method according to claim 2, wherein the determining a working scenario of the collaboration device or the headset comprises:

obtaining environment information of the collaboration device or the headset; and determining, based on a preset correspondence between environment information and a working scenario, a working scenario that is of the collaboration device or the headset and that is corresponding to the environment information of the collaboration device or the headset.

4. The method according to claim 3, wherein the environment information comprises at least one of the following: geographical location information, the ambient audio signal, or an ambient video signal.

5. The method according to claim 3, wherein the determining a working scenario of the collaboration device or the headset further comprises:

determining one or more of a historical habit preference of a user, a current trip, current time information, or at least one of a device status of the collaboration device or a device status of the headset; and wherein the determining, based on a preset correspondence between environment information and a working scenario, a working scenario that is of the collaboration device or the headset and that is corresponding to the environment information of the collaboration device or the headset comprises:

determining, based on the environment information and with reference to the one or more of the historical habit preference of the user, the current trip, the current time information, or at least one of the device status of the collaboration device or the device status of the headset, the working scenario that is of the collaboration device or the headset and that is corresponding to the environment information of the collaboration device or the headset.

6. The method according to claim 2, wherein the determining a working mode of the collaboration device or the headset comprises:

receiving, by the collaboration device or the headset, a first input instruction, wherein the first input instruction indicates a selected working mode from a plurality of prestored working modes; and determining the working mode of the collaboration device or the headset based on the first input instruction, wherein the working mode is in an active noise cancellation mode.

7. The method according to claim 6, wherein the method is applied to the collaboration device, and wherein the method further comprises:

receiving a working mode of the headset sent by the headset; and using the working mode of the headset as the working mode of the collaboration device; or determining the working mode of the collaboration device based on the first input instruction and the working mode of the headset.

8. The method according to claim 6, wherein the method is applied to the headset, and wherein the method further comprises:

receiving a working mode of the collaboration device sent by the collaboration device; and using the working mode of the collaboration device as the working mode of the headset; or determining the working mode of the headset based on the first input instruction and the working mode of the collaboration device.

9. The method according to claim 1, wherein the determining at least one wanted signal related to the working status comprises:

determining the at least one wanted signal that is related to the working status and prestored in the collaboration device or the headset.

10. The method according to claim 1, wherein the determining at least one wanted signal related to the working status comprises:

performing signal separation on the ambient audio signal to obtain at least one sound source signal; and identifying the at least one sound source signal, and determining the at least one wanted signal related to the working status.

11. A method, wherein the method is applied to a collaboration device or a headset, and the method comprises:

capturing an ambient sound around the collaboration device or the headset, and determining an ambient audio signal;

determining at least one wanted signal, wherein the wanted signal comprises target content;

performing band-pass filtering on the at least one wanted signal to obtain at least one filtered wanted signal within a band-pass filtering range determined based on a working status of the collaboration device or the headset;

removing the at least one filtered wanted signal from the ambient audio signal, to obtain a reference signal; and determining, based on the reference signal, a to-be-played signal for active noise cancellation, wherein after the headset plays the to-be-played signal, ambient noise is canceled and the target content in an environment is retained.

12. The method according to claim 11, wherein the determining at least one wanted signal comprises:

determining the working status of the collaboration device or the headset; and determining, based on a preset correspondence between the working status and a wanted signal, at least one wanted signal related to the working status of the collaboration device or the headset.

13. The method according to claim 12, wherein the determining a working status of the collaboration device or the headset comprises at least one of: determining a working scenario of the collaboration device or the headset, or determining a working mode of the collaboration device or the headset.

14. The method according to claim 13, wherein the determining a working scenario of the collaboration device or the headset comprises:

obtaining environment information of the collaboration device or the headset; and determining, based on a preset correspondence between environment information and a working scenario, a working scenario that is of the collaboration device or the headset and that is corresponding to the environment information of the collaboration device or the headset.

15. The method according to claim 14, wherein the environment information comprises at least one of the following: geographical location information, the ambient audio signal, or an ambient video signal.

16. The method according to claim 14, wherein the determining a working scenario of the collaboration device or the headset further comprises:

determining one or more of a historical habit preference of a user, a current trip, current time information, or at least one of a device status of the collaboration device or a device status of the headset; and wherein the determining, based on a preset correspondence between environment information and a working scenario, a working scenario that is of the collaboration device or the headset and that is corresponding to the environment information of the collaboration device or the headset comprises:

determining, based on the environment information and with reference to the one or more of the historical habit preference of the user, the current trip, the current time information, or at least one of the device status of the collaboration device or the device status of the headset, the working scenario that is of the collaboration device or the headset and that is corresponding to the environment information of the collaboration device or the headset.

17. The method according to claim 13, wherein the determining a working mode of the collaboration device or the headset comprises:

receiving, by the collaboration device or the headset, a first input instruction, wherein the first input instruction indicates a selected working mode from a plurality of prestored working modes; and determining the working mode of the collaboration device or the headset based on the first input instruction, wherein the working mode is in an active noise cancellation mode.

18. The method according to claim 17, wherein the method is applied to the collaboration device, and wherein the method further comprises:

receiving a working mode of the headset sent by the headset; and using the working mode of the headset as the working mode of the collaboration device; or determining the working mode of the collaboration device based on the first input instruction and the working mode of the headset.

19. A device, wherein the device is a collaboration device or a headset, and the device comprises:

a microphone;

at least one processor; and at least one memory coupled to the at least one processor, wherein the at least one memory stores programming instructions for execution by the at least one processor to cause the device to perform operations comprising:

capturing an ambient sound around the collaboration device or the headset, and determining an ambient audio signal;

determining a working status of the collaboration device or the headset;

determining, based on a preset correspondence between a working status and a wanted signal, at least one wanted signal related to the working status of the collaboration device or the headset, wherein the at least one wanted signal comprises target content;

removing at least one filtered wanted signal from the ambient audio signal, to obtain a reference signal, wherein the at least one filtered wanted signal is determined by band-pass filtering the at least one wanted signal, and the at least one filtered wanted signal is within a band-pass filtering range determined based on the working status of the collaboration device or the headset; and determining, based on the reference signal, a to-be-played signal for active noise cancellation, wherein after the headset plays the to-be-played signal, ambient noise is canceled and the target content in an environment is retained.

20. The device according to claim 19, wherein the determining a working status of the collaboration device or the headset comprises at least one of:

determining a working scenario of the collaboration device or the headset, or determining a working mode of the collaboration device or the headset.

* * * * *